(12) United States Patent
Jeong et al.

(10) Patent No.: US 10,157,455 B2
(45) Date of Patent: Dec. 18, 2018

(54) METHOD AND DEVICE FOR PROVIDING IMAGE

(71) Applicant: SAMSUNG ELECTRONICS CO., LTD., Suwon-si (KR)

(72) Inventors: Moon-sik Jeong, Seongnam-si (KR); Hye-sun Kim, Yongin-si (KR); Su-jung Bae, Yongin-si (KR); Seong-oh Lee, Yongin-si (KR); Hyeon-hee Cha, Suwon-si (KR); Sung-do Choi, Suwon-si (KR); Hyun-soo Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 14/814,727

(22) Filed: Jul. 31, 2015

(65) Prior Publication Data
US 2016/0035074 A1 Feb. 4, 2016

(30) Foreign Application Priority Data

Jul. 31, 2014 (KR) .................. 10-2014-0098589
Aug. 26, 2014 (KR) .................. 10-2014-0111628
Jun. 3, 2015 (KR) .................. 10-2015-0078777

(51) Int. Cl.
*G06K 9/46* (2006.01)
*G06T 5/50* (2006.01)
(Continued)

(52) U.S. Cl.
CPC .............. *G06T 5/50* (2013.01); *G06F 3/0482* (2013.01); *G06F 3/04842* (2013.01);
(Continued)

(58) Field of Classification Search
CPC .. G06T 5/50; G06T 3/40; G06T 5/002; G06T 11/60; G06F 3/0482; G06F 3/04842;
(Continued)

(56) References Cited

U.S. PATENT DOCUMENTS 9,411,830 B2  8/2016 Mei et al.
9,521,315 B2  12/2016 Arrasvuori
(Continued)

FOREIGN PATENT DOCUMENTS

CN  103207888 A  7/2013
CN  103946838 A  7/2014
(Continued)

OTHER PUBLICATIONS

Adobe Photoshop 7.0 Classroom in a Book, Published on 2002, pp. 1-540.*
(Continued)

*Primary Examiner* — Duy M Dang
(74) *Attorney, Agent, or Firm* — Sughrue Mion, PLLC

(57) ABSTRACT

An image providing method includes displaying a first image, the first image including an object and a background; receiving a user input selecting the object or the background as a region of interest; acquiring first identification information associated with the region of interest based on first attribute information of the first image; acquiring a second image from a target image, the second image including second identification information, the second identification information being the same as the first identification information; and generating an effect image based on at least one of the first image and the second image.

22 Claims, 51 Drawing Sheets

(51) Int. Cl.
| | |
|---|---|
| *G06T 11/60* | (2006.01) |
| *G06F 3/0482* | (2013.01) |
| *G06F 3/0484* | (2013.01) |
| *G06T 3/40* | (2006.01) |
| *G06T 5/00* | (2006.01) |

(52) U.S. Cl.
CPC ......... *G06K 9/4642* (2013.01); *G06K 9/4652* (2013.01); *G06T 3/40* (2013.01); *G06T 5/002* (2013.01); *G06T 11/60* (2013.01); *G06T 2200/24* (2013.01); *G06T 2207/20104* (2013.01); *G06T 2207/20212* (2013.01); *G06T 2207/20221* (2013.01)

(58) Field of Classification Search
CPC .. G06F 3/0484; G06K 9/4642; G06K 9/4652; G06K 9/00228; H04N 1/387; H04N 1/3872
See application file for complete search history.

(56) References Cited

U.S. PATENT DOCUMENTS

| | | |
|---|---|---|
| 2004/0076342 A1 | 4/2004 | Wolff et al. |
| 2004/0076942 A1 | 4/2004 | O'Neil et al. |
| 2005/0036044 A1* | 2/2005 | Funakura ........... G06K 9/00228 348/239 |
| 2007/0008321 A1 | 1/2007 | Gallagher et al. |
| 2009/0006474 A1 | 1/2009 | Richardson et al. |
| 2011/0167081 A1 | 7/2011 | Kosaka et al. |
| 2012/0002899 A1* | 1/2012 | Orr, IV ..................... G06T 5/50 382/282 |
| 2012/0005209 A1 | 1/2012 | Rinearson et al. |
| 2012/0092357 A1 | 4/2012 | Wang et al. |
| 2012/0299958 A1 | 11/2012 | Tsurumi |
| 2012/0307096 A1 | 12/2012 | Ford et al. |
| 2013/0182901 A1 | 7/2013 | Ishida et al. |
| 2013/0185288 A1 | 7/2013 | Nishiyama et al. |
| 2013/0330088 A1 | 12/2013 | Oshima et al. |
| 2014/0009796 A1 | 1/2014 | Kajiwara et al. |
| 2014/0037157 A1 | 2/2014 | Takaoka |
| 2014/0043655 A1 | 2/2014 | Kosaka et al. |
| 2014/0075393 A1* | 3/2014 | Mei ................... G06F 17/30967 715/863 |
| 2014/0078075 A1 | 3/2014 | Wilensky et al. |
| 2014/0164988 A1 | 6/2014 | Barnett et al. |

FOREIGN PATENT DOCUMENTS

| | | |
|---|---|---|
| KR | 10-2011-0052247 A | 5/2011 |
| TW | 201327423 A1 | 7/2013 |

OTHER PUBLICATIONS

Adobe Photoshop 5.0 User Guide. Published on 1998, pp. 1-131.*
Entheos Halo Effect article ("Learn how to create a halo effect around the head using Photoshop CS") Published on Nov. 1, 2005, pp. 1-2.*
Li, et al.; "Modeling Image Data for Effective Indexing and Retrieval in Large General Image Databases", IEEE Transactions on Knowledge and Data Engineering, Nov. 2008, vol. 20, No. 11, 15 pages total.
Communication dated Feb. 1, 2016, issued by the European Patent Office in counterpart European Application No. 15178662.1.
International Search Report (PCT/ISA/210) dated Oct. 29, 2015, issued in International Application No. PCT/KR2015/007624.
Written Opinion (PCT/ISA/237) dated Oct. 29, 2015, issued in International Application No. PCT/KR2015/007624.
Communication issued by the Taiwanese Patent Department dated Jun. 7, 2017 in counterpart Taiwanese Patent Application No. 104124634.
Communication issued by the State Intellectual Property Office of P.R. China dated Jan. 29, 2018 in counterpart Chinese Patent Application No. 201510463421.2.
Communication issued by the Taiwan Intellectual Property Office dated Mar. 7, 2018 in counterpart Taiwan Patent Application No. 104124634.
Diakopoulos, et al., "Content Based Image Synthesis", Jun. 25, 2004, CIVR, pp. 299-307.
Communication dated Sep. 17, 2018, issued by the European Patent Office in counterpart European Patent Application No. 15178662.1.

* cited by examiner

FIG. 16

| IMAGE / METADATA | IMAGE 1 (1601) | IMAGE 2 (1602) | IMAGE 3 (1603) | ... |
|---|---|---|---|---|
| TYPE (1610) | STILL IMAGE | STILL IMAGE | STILL IMAGE | ... |
| TIME (1611) | 2012.5.3 15:13 | 2012.3.4 14:34 | 2013.2.10 10:40 | ... |
| POSITION (GPS) (1612) | LATITUDE: 37; 25; 26.928··· LONGITUDE: 126; 35; 31.235··· | LATITUDE: 33; 51; 23.9999··· LONGITUDE: 151; 12; 55.235··· | LATITUDE: 37; 25; 26.928··· LONGITUDE: 126; 35; 31.235··· | ... |
| RESOLUTION (1613) | 3264X2736 | 1024X680 | 720X1280 | ... |
| SIZE (1614) | 4.2MB | 171KB | 385KB | ... |
| WEATHER (1615) | CLOUDY | RAINY | CLEAR | ... |
| TEMPERATURE (1616) | 20 ℃ | 16 ℃ | 10 ℃ | ... |
| COLLECTING DEVICE (1617) | MOBILE PHONE | TABLET | MOBILE PHONE | ... |
| USER-ADDED INFORMATION (1618) | FRIEND | FAMILY | | ... |
| OBJECT INFORMATION (1619) | USER 1, USER 2, ME, CHAIR | FLOWER, DOG, ME | GLASS, CHAIR, DOG | ... |
| ... | ... | ... | ... | |

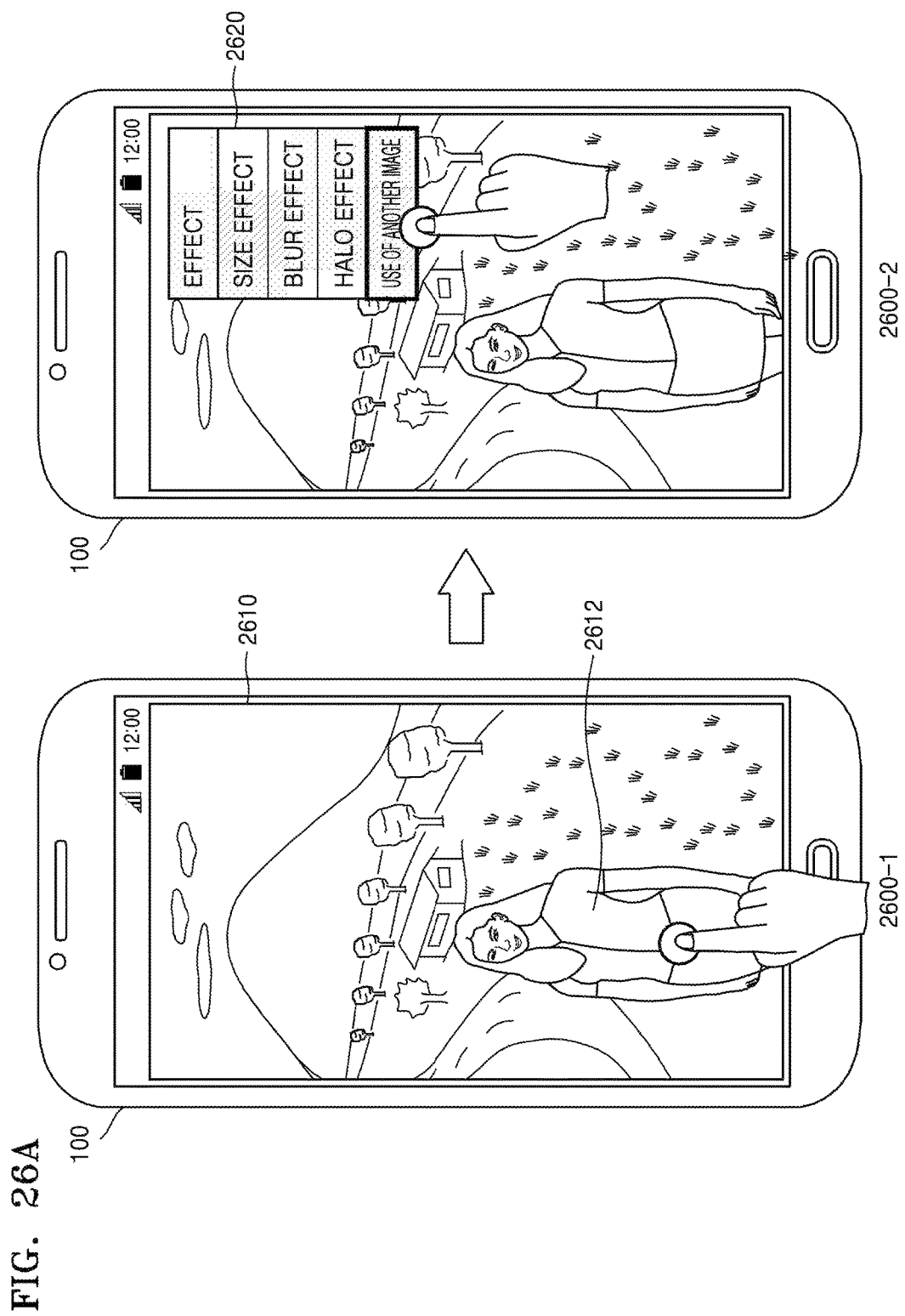

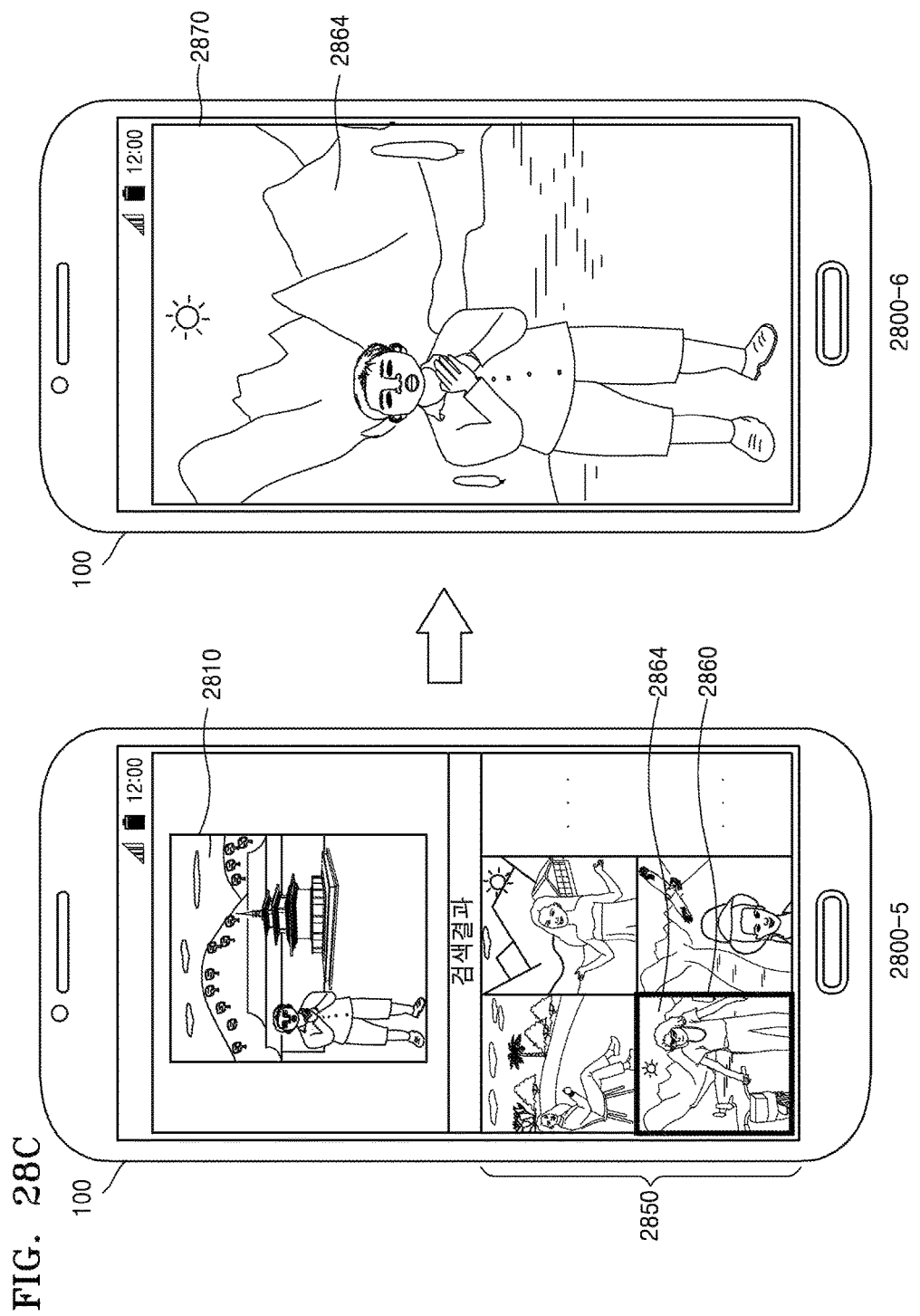

METHOD AND DEVICE FOR PROVIDING IMAGE

CROSS-REFERENCE TO RELATED PATENT APPLICATION

This application claims priority to Korean Patent Application Nos. 10-2014-0098589, filed on Jul. 31, 2014, 10-2014-0111628, filed on Aug. 26, 2014, and 10-2015-0078777, filed on Jun. 3, 2015 in the Korean Intellectual Property Office, the disclosures of which are incorporated herein in its entirety by reference.

BACKGROUND

1. Field

One or more exemplary embodiments relate to a method and device for providing an image.

2. Description of the Related Art

Electronic apparatuses have become diversified, and the types of electronic apparatuses used by each person have become more diverse. A user uses various images, various applications, and various services by using a plurality of electronic apparatuses that the user owns, and the number of images that a user may use is increasing.

Accordingly, users can come across many types of images, but images that users prefer may be different. Moreover, a user can have interest in a specific portion of an image. Thus, there is still a need to efficiently provide a portion of the image in which the user is interested.

SUMMARY

According to an aspect of an exemplary embodiment, an image providing method may include displaying a first image, the first image including an object and a background; receiving a user input selecting the object or the background as a region of interest; acquiring first identification information associated with the region of interest based on first attribute information of the first image; acquiring a second image from a target image, the second image including second identification information, the second identification information being the same as the first identification information; and generating an effect image based on at least one of the first image and the second image.

The first attribute information may include at least one of context information associated with generation of the first image, and annotation information about the first image, the annotation information being added by a user.

The first identification information may be acquired by generalizing the first attribute information based on WordNet.

The acquiring of the second image may include acquiring second identification information of the second image using at least one of second attribute information of the second image and image analysis information of the second image.

The first identification information of the region of interest may be acquired from the first attribute information, the first attribute information may include a plurality of attributes of the first image.

The method may include displaying a list of the plurality of attributes of the first image.

The method may include receiving a user input selecting at least one of the plurality of attributes of the first image, and generating the first identification information based on the selected at least one attribute, wherein the acquiring of the second image comprises comparing first identification information with third identification information of the target image.

The generating of the effect image may include displaying a partial image of the second image, the partial image corresponding to the first identification information.

The effect image may be generated using at least one of a halo effect of highlighting the partial image, a blur effect of reducing a difference between pixel values of the partial image, a size effect of changing the size of the partial image, and a depth effect of changing depth information of the partial image.

The effect image may be obtained by combining a partial image of the second image with the region of interest of the first image, wherein the partial image corresponds to the first identification information.

The first image may be a live view image.

The second image may be a temporary image generated from the live view image before a user input for storing an image is received.

The temporary image may be generated every time a sufficient change occurs in a partial image of the live view image, wherein the partial image corresponds to the first identification information, and wherein the sufficient change is a change associated with a value equal to or greater than a reference value.

The effect image may be a moving picture, and the effect image includes the first image and the second image.

According to another aspect of an exemplary embodiment, a mobile device may include a display configured to display a first image including an object and a background; a user input configured to receive a user input selecting the object or the background as a region of interest; and a controller configured to acquire first identification information of the region of interest based on first attribute information of the first image, and to acquire a second image from a target image, wherein the second image includes second identification information, and the second identification information is the same as the identification information.

The controller may be configured to generate an effect image based on at least one of the first image and the second image.

The effect image may be generated by combining a partial image of the second image with a region of interest of the first image, and wherein the partial image is a portion of the second image corresponding to the first identification information.

The first attribute information may include at least one of context information associated with generation of the first image and annotation information about the first image, the annotation information being added by a user.

The controller may be configured to acquire the first identification information by generalizing the first attribute information based on WordNet.

The controller may be configured to generate the effect image by combining a partial image of the second image with a region of interest of the first image, wherein the partial image is associated with the first identification information.

According to yet another aspect of an exemplary embodiment, a method of providing an image, can include receiving a first image, the first image including at least an object and a background; receiving an input selecting the object or the background as a region of interest; determining identification information associated with the region of interest; searching a plurality of target images using the identification information; selecting a second image, the second image being associated with the identification information; and generating at least one effect image by applying an effect to at least one of the first image or the second image.

Generating at least one effect image may include at least one of applying the effect to the region of interest, or combining the first image with the second image.

Generating at least one effect image may include generating a first effect image by applying the effect to the region of interest, and generating a second effect image by applying the effect to the second image, and the method further comprises storing the first effect image and the second effect image.

Determining the identification information may include generating the identification information using one or more attributes of the first image.

Generating the identification information using one or more attributes of the first image may include generating the one or more attributes of the first image by performing image analysis on the first image.

BRIEF DESCRIPTION OF THE DRAWINGS

These and/or other aspects will become apparent and more readily appreciated from the following description of the exemplary embodiments, taken in conjunction with the accompanying drawings in which:

FIG. 16 illustrates attribute information of an image according to an exemplary embodiment;

FIGS. 26A-26C illustrate an example of providing an effect to an object by using a plurality of images, according to an exemplary embodiment;

FIGS. 28A-28C illustrate an example of providing an effect to a background by using a plurality of images, according to an exemplary embodiment;

DETAILED DESCRIPTION

Figure 1:
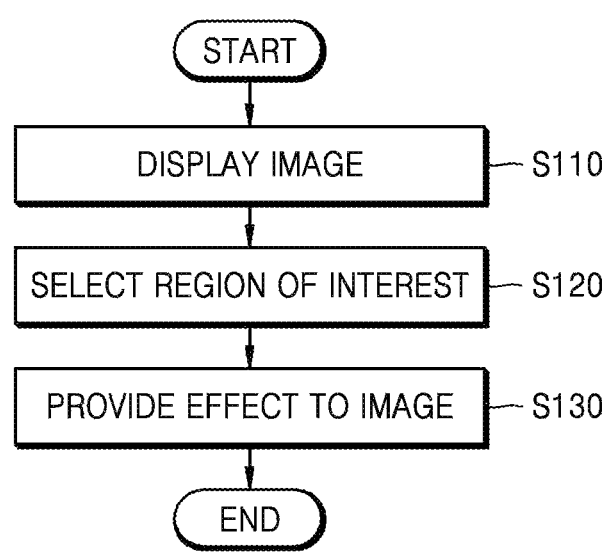
FIG. 1 is a flowchart of a method of providing an effect to an image, according to an exemplary embodiment.

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Although general terms widely used at present were selected for describing the present invention in consideration of the functions thereof, these general terms may vary according to intentions of one of ordinary skill in the art, case precedents, the advent of new technologies, and the like. Terms arbitrarily selected by the present applicant may also be used in a specific case. In this case, their meanings need to be given in the detailed description of the present specification. Hence, the terms must be defined based on their meanings and the content of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

Throughout the specification, "image" may include an object and a background. The object is a partial image that may be distinguished from the background with a contour line via image processing or the like, and the object may be, for example, a human, an animal, a building, a vehicle, or the like. The background is a partial image except for the object. Partial images that may be an object and a background are not fixed but may be relative. For example, in an image including a human, a vehicle, and the sky, the human and the vehicle may be objects, and the sky may be a background. In an image including a human and a vehicle, the human may be an object, and the vehicle may be a background. However, the size of a partial image for an object may be smaller than that of a partial image for a background. Each device 100 may previously define a criterion for distinguishing an object from a background.

Throughout the specification, an image may be a still image (for example, a picture or a drawing), a moving picture (for example, a TV program image, a Video On Demand (VOD), a user-created content (UCC), a music video, or a YouTube image), a live view image, a menu image, or the like.

Throughout the specification, a region of interest may be a partial image of an image, and may be an object or a background. Providing an effect to an image is a type of image editing, and denotes providing a region of interest entirely differently from a previously-provided region of interest. Providing an image denotes display, reproduction, storage, or the like of an image.

An image system that provides an effect to an image will now be described. The image system may include a device 100 capable of reproducing and storing an image, and may further include a server that stores the image. A case where an image system includes a server will be described in detail later.

The device 100 according to an exemplary embodiment may be a device capable of displaying an image and providing an effect to the image. The device 100 according to an exemplary embodiment may be realized in various types. For example, the device 100 may be a desktop computer, a mobile phone, a smartphone, a laptop computer, a tablet personal computer (PC), an e-book terminal, a digital broadcasting terminal, a personal digital assistant (PDA), a portable multimedia player (PMP), a navigation, an MP3 player, a digital camera, an Internet Protocol television (IPTV), a digital television (DTV), a consumer electronics (CE) apparatus (e.g., a refrigerator and an air-conditioner each including a display), or the like, but exemplary embodiments are not limited thereto. The device 100 may also be a device that is wearable by users. For example, the device 100 may be a watch, eyeglasses, a ring, a bracelet, a necklace, or the like.

FIG. 1 is a flowchart of a method of providing an effect to an image, according to an exemplary embodiment.

In operation S110, the device 100 may display an image. The image may include an object and a background, and may be a still image, a moving picture, a live view image, a menu image, or the like.

According to an exemplary embodiment, an image displayed on the device 100 may be a still image, a moving picture, or a menu image that is stored in a memory built in the device 100, may be a live view image captured by a camera 160 built in the device 100, may be a still image, a moving picture, or a menu image stored in an external device (for example, a portable terminal used by another user, a social networking service (SNS) server, a cloud server, or a web server), or may be a live view image captured by the external device.

In operation S120, the device 100 may select a region of interest. The region of interest is a partial image of the displayed image, and may be the object or the background. For example, the device 100 may select one object from among a plurality of objects as the region of interest, or may select at least two objects from among the plurality of objects as the region of interest. Alternatively, the device 100 may select the background of the image as the region of interest.

According to an exemplary embodiment, the device 100 may select the region of interest, based on a user input. For example, the device 100 may receive a user input of selecting a partial region on the image, and determine an object or background including the selected partial region as the region of interest.

According to an exemplary embodiment, a user input of selecting a region of interest may vary. In the present specification, a user input may be a key input, a touch input, a motion input, a bending input, a voice input, multiple inputs, or the like.

"Touch input" denotes a gesture or the like that a user makes on a touch screen to control the device 100. Examples of the touch input may include tap, touch & hold, double tap, drag, panning, flick, and drag & drop.

"Tap" denotes an action of a user touching a screen with a fingertip or a touch tool (e.g., an electronic pen) and then very quickly lifting the fingertip or the touch tool from the screen without moving.

"Touch & hold" denotes an action of a user maintaining a touch input for more than a critical time period (e.g., two seconds) after touching a screen with a fingertip or a touch tool (e.g., an electronic pen). For example, this action indicates a case in which a time difference between a touching-in time and a touching-out time is greater than the critical time period (e.g., two seconds). To allow the user to determine whether a touch input is a tap or a touch & hold, when the touch input is maintained for more than the critical time period, a feedback signal may be provided visually, audibly, or tactually. The critical time period may vary according to exemplary embodiments.

"Double tap" denotes an action of a user quickly touching a screen twice with a fingertip or a touch tool (e.g., an electronic pen).

"Drag" denotes an action of a user touching a screen with a fingertip or a touch tool and moving the fingertip or touch tool to other positions on the screen while touching the screen. Due to a drag action, an object may move, or a panning action which will be described below may be performed.

"Panning" denotes an action of a user performing a drag action without selecting any object. Since a panning action does not select a specific object, no object moves in a page. Instead, the whole page may move on a screen or a group of objects may move within a page.

"Flick" denotes an action of a user performing a drag action at a critical speed (e.g., 100 pixels/second) with a fingertip or a touch tool. A flick action may be differentiated from a drag (or panning) action, based on whether the speed of movement of the fingertip or the touch tool is greater than the critical speed (e.g., 100 pixels/second).

"Drag & drop" denotes an action of a user dragging and dropping an object to a predetermined location within a screen with a fingertip or a touch tool.

"Pinch" denotes an action of a user touching a screen with a plurality of fingertips or touch tools and widening or narrowing a distance between the plurality of fingertips or touch tools while touching the screen. "Unpinching" denotes an action of the user touching the screen with two fingers, such as a thumb and a forefinger and widening a distance between the two fingers while touching the screen, and "pinching" denotes an action of the user touching the screen with two fingers and narrowing a distance between the two fingers while touching the screen. A widening value or a narrowing value may be determined according to a distance between the two fingers.

"Swipe" denotes an action of a user moving a certain distance while touching an object on a screen with a fingertip or a touch tool.

"Motion input" denotes a motion that a user applies to the device 100 to control the device 100. For example, the motion input may be an input of a user rotating the device 100, tilting the device 100, or moving the device 100 horizontally or vertically. The device 100 may sense a motion input that is preset by a user, by using an acceleration sensor, a tilt sensor, a gyro sensor, a 3-axis magnetic sensor, or the like.

"Bending input" denotes an input of a user bending a portion of the device 100 or the whole device 100 to control the device 100 when the device 100 is a flexible display device. According to an exemplary embodiment, the device 100 may sense, for example, a bending location (coordinate value), a bending direction, a bending angle, a bending speed, the number of times being bent, a point of time when bending occurs, and a period of time during which bending is maintained, by using a bending sensor.

"Key input" denotes an input of a user controlling the device 100 by using a physical key attached to the device 100.

"Multiple inputs" denotes a combination of at least two input methods. For example, the device 100 may receive a touch input and a motion input from a user, or receive a touch input and a voice input from the user. Alternatively, the device 100 may receive a touch input and an eyeball input from the user. The eyeball input denotes an input of a user adjusting eye blinking, a staring location, an eyeball movement speed, or the like in order to control the device 100.

For convenience of explanation, a case where a user input is a key input or a touch input will now be described.

According to an exemplary embodiment, the device 100 may receive a user input of selecting a preset button. The preset button may be a physical button attached to the device 100 or a virtual button having a graphical user interface (GUI) form. For example, when a user selects both a first button (for example, a Home button) and a second button (for example, a volume control button), the device 100 may select a partial area on the screen.

The device 100 may receive a user input of touching a partial area of an image displayed on the screen. For example, the device 100 may receive an input of touching a partial area of a displayed image for a predetermined time period (for example, two seconds) or more or touching the partial area a predetermined number of times or more (for example, double tap). Then, the device 100 may determine an object or a background including the touched partial area as the region of interest. In other words, the device 100 may select the region of interest.

The device 100 may determine the region of interest from the image. The device 100 may determine the region of interest from the image, by using image analysis information. For example, the device 100 may detect a contour line of an object displayed on the touched area. The device 100 may compare the contour line of the object included in the image with a predefined template and detect the type, name, and the like of the object. For example, when the contour line of the object is similar to a template of a vehicle, the device 100 may recognize the object included in the image as a vehicle and determine a vehicle image as the region of interest.

According to an exemplary embodiment, the device 100 may perform face recognition on the object included in the image. Examples of a face detecting method may include knowledge-based methods, feature-based methods, template-matching methods, and appearance-based methods, but exemplary embodiments are not limited thereto.

Face features (for example, the shapes of the eyes, the nose, and the mouth being major parts of a face) may be extracted from a detected face. To extract face features from a face, a gabor filter or a local binary pattern (LBP) may be used, but exemplary embodiments are not limited thereto.

Alternatively, the device 100 may extract visual features, such as a color arrangement, a pattern, and an atmosphere of an image, as the image analysis information by comparing a certain area of the image with a color map (color histogram).

In operation S130, the device 100 provides an effect to the image. The device 100 may provide an effect to the region of interest of the image in order to provide the region of interest entirely differently from a previously-displayed region of interest. The effect may be provided in various ways.

Figure 2:
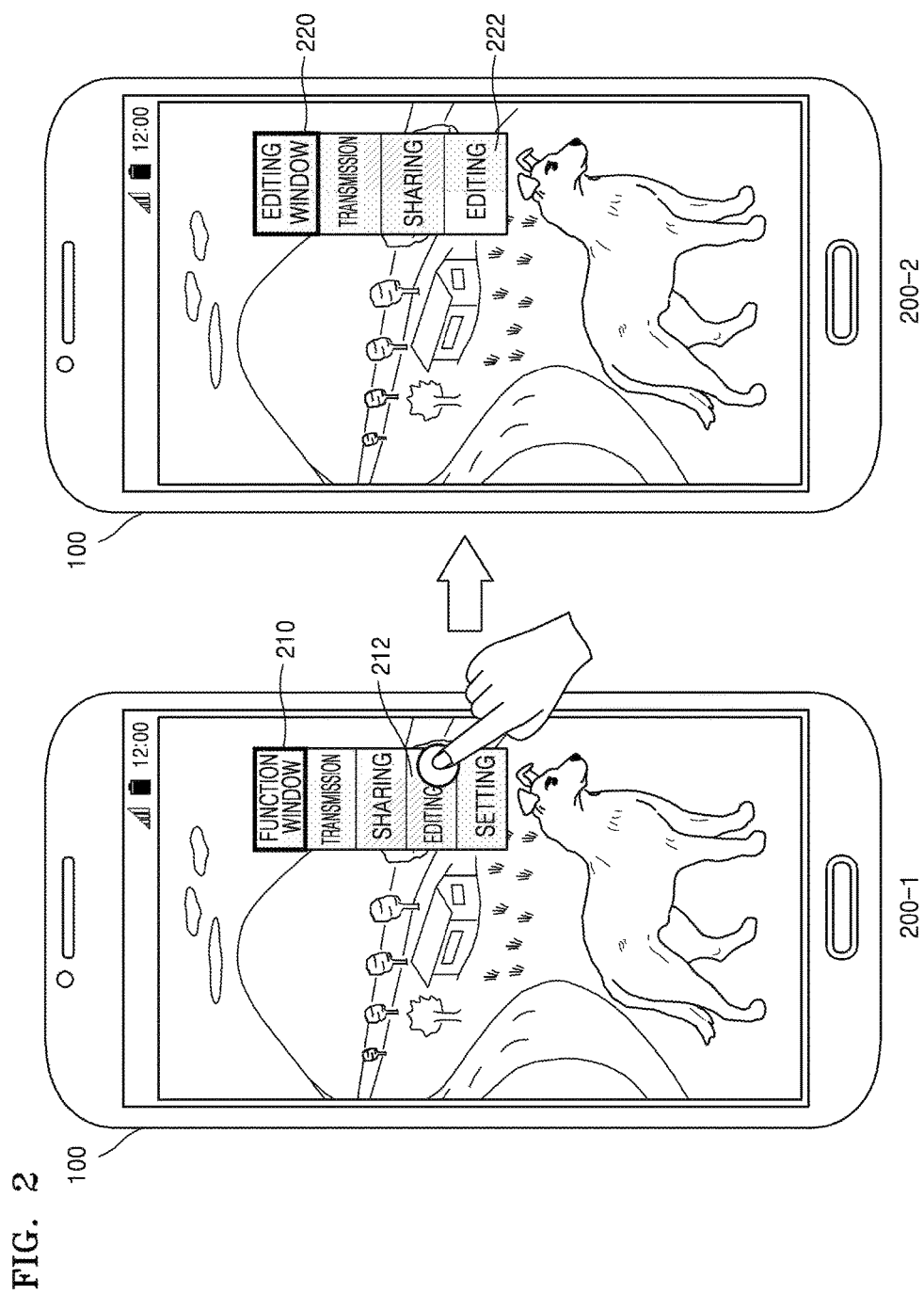
FIG. 2 illustrates a graphical user interface (GUI) for providing an effect to an image, according to an exemplary embodiment.

FIG. 2 illustrates a GUI for providing an effect, according to an exemplary embodiment.

As shown in 200-1 of FIG. 2, the device 100 may display an arbitrary screen image. Examples of the arbitrary screen image may include a still image displayed by executing a picture album application, a live view image displayed by executing a photographing application, a moving picture frame within a moving picture displayed by executing a moving picture album application, and a menu image including menu items for executing an application. The device 100 may provide a function window 210 regarding functions that may be used on the arbitrary screen image.

The function window 210 may provide various items that represent functions that may be used on the arbitrary screen image. A user may select an 'editing' item from the function window 210. When a user selects an 'editing' item 212 on the function window 210, the device 100 may provide an editing window 220 including various editing items, as shown in 200-2 of FIG. 2. The function window 210 and the editing window 220 may be GUIs.

Referring to 200-2 of FIG. 2, the device 100 may display the editing window 220 on the screen image in order to determine an editing method. When the user selects an 'effect editing' item 212 on the editing window 220, the device 100 may provide an effect of displaying a partial image of an image entirely differently from an existing partial image.

An example of providing an effect to an image will now be described in detail.

Figure 3:
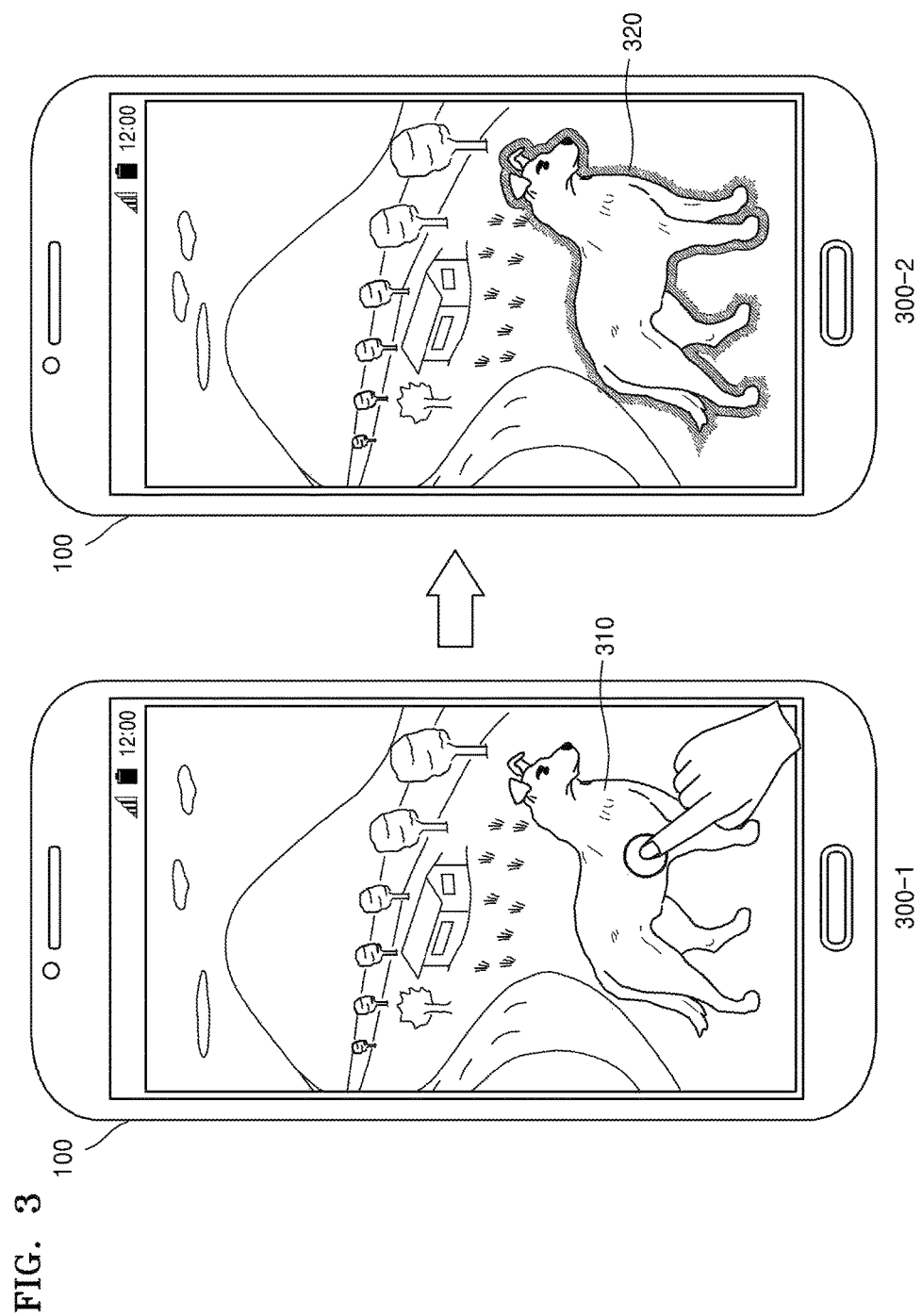
FIG. 3 is a reference view for explaining a method of providing a halo effect to an object, according to an exemplary embodiment.

FIG. 3 is a reference view for explaining a method of providing a halo effect to an object, according to an exemplary embodiment. As shown in 300-1 of FIG. 3, the device 100 may display at least one image while a specific application, for example, a picture album application, is being executed. The device 100 may receive a user input selecting an object 310 on the at least one image as a region of interest. A user may select an area where the object 310 is displayed, via a tap action of touching the area where the object 310 is displayed with a finger or a touch tool and then quickly lifting the finger or the touch tool without moving the finger. The device 100 may distinguish the object displayed on the touched area from the image by using a graph cutting method, a level setting method, or the like. The device 100 may determine the object 310 as the region of interest.

As shown in 300-2 of FIG. 3, the device 100 may display an object 320 that is entirely different from the object 310 displayed on 300-1 of FIG. 3, by entirely highlighting the object 310 in response to a selection of the user. Image processing in which a region of interest is entirely highlighted compared with a pre-displayed region of interest may be referred to as a halo effect. The contour line of the region of interest may be highlighted, or the entire region of interest may be highlighted.

Figure 4:
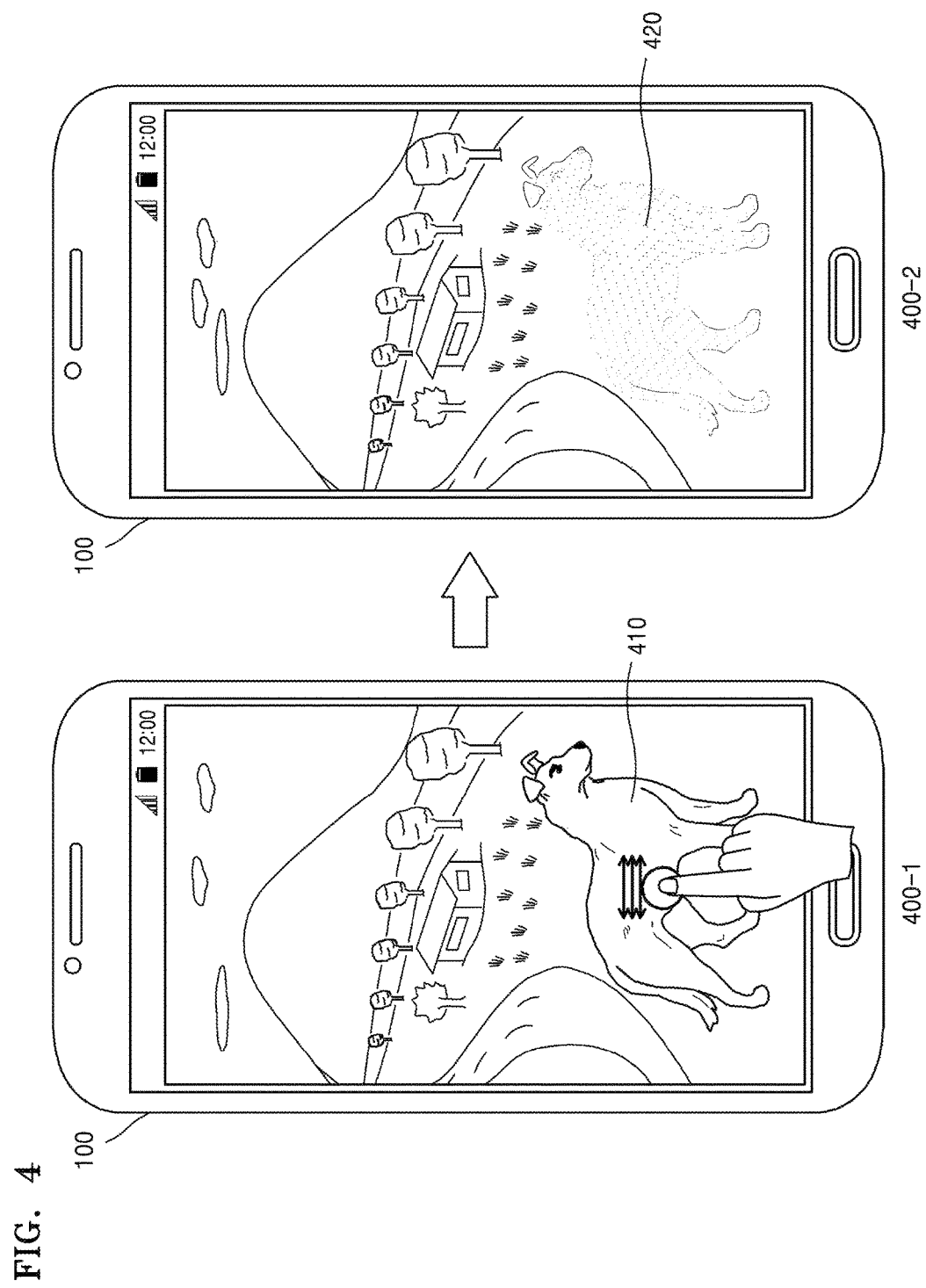
FIG. 4 is a reference view for explaining a method of providing a blur effect to an object, according to an exemplary embodiment.

FIG. 4 is a reference view for explaining a method of providing a blur effect to an object, according to an exemplary embodiment. As shown in 400-1 of FIG. 4, the device 100 may display at least one image while a specific application, for example, a picture album application, is being executed. The device 100 may receive a user input selecting an object 410 on the at least one image. A user may select the object 410 via a swipe action of horizontally moving a certain distance while touching an area on which the object 410, which is a region of interest, is displayed. Then, as shown in 400-2 of FIG. 4, the device 100 may display a blurred object 420 by reducing a difference between the values of pixels within the object 410 in response to a selection of the user. The device 100 may vary the degree of a blur effect according to a swiping time period or the number of swipes. For example, as the swiping time period or the number of swipes increases, the degree of a blur effect may increase.

Figure 5:
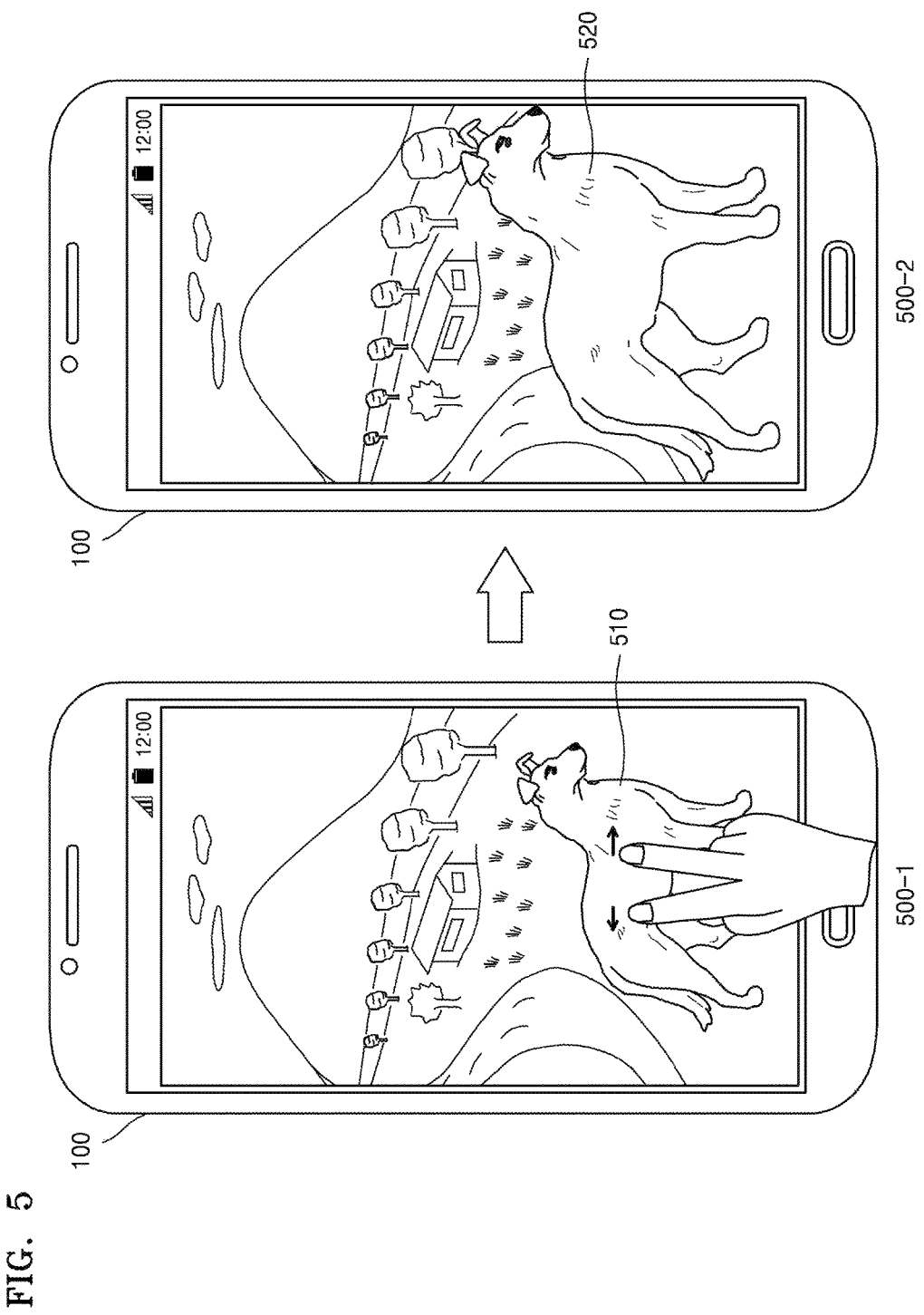
FIGS. 5 and 6 are reference views for explaining a method of providing a size effect to an object, according to an exemplary embodiment.
Figure 6:
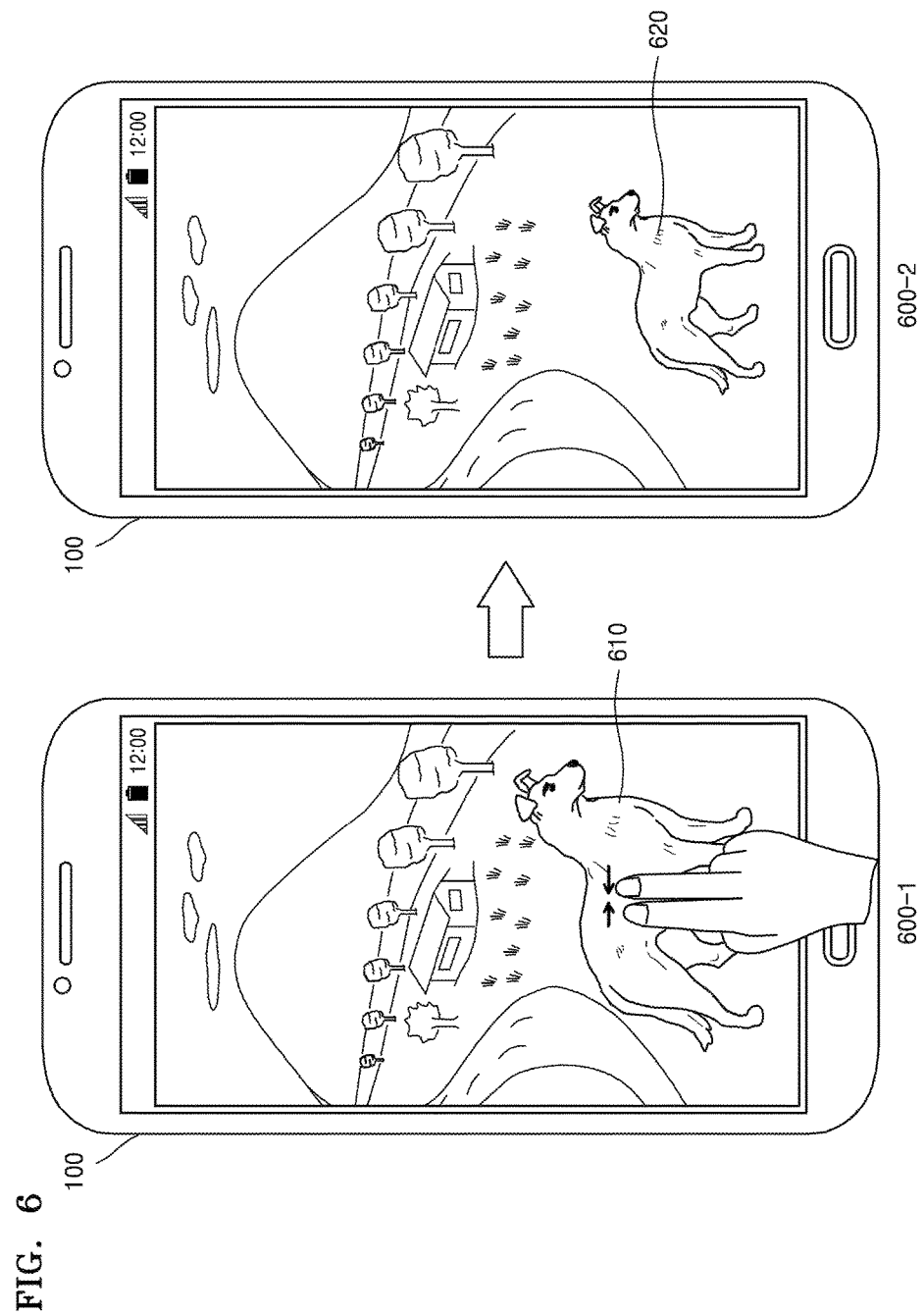

FIGS. 5 and 6 are reference views for explaining a method of providing a size effect to an object, according to an exemplary embodiment.

As shown in 500-1 of FIG. 5, the device 100 may display at least one image while a specific application, for example, a picture album application, is being executed. The device 100 may receive a user input selecting an object 510 on the at least one image. For example, a user may select the object 510 via an unpinching action of widening a distance between two fingers while touching an area on which the object 510, which is a region of interest, is displayed, with the two fingers. Then, the device 100 may display a magnified object 520 in response to the selection of the object 510, as shown in 500-2 of FIG. 5. The selected object 510 is magnified, whereas the sizes of unselected objects and a background do not change. Magnification may depend on a variation in the distance between two fingers.

As shown in 600-1 of FIG. 6, the device 100 may display at least one image while a specific application, for example, a picture album application, is being executed. The device 100 may receive a user input selecting an object 610 on the at least one image. For example, a user may select the object 610 via a pinching action of narrowing a distance between two fingers while touching an area on which the object 610, which is a region of interest, is displayed, with the two fingers. Then, the device 100 may display a size-reduced object 620 in response to the selection of the object 610, as shown in 600-2 of FIG. 6. The size of the selected object 610 is reduced, whereas the sizes of unselected objects and a background do not change. However, a space generated between the selected object and the other area due to reducing the size of the selected object may be filled with unselected objects and the background by using, for example, a mirroring technique. Size reduction may depend on a variation in the distance between two fingers.

Figure 7:
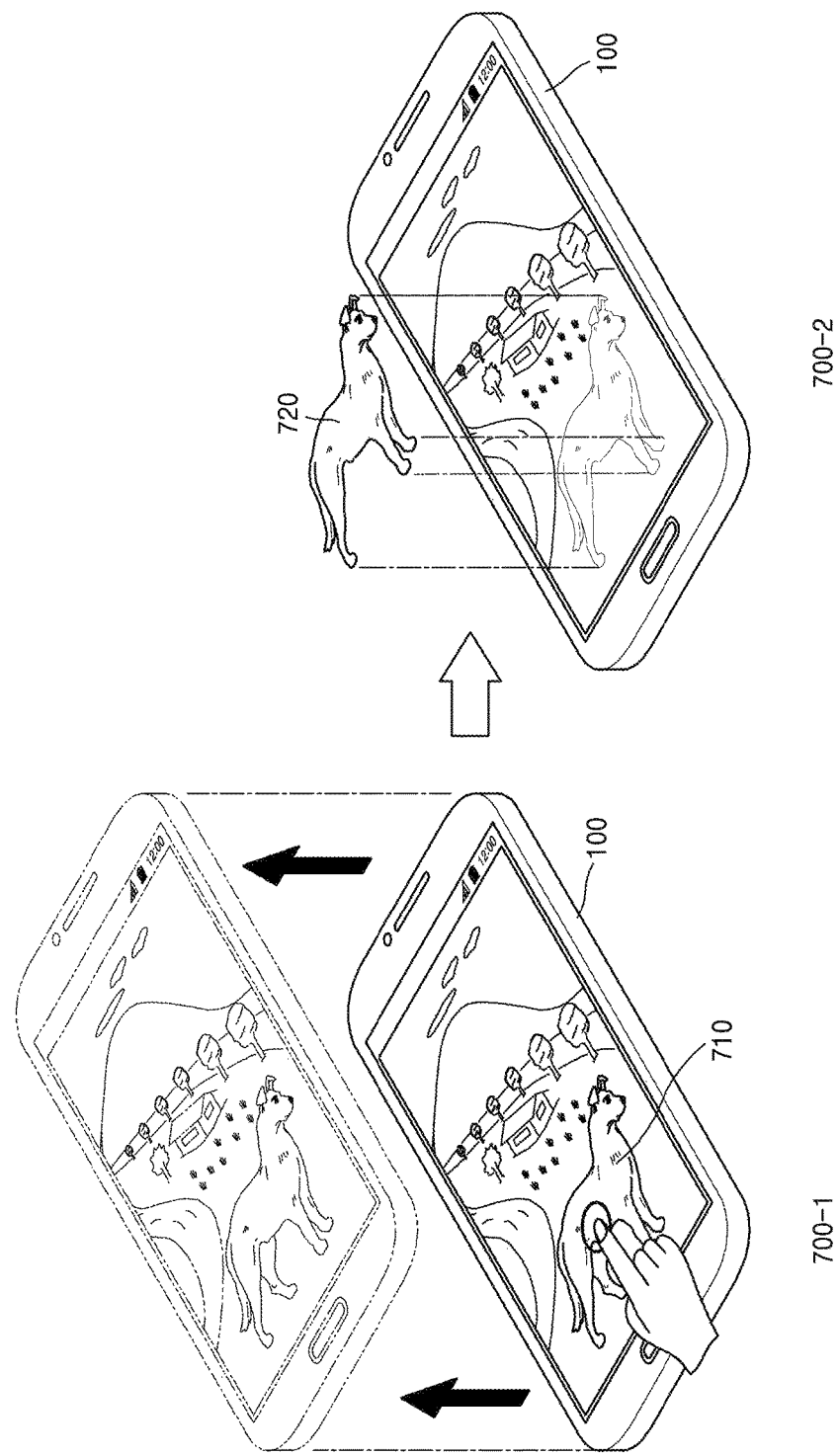
FIGS. 7 and 8 are reference views for explaining a method of providing a depth effect to an object, according to an exemplary embodiment.
Figure 8:
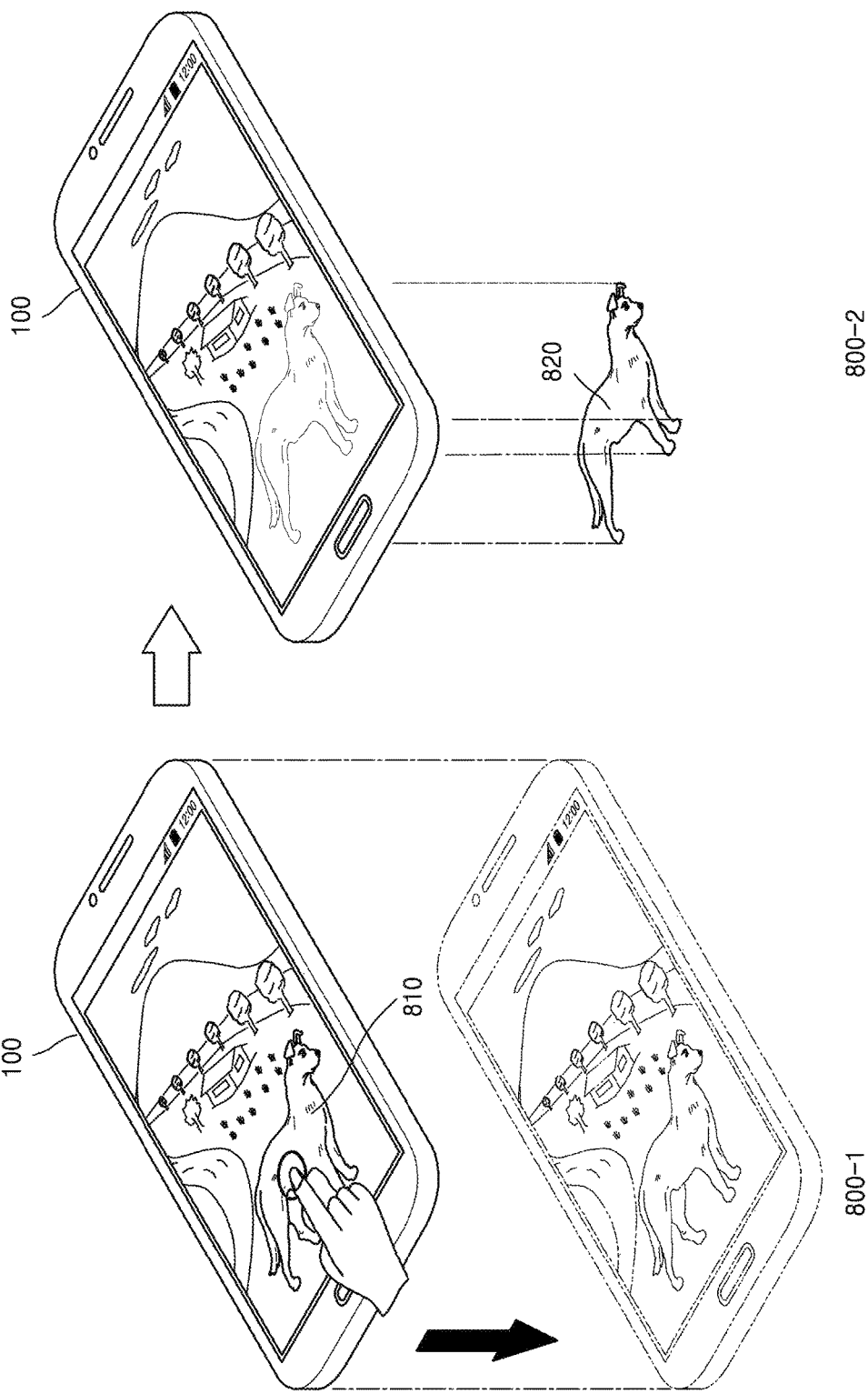

Effect provision may be adjustment or generation of a depth of a region of interest. FIGS. 7 and 8 are reference views for explaining a method of providing a depth effect to an object, according to an exemplary embodiment. As shown in 700-1 of FIG. 7, the device 100 may display at least one image while a specific application, for example, a picture album application, is being executed. The device 100 may receive a user input selecting an object 710 on the at least one image. For example, a user may select the object 710 as a region of interest, by lifting up the device 100 while touching an area on which the object 710 is displayed. Then, as shown in 700-2 of FIG. 7, in response to the selection of the object 710, the device 100 may display a depth-reduced object 720 such that the object 720 is displayed ahead of the object 710, that is, such that the user feels that the object 720 is closer than the object 710.

As shown in 800-1 of FIG. 8, the device 100 may display at least one image while a specific application, for example, a picture album application, is being executed. The device 100 may receive a user input selecting an object 810 on the at least one image. For example, a user may select the object 810 as a region of interest, by moving the device 100 down while touching an area on which the object 810 is displayed. Then, as shown in 800-2 of FIG. 8, in response to the selection of the object 810, the device 100 may display a depth-increased object 820 such that the object 820 is displayed behind the object 810, that is, such that the user feels that the object 820 is far away.

Figure 9:
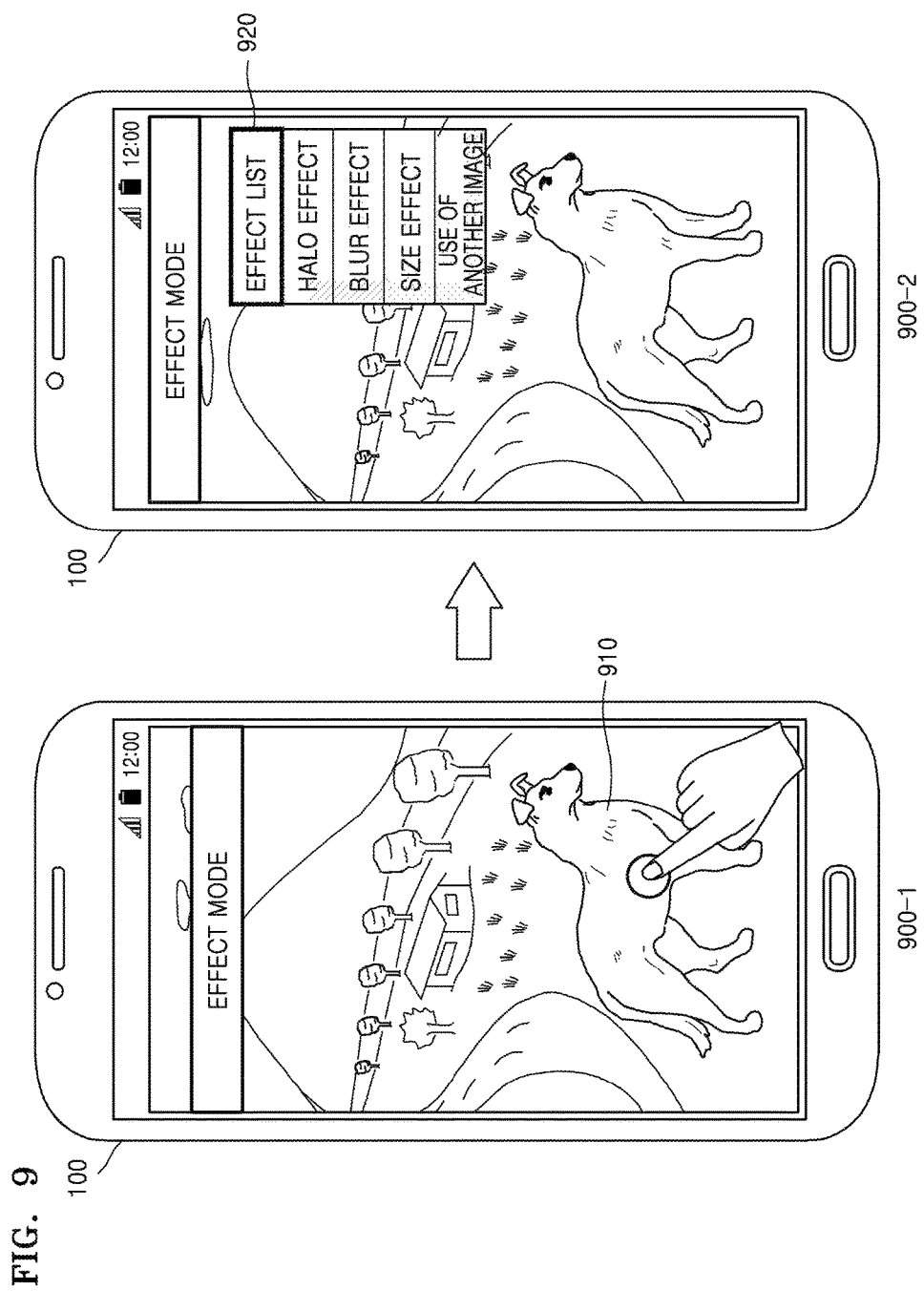
FIG. 9 is a reference view for explaining a method of displaying an effect list, according to an exemplary embodiment.

The device 100 may determine the type of effect that is to be provided, based on a gesture of the user, but may also determine the type of effect that is to be provided, based on an effect item selected by the user from a provided effect list. FIG. 9 is a reference view for explaining a method of displaying an effect list, according to an exemplary embodiment.

As shown in 900-1 of FIG. 9, the device 100 may display an image while a mode of the device 100 is set as an effect mode. A user may select a partial area of the image on which an object 910 is displayed. Then, the device 100 may determine the object 910 as a region of interest and display an effect list 920 regarding effects that are applicable to the region of interest, as shown in 900-2 of FIG. 9.

The effect list 920 may be displayed in the form of a pop-up window, and effect items included in the effect list 920 may be displayed in the form of text. The effect items may include, for example, a halo effect of highlighting a region of interest, a blur effect of reducing a difference between the values of the pixels of the region of interest, a size effect of adjusting the size of the region of interest, and a depth effect of adjusting a depth of the region of interest. A user may select one from among the effect items, and the device 100 may provide an effect to the region of interest in response to a user input.

A method of selecting an object and providing an effect to the selected object has been described up to now. However, the device 100 may provide an identical effect to a plurality of objects or provide different effects to at least two of the plurality of objects.

Figure 10:
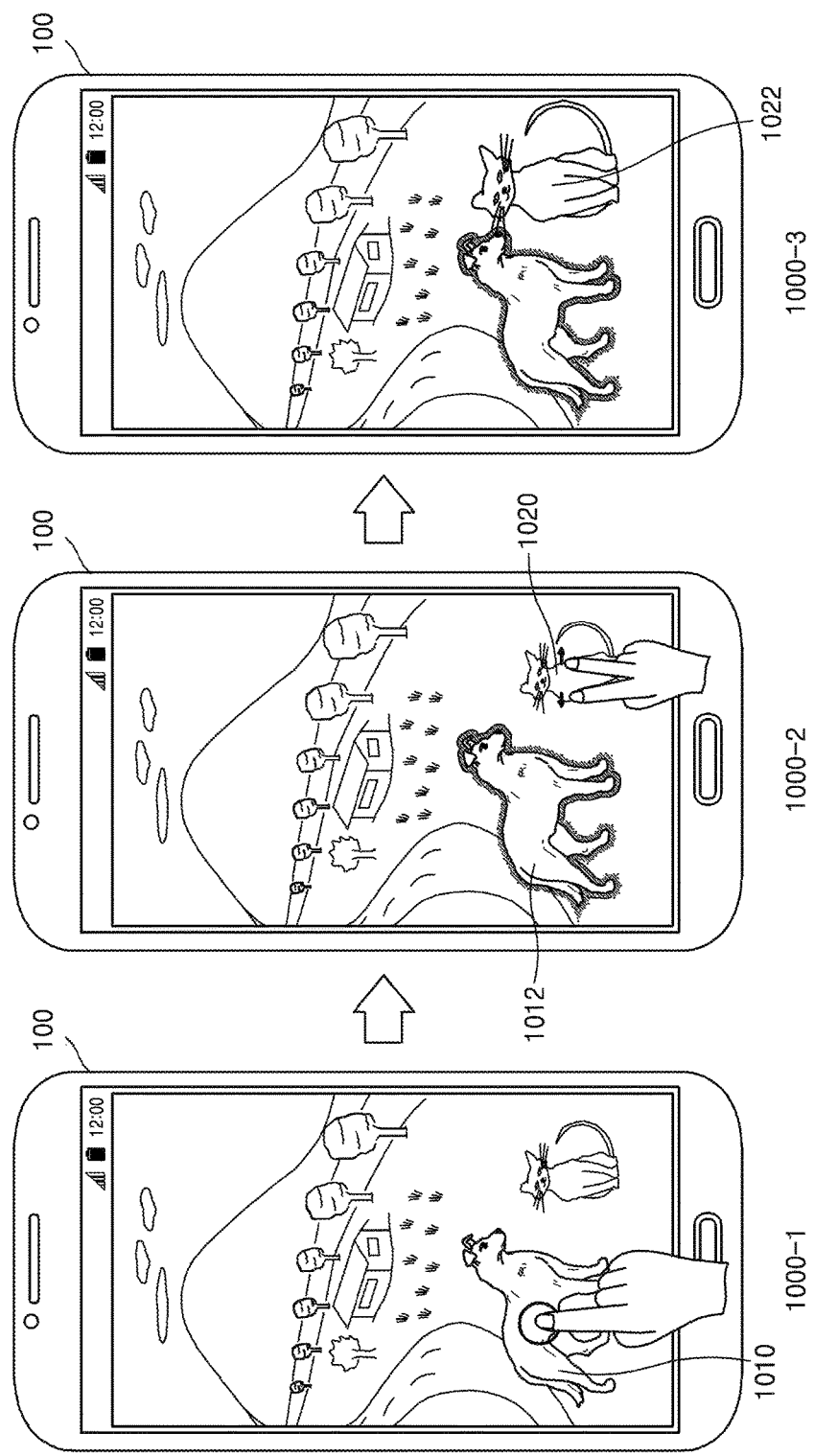
FIG. 10 is a reference view for explaining a method of providing an effect to a plurality of objects within an image, according to an exemplary embodiment.

FIG. 10 is a reference view for explaining a method of providing an effect to a plurality of objects within an image, according to an exemplary embodiment. As shown in 1000-1 of FIG. 10, the device 100 may display at least one image while a specific application, for example, a picture album application, is being executed. The device 100 may receive a user input selecting a first object 1010 as a region of interest on the at least one image. For example, a user may touch a partial area of the at least one image on which the first object 1010 is displayed. Then, the device 100 may determine that a user input selecting the first object 1010 as the region of interest has been received, and may display a first object 1012 with a halo effect, as shown in 1000-2 of FIG. 10. The device 100 may receive a user input selecting a second object 1020 as a region of interest on the at least one image. For example, the user may input a command for selecting the second object 1020, via an unpinching action of widening a distance between two fingers while touching an area on which the second object 1020 is displayed, with the two fingers. Then, the device 100 may magnify the second object 1020 in response to the selection of the second object 1020, and display a magnified second object 1022, as shown in 1000-3 of FIG. 10.

Figure 11:
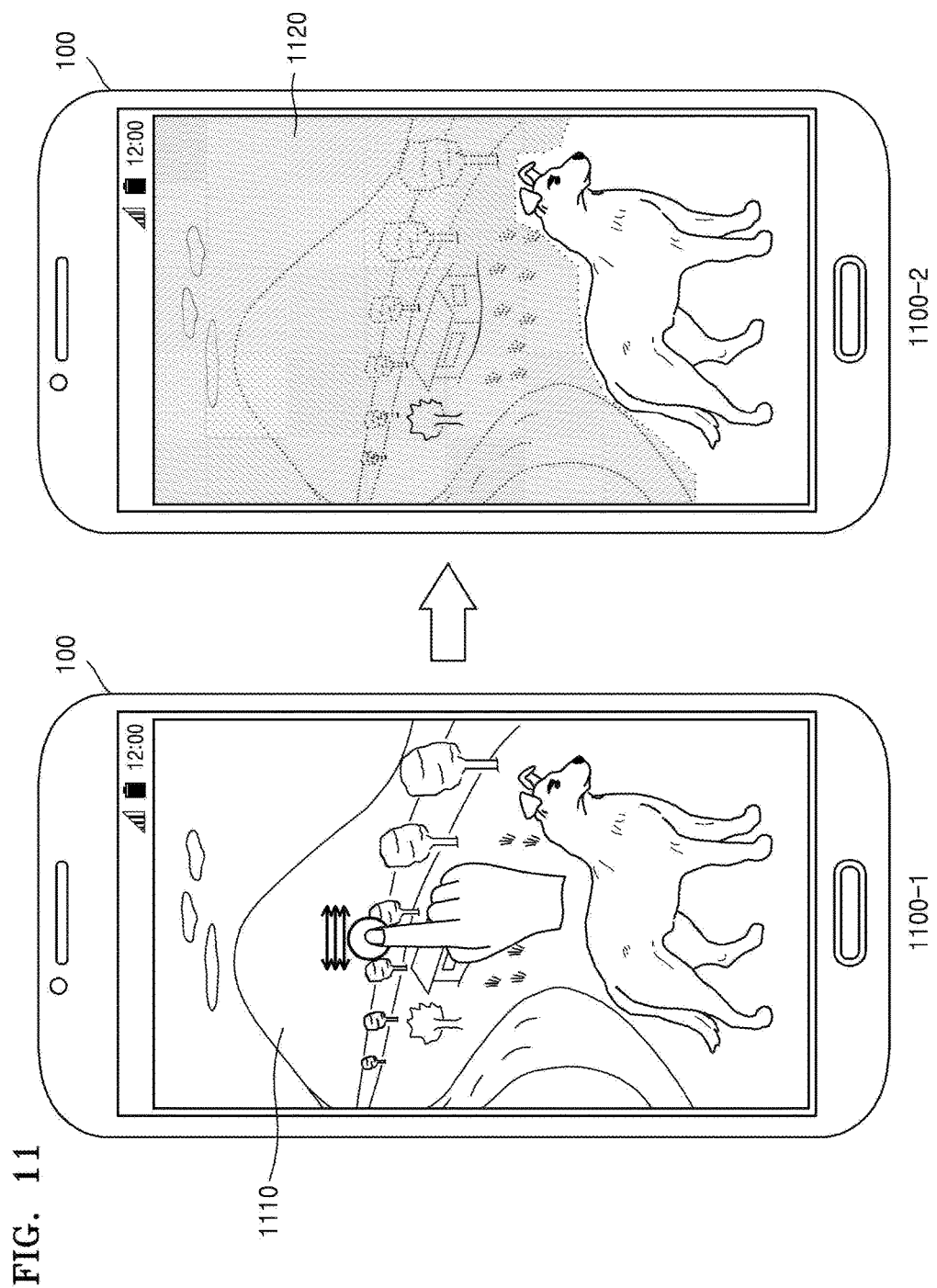
FIG. 11 is a reference view for explaining a method of providing an effect to a background, according to an exemplary embodiment.

Effect provision may be applied to not only an object in an image but also a background therein. FIG. 11 is a reference view for explaining a method of providing an effect to a background, according to an exemplary embodiment. The device 100 may display at least one image while a specific application, for example, a picture album application, is being executed. As shown in 1100-1 of FIG. 11, the device 100 may receive a user input selecting a background 1110 as a region of interest on the at least one image. A user may select the background 1110 by touching and swiping a partial area of the at least one image on which the background 1110 is displayed. Then, as shown in 1100-2 of FIG. 11, the device 100 may provide a blur effect by reducing a difference between the values of the pixels within the background 1110 in response to the selection of the background 1110, and may display a blurred background 1120. Other types of effect allowing a background to be entirely differently displayed compared with a previous background may also be applied, in addition to the blur effect.

Figure 12A:
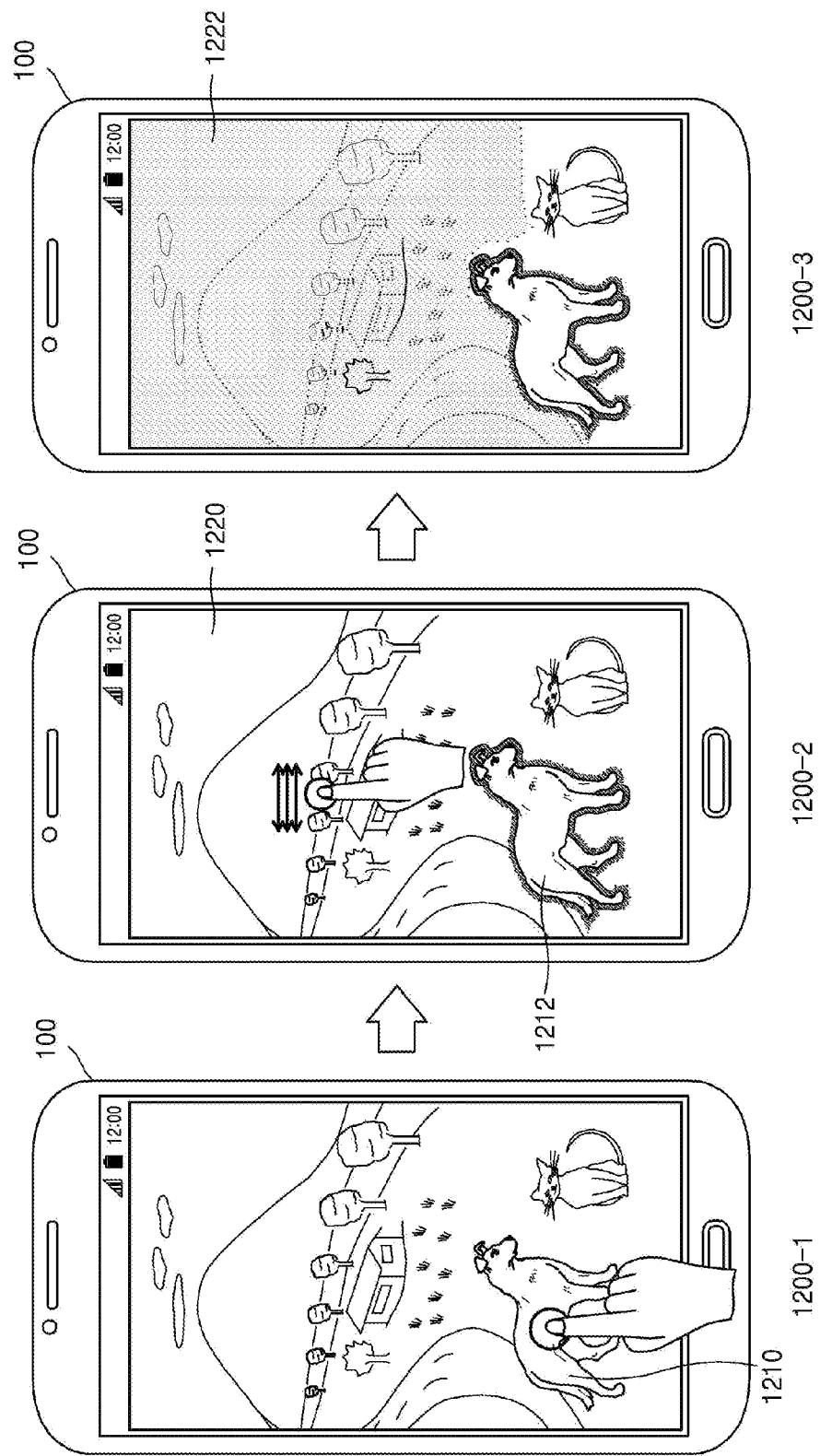
FIG. 12A is a reference view for explaining a method of providing an effect to both an object and a background, according to an exemplary embodiment.

An effect may be provided to both a background and an object. FIG. 12A is a reference view for explaining a method of providing an effect to both an object and a background, according to an exemplary embodiment. Referring to 1200-1 of FIG. 12A, the device 100 may display at least one image while a specific application, for example, a picture album application, is being executed. The device 100 may receive a user input selecting a first object 1210 as a region of interest on the at least one image. For example, a user may select the first object 1210 by touching a partial area of the at least one image on which the first object 1210 is displayed. Then, the device 100 may provide a halo effect to the first object 1210 in response to the selection of the first object 1210. The halo effect is an effect highlighting a contour line of an object selected by a user.

The device 100 may display an object 1212 with a halo effect, as shown in 1200-2 of FIG. 12A. The device 100 may receive a user input selecting a background 1220 as a region of interest on the at least one image. For example, the user may select the background 1220 by touching and then swiping a partial area of the at least one image on which the background 1220 is displayed. Then, as shown in 1200-2 of FIG. 12A, the device 100 may display a blurred background 1222 by reducing a difference between the values of the pixels within the background 1220 in response to the selection of the background 1220.

Up to now, it has been described that, when a region of interest is selected in response to a user input, a preset effect is provided. However, exemplary embodiments are not limited thereto. A user input of selecting a region of interest and a user input for providing an effect may be separate from each other. A plurality of user inputs may be consecutively received, or may be received with a time difference. A user input of selecting a region of interest and a user input for providing an effect may be identical with each other.

Figure 12B:
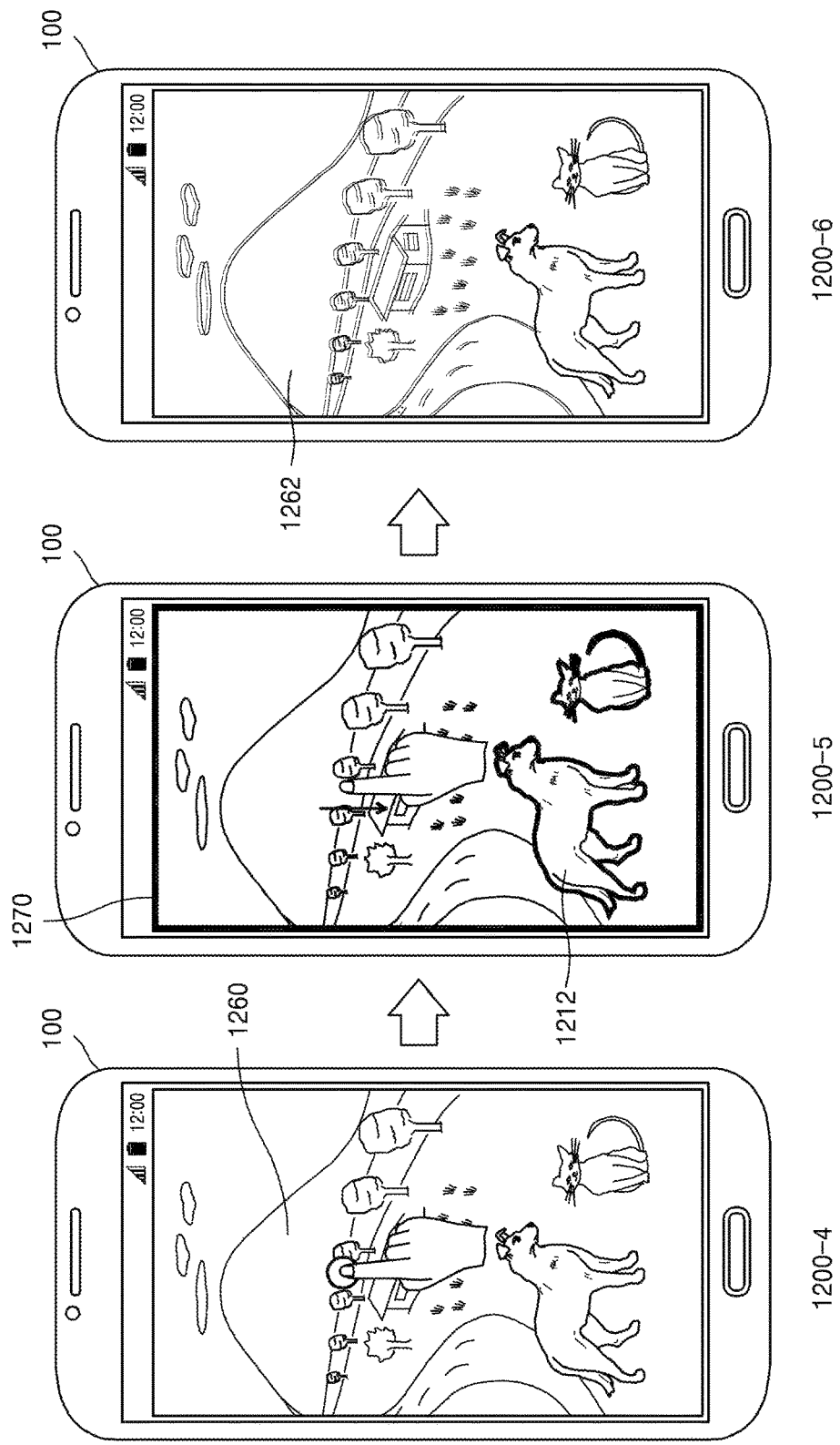
FIG. 12B is a reference view for explaining a method of providing an effect to an image in response to a plurality of user inputs, according to an exemplary embodiment.

FIG. 12B is a reference view for explaining a method of providing an effect in response to a plurality of user inputs, according to an exemplary embodiment. The device 100 may display at least one image while a specific application, for example, a picture album application, is being executed. As shown in 1200-4 of FIG. 12B, the device 100 may receive a first user input selecting a background 1260 as a region of interest on the at least one image. A user may touch a partial area of the at least one image on which the background 1260 is displayed. Then, the device 100 may receive the touch as the first user input and determine the background 1260 as the region of interest. The device 100 may separate an object from a background by detecting the contour line of the object from an image. The device 100 may determine whether the touched area is an area on which an object is displayed or an area on which a background is displayed. Since the area on which a background is displayed has been touched in 1200-4 of FIG. 12B, the device 100 may determine the background 1260 as the region of interest.

As shown in 1200-5 of FIG. 12B, the device 100 may provide an indicator 1270 of highlighting a boundary of the background 1260. The user may determine whether the region of interest has been properly selected, by checking the indicator 1270. The device 100 may selectively display the indicator 1270 according the settings of the user. The device 100 may receive a second user input of providing an effect to a background. For example, the user may drag the area on which a background is displayed, in a specific direction. The first user input and the second user input may be consecutively received. For example, the user may touch (first user input) the background 1260 and then immediately drag (second user input) the background 1260.

Then, as shown in 1200-6 of FIG. 12B, the device 100 may receive the dragging as the second user input, provide a flow effect of making the background 1260 flow in a dragging direction, and display a flowing background 1262. The flow effect is an effect of making an image to flow, and corresponds to correction of the pixel values of pixels made based on the pixel values of pixels that are previously arranged on the basis of the dragging direction.

Figure 13:
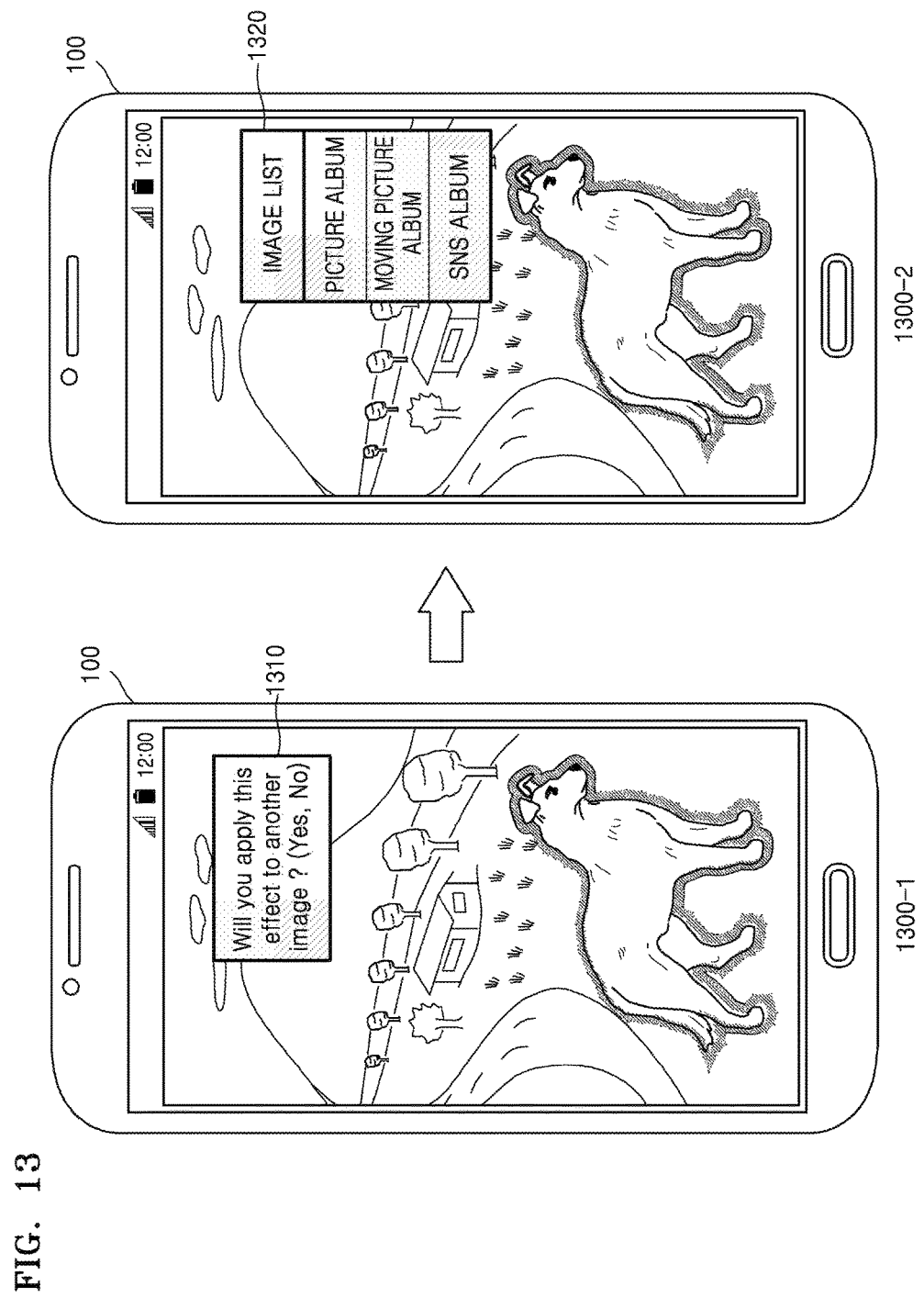
FIG. 13 illustrates GUIs for providing an effect to a plurality of images, according to an exemplary embodiment.

By editing one image, other images may be provided with an identical effect. FIG. 13 illustrates GUIs for providing an effect to a plurality of images, according to an exemplary embodiment. Referring to 1300-1 of FIG. 13, the device 100 has provided an effect to an object of an image in response to a user input. The device 100 may display an inquiry window 1310 of inquiring whether the same effect is to be provided to other images.

The device 100 may receive a user input requesting the same effect to be applied to other images. For example, a user may touch an area of the inquiry window 1310 on which 'Yes' is displayed. Then, in response to the user input, the device 100 may display a list 1320 of images to which an effect may be applied, as shown in 1300-2 of FIG. 13. When the user selects a specific image from the list 1320, the device 100 may provide the same effect to the selected image.

For convenience of explanation, an image that is reviewed to determine whether an image may be provided with an effect will now be referred to as a target image. An image used to select a region of interest is referred to as a first image, and an image to which an effect is provided or which is used for effect provision from among target images is referred to as a second image.

The device 100 may search for or acquire the second image from among the target images in order to provide an effect to the second image. The device 100 may search for the second image by using identification information used to identify a region of interest, namely, an object or a background, of the first image.

'Identification information' denotes a key word, a key phrase, or the like that identifies an image, and the identification information may be defined for each object and each background. The object and the background may each have at least one piece of identification information. According to an exemplary embodiment, the identification information may be acquired using attribute information of an image or image analysis information of the image.

Figure 14:
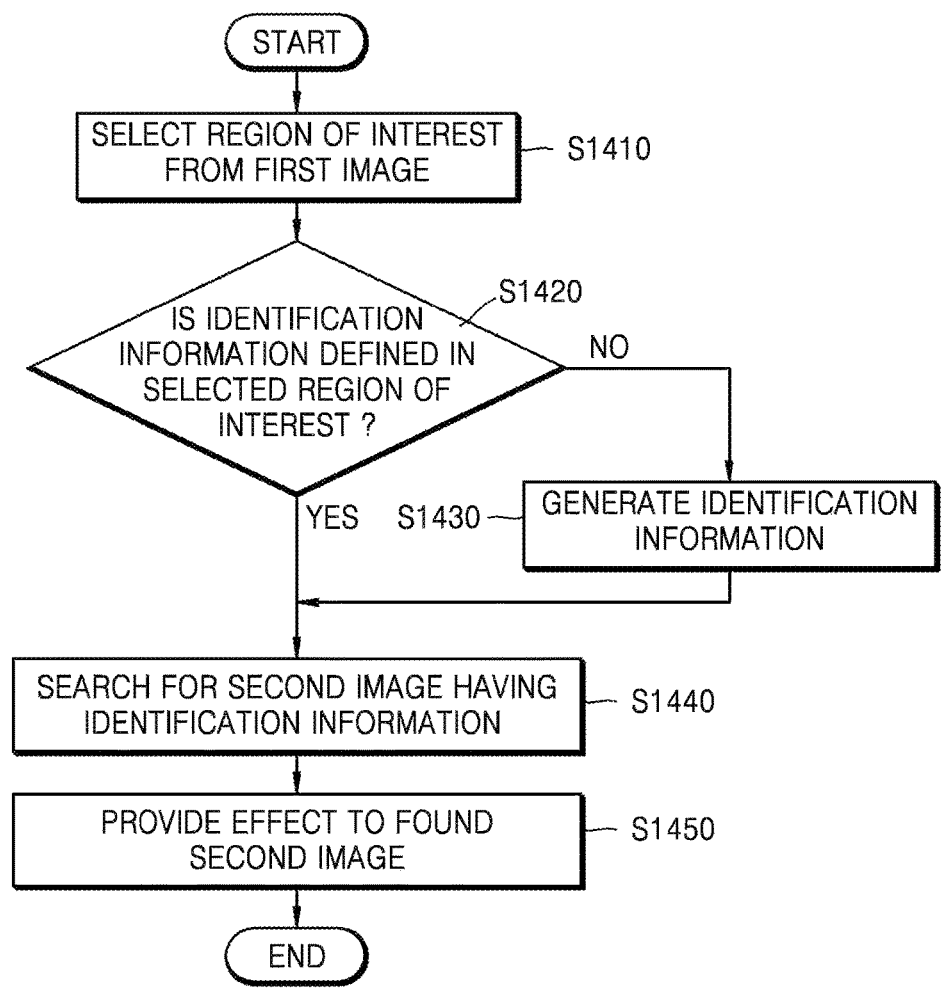
FIG. 14 is a flowchart of a method in which a device provides an effect to a second image by using identification information of a first image, according to an exemplary embodiment.

FIG. 14 is a flowchart of a method in which the device 100 provides an effect to a second image by using identification information of a first image, according to an exemplary embodiment.

In operation S1410, the device 100 may select a region of interest from the first image. For example, as described above, the device 100 may display the first image and select as the region of interest an object or a background within the first image in response to a user input. The device 100 may provide an effect to the region of interest of the first image or may provide an effect to the region of interest of the first image together the second image later. The first image may be a still image, a moving picture frame which is a part of a moving picture (i.e., a still image of a moving picture), or a live view image. When the first image is a still image or a moving picture frame of a moving picture, the still image or the moving picture may be an image pre-stored in the device 100, or may be an image stored in and transmitted from an external device. When the first image is a live view image, the live view image may be an image captured by the camera built in the device 100, or an image captured and transmitted by a camera which is an external device.

In operation S1420, the device 100 may determine whether identification information is defined in the selected region of interest. For example, when an image is stored, pieces of identification information respectively describing an object and a background included in the image may be matched with the image and stored. In this case, the device 100 may determine that identification information is defined in the selected region of interest. According to an exemplary embodiment, pieces of identification information respectively corresponding to an object and a background may be stored in the form of metadata for each image.

In operation S1430, if no identification information is defined in the selected region of interest, the device 100 may generate identification information. For example, the device 100 may generate identification information by using attribute information stored in the form of metadata or by using image analysis information that is acquired by performing image processing on an image. Operation S1430 will be described in greater detail below with reference to FIG. 15.

In operation S1440, the device 100 may search for a second image having the identification information from a target image. The target image may be, for example, a still image or moving picture stored in the device 100 according to a user input, or a still image or moving picture stored in the external device. When the second image is searched for from moving pictures, the device 100 may search for a moving picture frame having identification information.

Identification information may be or may not be predefined in the target image. If identification information is predefined in the target image, the device 100 may search for the second image, based on whether the identification information of the target image is identical with the identification information of the region of interest. If no identification information is predefined in the target image, as in operation S1430, the device 100 may generate identification information of the target image. The device 100 may search for the second image, based on whether the generated identification information of the target image is identical with the identification information of the region of interest.

When there are a plurality of pieces of identification information for the region of interest of the first image, the device 100 may search for an image by using at least some of the plurality of pieces of identification information. Alternatively, the device 100 may provide an identification information list to the user, and thus the user may select identification information. The device 100 may receive at least one piece of identification information from the identification information list. According to an exemplary embodiment, the device 100 may receive an input of selecting all of the pieces of identification information or an input of selecting some of the pieces of identification information.

According to an exemplary embodiment, a user input of selecting identification information may vary. For example, a user input may be at least one selected from a key input, a touch input, a motion input, a bending input, a voice input, and multiple inputs.

In operation S1450, the device 100 may provide an effect to a found second image. The device 100 may distinguish a partial image corresponding to the region of interest from the second image by using the identification information, and provide the distinguished partial image with the same effect as that applied to the region of interest of the first image. In operation S1410, the device 100 may distinguish the region of interest from the first image in response to a selection by a user. In operation S1450, the device 100 may distinguish the partial image corresponding to the region of interest from the second image by using the identification information.

Figure 15:
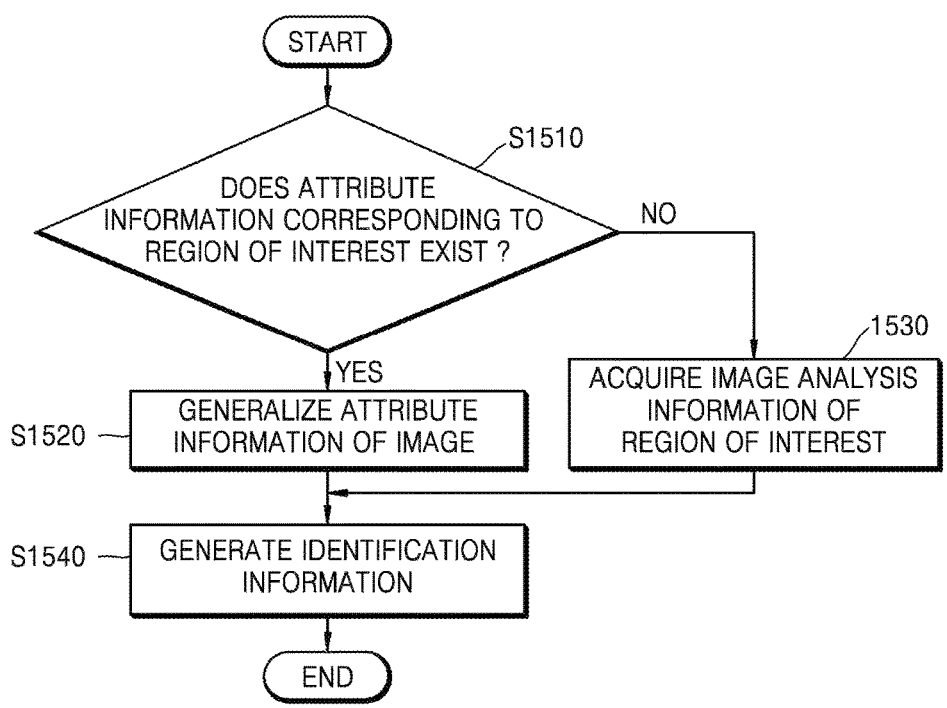
FIG. 15 is a flowchart of a method in which a device generates identification information, according to an exemplary embodiment.

FIG. 15 is a flowchart of a method in which the device 100 generates identification information, according to an exemplary embodiment. FIG. 15 illustrates a case where identification information of a region of interest within a first image is not pre-defined. The identification information generating method of FIG. 15 is also applicable to when identification information of a target image is generated.

In operation S1510, the device 100 may determine whether attribute information corresponding to the region of interest exists. For example, the device 100 may check metadata corresponding to the region of interest. The device 100 may extract the attribute information of the region of interest from the metadata.

According to an exemplary embodiment, the attribute information represents the attributes of an image, and may include context information associated with image generation and annotation information added by a user.

The context information is environment information associated with an image during image generation. For example, the context information may include at least one of information about the format of the image, information about the size of the image, information about the device 100 by which the image has been generated, time information of image generation, temperature information of image generation, and source information of the image. The context information may be automatically acquired by the device 100 and stored therein.

The annotation information is information recorded by a user, and may include information about an object included in the image, for example, the type, name, and status of the object, and information about a background included in the image, for example, location information, time information, and weather information.

In operations S1520 and S1540, the device 100 may generalize the attribute information of the image and generate the identification information.

Generalizing attribute information may mean expressing the attribute information in an upper-level language based on the WordNet (hierarchical terminology referencing system).

'WordNet' is a database that provides definitions or usage patterns of words and establishes relations among words. The basic structure of WordNet includes logical groups called synsets having a list of semantically equivalent words, and semantic relations among these synsets. The semantic relations include hypernyms, hyponyms, meronyms, and holonyms. Nouns included in WordNet have an entity as an uppermost word and form hyponyms by extending the entity according to senses. Thus, WordNet may also be called an ontology having a hierarchical structure by classifying and defining conceptual vocabularies.

'Ontology' denotes a formal and explicit specification of a shared conceptualization. An ontology may be considered a sort of dictionary comprised of words and relations. In the ontology, words associated with a specific domain are expressed hierarchically, and inference rules for extending the words are included.

For example, when the region of interest is a background, the device 100 may classify location information included in the attribute information into upper-level information and generate the identification information. For example, the device 100 may express a global positioning system (GPS) coordinate value (latitude: 37.4872222, longitude: 127.0530792) as a superordinate concept, such as a zone, a building, an address, a region name, a city name, or a country name. In this case, the building, the region name, the city name, the country name, and the like may be generated as identification information of the background.

In operations S1530 and S1540, if the attribute information corresponding to the region of interest does not exist, the device 100 may acquire image analysis information of the region of interest and generate the identification information of the region of interest by using the image analysis information.

According to an exemplary embodiment, the image analysis information is information corresponding to a result of analyzing data that is acquired via image processing. For example, the image analysis information may include information about an object displayed on an image (for example, the type, status, and name of the object), information about a location shown on the image, information about a season or time shown on the image, and information about an atmosphere or emotion shown on the image, but exemplary embodiments are not limited thereto.

For example, when the region of interest is an object, the device 100 may detect a contour line of the object included in the image. According to an exemplary embodiment, the device 100 may compare the contour line of the object included in the image with a predefined template and acquire the type, name, and the like of the object. For example, when the contour line of the object is similar to a template of a vehicle, the device 100 may recognize the object included in the image as a vehicle. In this case, the device 100 may display identification information 'car' by using information about the object included in the image.

Alternatively, the device 100 may perform face recognition on the object included in the image. For example, the device 100 may detect a face region of a human from the image. Examples of a face region detecting method may include knowledge-based methods, feature-based methods, template-matching methods, and appearance-based methods, but exemplary embodiments are not limited thereto.

The device 100 may extract face features (for example, the shapes of the eyes, the nose, and the mouth as major parts of a face) from the detected face region. To extract a face feature from a face region, a gabor filter, a local binary pattern (LBP), or the like may be used, but exemplary embodiments are not limited thereto.

The device 100 may compare the face feature extracted from the face region within the image with face features of pre-registered users. For example, when the extracted face feature is similar to a face feature of a pre-registered first register, the device 100 may determine that the first user is included as a partial image in the selected image. In this case, the device 100 may generate identification information 'first user', based on a result of face recognition.

According to an exemplary embodiment, the device 100 may compare a certain area of an image with a color map (color histogram) and extract visual features, such as a color arrangement, a pattern, and an atmosphere of the image, as the image analysis information. The device 100 may generate identification information by using the visual features of the image. For example, when the image includes a sky background, the device 100 may generate identification information 'sky' by using visual features of the sky background.

According to an exemplary embodiment, the device 100 may divide the image in units of areas, search for a cluster that is the most similar to each area, and generate identification information connected with a found cluster.

If the attribute information corresponding to the image does not exist, the device 100 may acquire image analysis information of the image and generate the identification information of the image by using the image analysis information.

FIG. 15 illustrates an exemplary embodiment in which the device 100 acquires image analysis information of an image when attribute information of the image does not exist, but exemplary embodiments are not limited thereto.

For example, the device 100 may generate identification information by using only either image analysis information or attribute information. Alternatively, even when the attribute information exists, the device 100 may further acquire the image analysis information. In this case, the device 100 may generate identification information by using both the attribute information and the image analysis information.

According to an exemplary embodiment, the device 100 may compare pieces of identification information generated based on attribute information with pieces of identification information generated based on image analysis information and determine common identification information as final identification information. Common identification information may have higher reliability than non-common identification information. The reliability denotes the degree to which pieces of identification information extracted from an image are trusted to be suitable identification information.

FIG. 16 illustrates attribute information of an image according to an exemplary embodiment. As shown in FIG. 16, the attribute information of the image may be stored in the form of metadata. For example, data such as a type 1610, a time 1611, a GPS 1612, a resolution 1613, a size 1614, and a collecting device 1617 may be stored as attribute information, for each image.

According to an exemplary embodiment, context information used during image generation may also be stored in the form of metadata. For example, when the device 100 generates a first image 1601, the device 100 may collect weather information (for example, cloudy), temperature information (for example, 20° C.), and the like from a weather application at the moment when the first image 1601 is generated. The device 100 may store weather information 1615 and temperature information 1616 as attribute information of the first image 1601. The device 100 may collect event information (not shown) from a schedule application at the moment when the first image 1601 is generated. In this case, the device 100 may store the event information as attribute information of the first image 1601.

According to an exemplary embodiment, user-added information 1618, which is input by a user, may also be stored in the form of metadata. For example, the user addition information 1618 may include annotation information input by a user to explain an image, and information about an object that is explained by the user.

According to an exemplary embodiment, image analysis information (for example, object information 1619) acquired as a result of image processing with respect to an image may be stored in the form of metadata. For example, the device 100 may store information about objects included in the first image 1601 (for example, user 1, user 2, me, and a chair) as the attribute information about the first image 1601.

Figure 17:
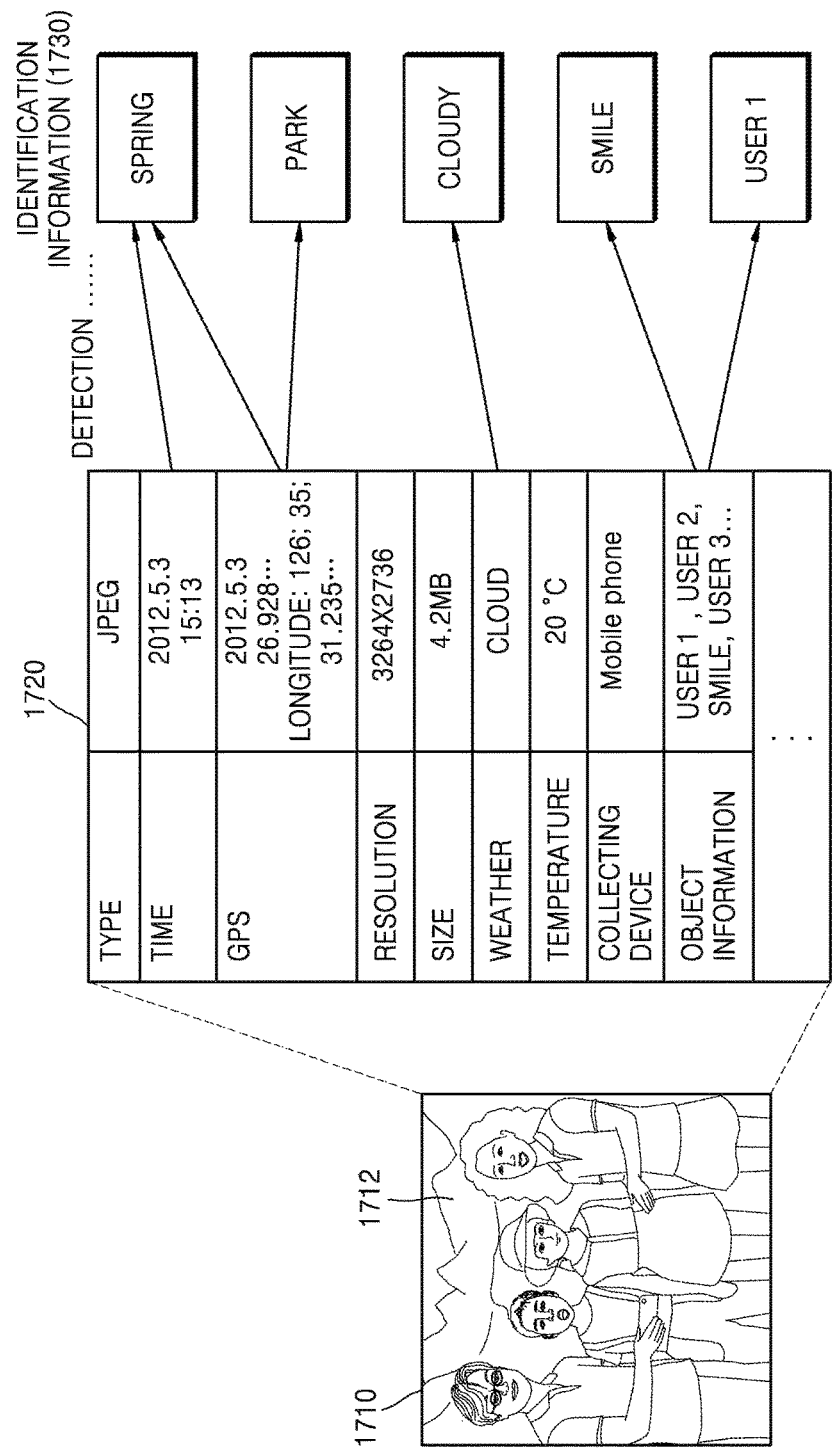
FIG. 17 is a reference view for explaining an example in which a device generates identification information of an image based on attribute information of an image.

FIG. 17 is a reference view for explaining an example in which the device 100 generates identification information of an image based on attribute information of the image.

According to an exemplary embodiment, the device 100 may select a background 1712 of an image 1710 as a region of interest, based on a user input. In this case, the device 100 may check attribute information of the selected background 1712 within attribute information 1720 of the image 1710. The device 100 may detect identification information 1730 by using the attribute information of the selected background 1712.

For example, when a region selected as a region of interest is a background, the device 100 may detect information associated with the background from the attribute information 1720. The device 100 may generate identification information 'park' by using location information (for example, latitude: 37; 25; 26.928 . . . , longitude: 126; 35; 31.235 . . . ) within the attribute information 1720, or generate identification information 'cloudy' by using weather information (for example, cloud) within the attribute information 1720. The device 100 may generate new identification information by combining pieces of attribute information. For example, when time information within the attribute information 1720 is 2012.5.3.15:13 and location information therewithin is latitude: 37; 25; 26.928 . . . and longitude: 126; 35; 31.235 . . . , the device 100 may determine a region shown on the image 1710 by using the location information and also determine a season shown on the image 1710 by further using the time information in addition to the location information. For example, when the location information is 'Korea', the device 100 may generate identification information regarding a season, which is 'Spring', by using the time information. As another example, the device 100 may generate identification information 'Spring rain' by using the identification information regarding a season generated based on the location information and the time information and the weather information.

Alternatively, the device 100 may generate identification information 'smile' and 'user 1', which correspond to object information, from annotation information added by a user.

When the context information and the annotation information are contrary to each other, the device 100 may generate identification information by using the image analysis information. For example, when weather information included in the context information is rainy but weather information included in the annotation information is cloudy, the device 100 may determine whether the weather information is rainy or cloudy, by using the image analysis information. However, exemplary embodiments are not limited thereto. When the context information and the annotation information are contrary to each other, the device 100 may give priority to the annotation information and generate the identification information by using the annotation information.

Figure 18:
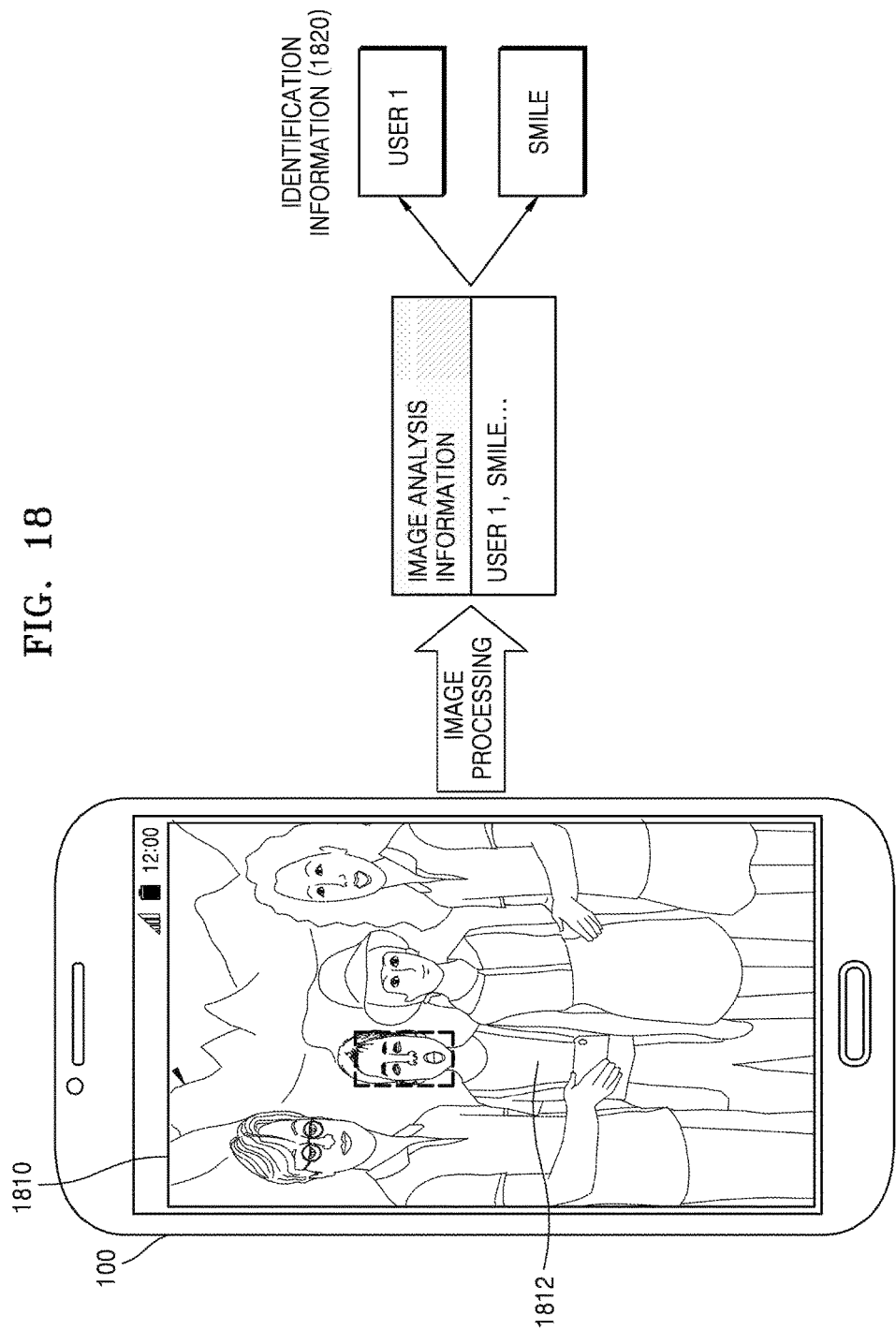
FIG. 18 is a reference view for explaining an example in which a device generates identification information by using image analysis information.

FIG. 18 is a reference view for explaining an example in which the device 100 generates identification information by using image analysis information. According to an exemplary embodiment, the device 100 may select a first object 1812 of an image 1810 as a region of interest, based on a user input. In this case, the device 100 may generate identification information (for example, a human and a smiling face) describing the first object 1812, by performing an image analysis with respect to the first object 1812.

For example, the device 100 may detect a face region of a human from the region of interest. The device 100 may extract a face feature from the detected face region. The device 100 may compare the extracted face feature with face features of pre-registered users and generate identification information representing that the selected first object 1812 is user 1. The device 100 may also generate identification information 'smile', based on a lip shape included in the detected face region. Then, the device 100 may acquire 'user 1' and 'smile' from identification information 1820.

Figure 19:
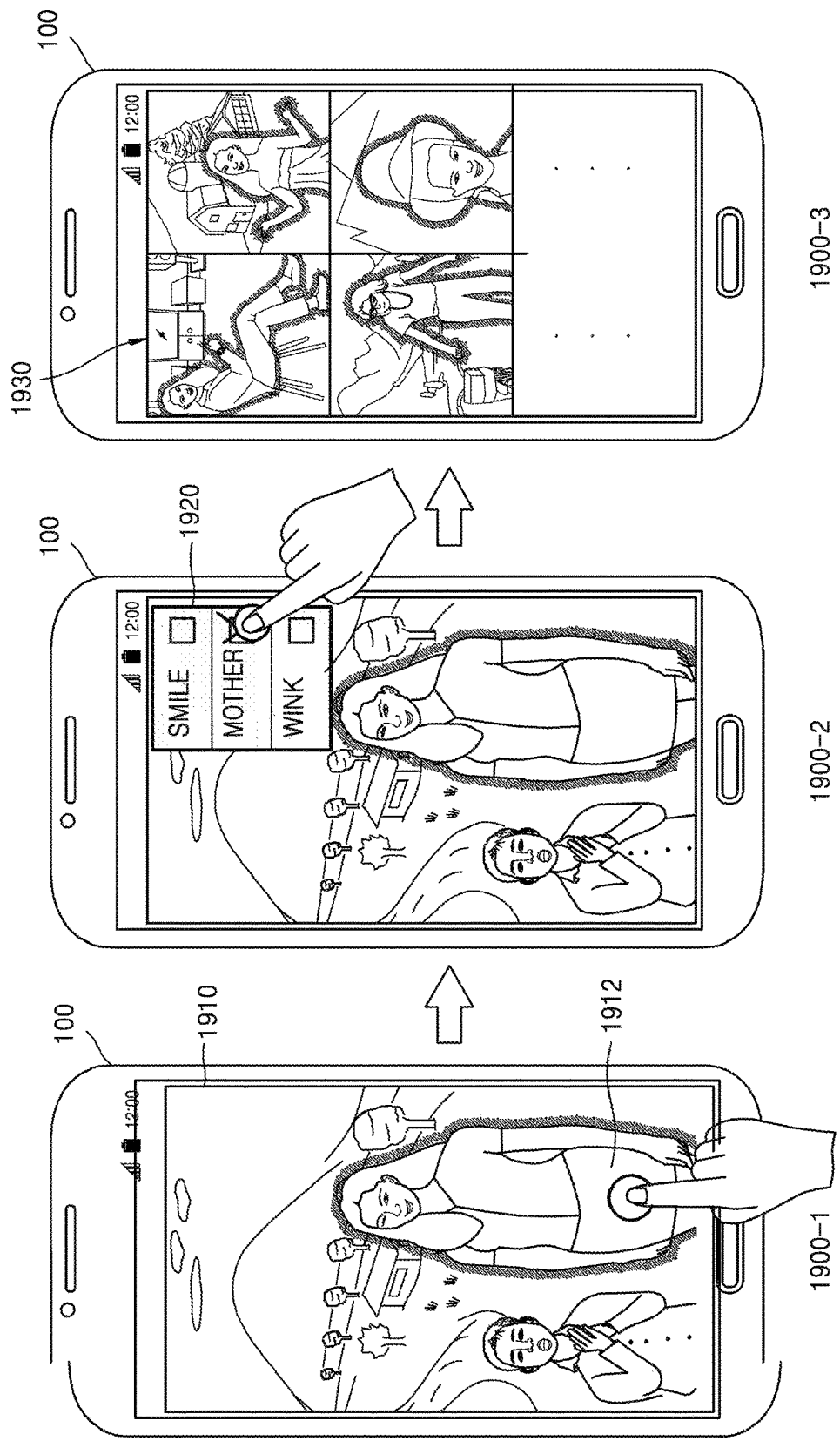
FIG. 19 illustrates an example in which a device displays an identification information list, according to an exemplary embodiment.

When there are a plurality of pieces of identification information of a region of interest, the device 100 may display an identification information list such that a user may select identification information. FIG. 19 illustrates an example in which the device 100 displays an identification information list, according to an exemplary embodiment.

Referring to 1900-1 of FIG. 19, the device 100 may select a first object 1912 of a first image 1910 as a region of interest, based on a user input. According to an exemplary embodiment, the device 100 may acquire identification information that describes the first object 1912. For example, the device 100 may acquire identification information such as smile, mother, and wink.

Referring to 1900-2 of FIG. 19, the device 100 may display an identification information list 1920 of the acquired pieces of identification information. In this case, the device 100 may receive a user input of selecting at least some pieces of identification information from the identification information list 1920. For example, the device 100 may receive a user input of selecting a mother 1922. The device 100 may search for a second image having identification information (for example, mother) selected by a user from a target image (for example, a picture album), provide an effect to a partial image corresponding to a mother within the second image, and then display a second image 1930 having an effect-applied partial image corresponding to a mother, as shown in 1900-3 of FIG. 19.

When there are a plurality of effect-applied second images, the device 100 may generate a folder (hereinafter, referred to as an effect folder) and store the effect-applied second images (hereinafter, referred to as effect images) in the effect folder. Each effect image may include at least one selected from the first image and the second image. Although the device 100 may store the effect images within the effect folder, the device 100 may store link information of the effect images in the effect folder.

Figure 20:
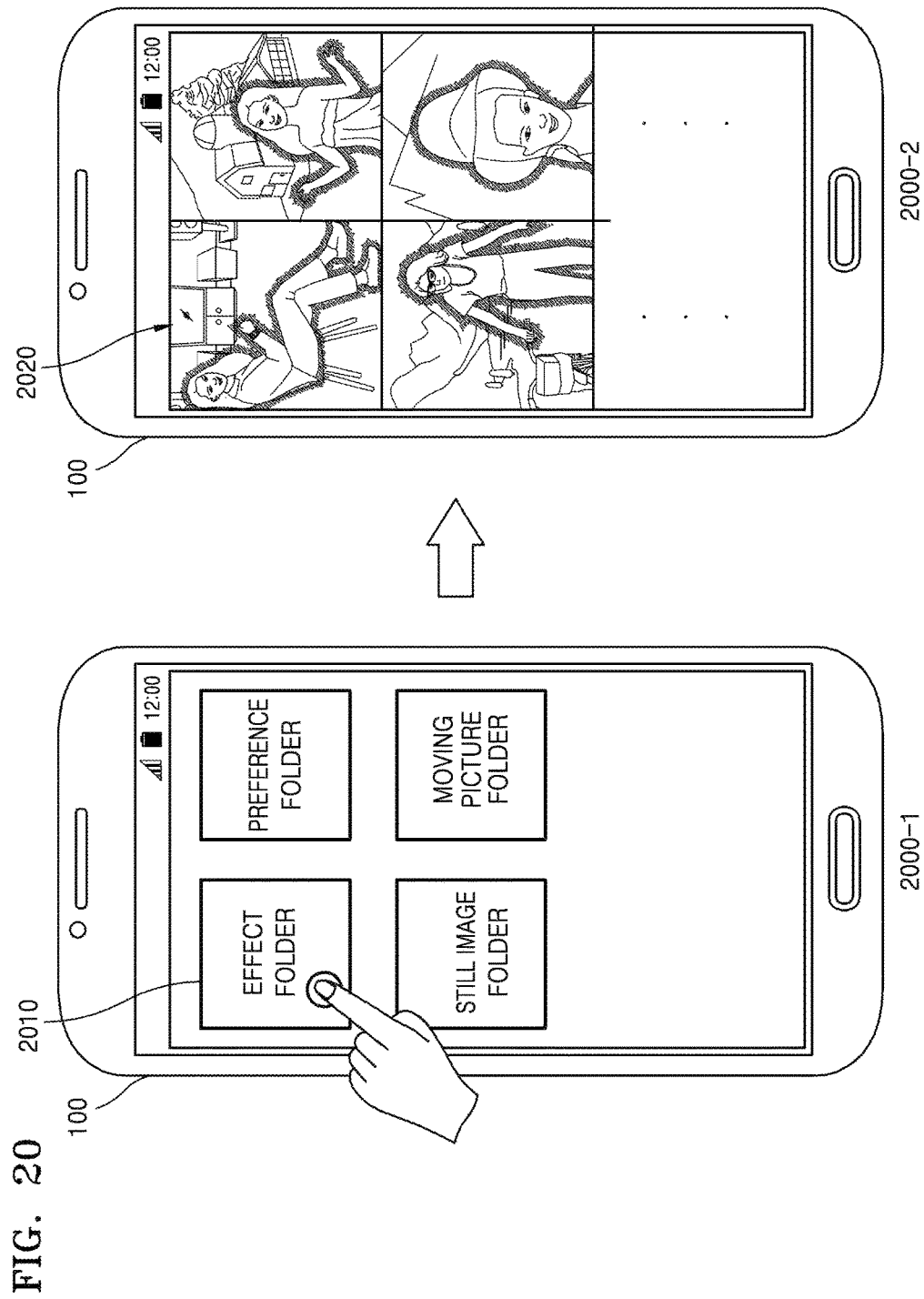
FIG. 20 illustrates an example in which a device displays an effect folder.

FIG. 20 illustrates an example in which the device 100 displays an effect folder. When searching for a second image is completed, the device 100 may provide an effect to the second image. As shown in 2000-1 of FIG. 20, the device 2010 may display an effect folder 2010. The effect folder 2010 may store effect images. In other exemplary embodiments, link information of the effect images may be stored in the effect folder 2010.

A user may input a command for selecting the effect folder 2010. In response to the user input, the device 100 may display at least one effect image 2020, as shown in 2000-2 of FIG. 20.

According to an exemplary embodiment, the device 100 may arrange at least one effect image included in the effect folder 2010, based on at least one selected from image generation time information, image generation location information, capacity information of an image, and resolution information of the image.

When there are different types of effect images, the device 100 may generate effect folders according to the types of effect images and store effect images of the same type in a single effect folder. The device 100 may select a new region of interest on an image included in an effect folder and provide a new effect to the selected region of interest. When many effect images to which the new effect has been applied are included in the effect folder, a new effect folder may be generated within the effect folder.

Figure 21:
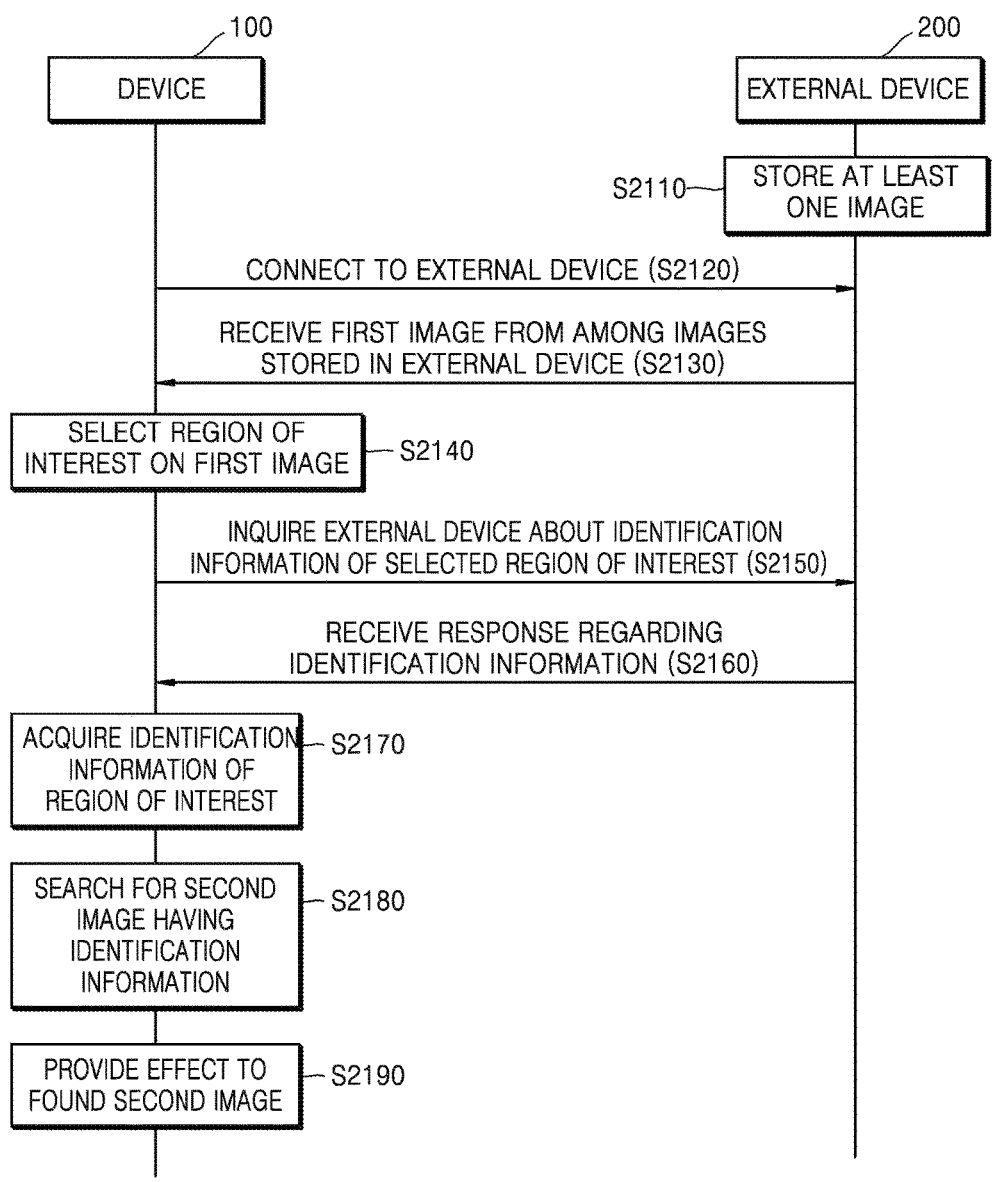
FIG. 21 is a flowchart of a method in which a device provides an effect to an image stored in an external device, according to an exemplary embodiment.

As described above, an effect may be provided to not only an image stored in the device 100 but also an image stored in an external device. The external device may be, for example, a social networking service (SNS) server, a cloud server or remote server, or a device 100 used by another user. FIG. 21 is a flowchart of a method in which a device provides an effect to an image stored in an external device, according to an exemplary embodiment.

In operation S2110, the external device 200 may store at least one image. One of the images stored in the external device 200 may be a first image. The external device 200 may be server that provides an SNS to a device 100 connected with the external device via a network, may be a portable terminal connected with the device 100 via a network, or may be a cloud server. The SNS denotes a service enabling online users to newly build personal connections or reinforce existing personal connections.

According to an exemplary embodiment, the external device 200 may store an image that is uploaded from devices 100 of several users.

In operation S2120, the device 100 may be connected to the external device 200. The device 100 may be connected to the external device 200 by performing login. The login may be a procedure of acquiring an access authority for the images stored in the external device 200. For example, the device 100 may request the external device 200 to perform user authorization, while transmitting identification information of a user (for example, e-mail account information) and authentication information of the user (for example, a password) to the external device 200. When the user is identified as an authorized user, the device 100 may be allowed to connect the external device and access the images stored in the external device.

In operation S2130, the device 100 may receive the first image from among the images stored in the external device 200. The device 100 may request one of the images stored in the external device 200 as the first image. In response to this request, the external device 200 may transmit the first image to the device 100. The first image may include an object and a background. The first image may be a still image, a moving picture frame, or a live view image.

In operation S2140, the device 100 may select a region of interest from the first image. For example, the device 100 may receive a user input of selecting a partial region from the first image, detect a contour line surrounding the selected partial region, and select the partial region surrounded by the contour line as the region of interest. The region surrounded by the contour line may be an object or a background.

According to an exemplary embodiment, a user input selecting a region of interest may vary. A user input may be, for example, a key input, a touch input, a motion input, a bending input, a voice input, or multiple inputs. For example, the device 100 may receive an input of touching a specific content within a plurality of images stored in the external device 200 for a predetermined time period (for example, two seconds) or more or touching the specific content a predetermined number of times or more (for example, double tap).

In operation S2150, the device 100 may inquire the external device 20 about identification information that identifies the selected region of interest. In operation S2160, the device 100 may receive a response regarding the identification information from the external device 200. The device 100 may inquire whether identification information about the object or background corresponding to the region of interest is predefined. When the identification information is predefined, the external device 200 may transmit the identification information about the region of interest to the device 100.

In some exemplary embodiments, when the identification information about the object or the background is not predefined in the external device 200, the external device 200 may determine whether the external device 200 is able to generate the identification information. If it is determined that the external device 200 is able to generate the identification information, the external device 200 may generate the identification information about the region of interest and transmit the same to the device 100. When the external device 200 generates the identification information, the external device 200 may use at least one of attribute information and image analysis information of the region of interest. On the other hand, if it is determined that the external device 200 is unable to generate the identification information, the external device 200 may transmit only the information that the external device 200 has about the region of interest to the device 100. In some exemplary embodiments, the external device 200 may transmit a response indicating that the external device 200 is unable to generate identification information, to the device 100.

In operation S2170, the device 100 may acquire identification information of the region of interest, based on the response of the external device 200. The device 100 may receive the identification information of the region of interest from the external device 200, or may generate the identification information of the region of interest by using at least one selected from the attribute information and the image analysis information of the region of interest.

In operation S2180, the device 100 may search for a second image having the identification information. The device 100 may search for the second image having the identification information from a target image. The target image may be an image stored in the device 100. Alternatively, the target image may be an image stored in the external device 200. Alternatively, the target image may be an image stored in an external device other than the external device 200 of FIG. 21. When searching for the second image, the device 100 may use identification information stored for the target image. When no identification information is pre-defined, the device 100 may generate identification information of the target image by using attribute information or image analysis information of the target image and then search for a second image having common identification information.

When there are a plurality of pieces of identification information, the device 100 may search for the second image by using at least some of the plurality of identification information in response to a user input.

In operation S2190, the device 100 may provide an effect to a found second image.

Although an effect is provided to the second image stored in the device 100 or the external device 200 by using the region of interest of the first image stored in the external device in FIG. 21, exemplary embodiments are not limited thereto. An effect may be provided to a second image stored in the external device 200 by using the region of interest of a first image stored in the device 100.

Figure 22:
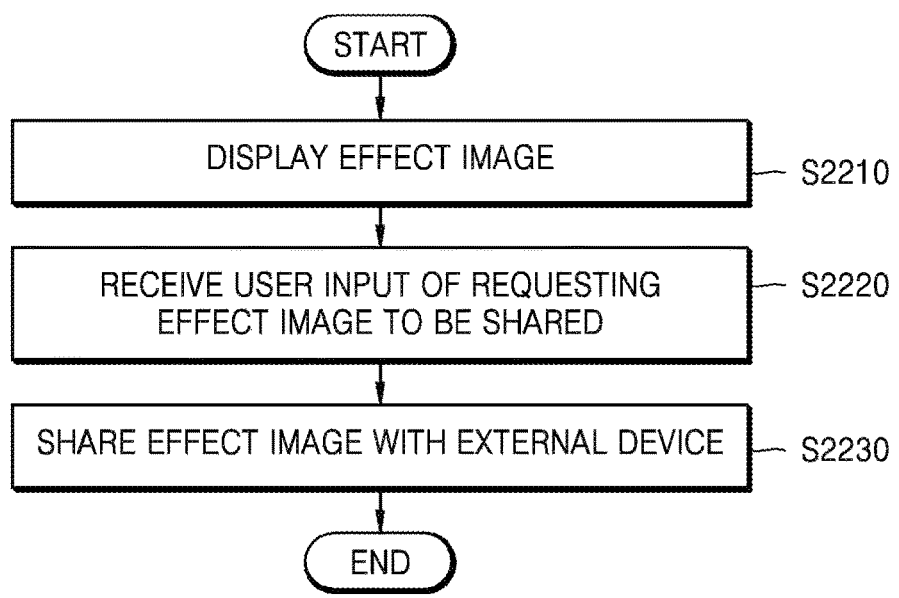
FIG. 22 is a flowchart of a method in which a device shares an effect image with an external device, according to an exemplary embodiment.

The device 100 may share an effect image with the external device 200. FIG. 22 is a flowchart of a method in which a device shares an effect image with an external device, according to an exemplary embodiment.

In operation S2210, the device 100 may display an effect image. For example, the device 100 may generate an effect image by providing an effect to a region of interest selected by a user on a first image. The device 100 may display the effect image. The device 100 may generate the effect image by providing an effect to a second image by using the region of interest of the first image.

In operation S2220, the device 100 may receive a user input of requesting the effect image to be shared.

According to an exemplary embodiment, a user input of requesting an effect image to be shared may vary. For example, the user input may be a key input, a voice input, a touch input, or a bending input, but exemplary embodiments are not limited thereto.

According to an exemplary embodiment, the device 100 may receive information about an external device 200 which is to share the effect image, via a user input. The external device 200 may be at least one selected from a cloud server, an SNS server, another device of the user, a device of another user, and a wearable device, which are connected to the device 100, but exemplary embodiments are not limited thereto.

For example, the user may input account information of a cloud storage, SNS account information of the user, identification information (for example, a telephone number or a MAC address) of a friend device for transmitting all of the images included in a first folder, and e-mail account information of a friend.

In operation S2230, the device 100 may share the effect image with the external device.

For example, the device 100 may transmit link information (for example, storage location information or a URL) of the effect image to the external device 200. The device 100 may transmit the effect image to the external device 200. According to an exemplary embodiment, the device 100 may upload the effect image to a specific server and give the external device 200 an authority to access the specific server.

Although the device 100 shares the effect image with the external device 200 in FIG. 22, exemplary embodiments are not limited thereto. The device 100 may share an effect folder with the external device 200. The device 100 may share at least one effect folder with the external device 200.

Figure 23:
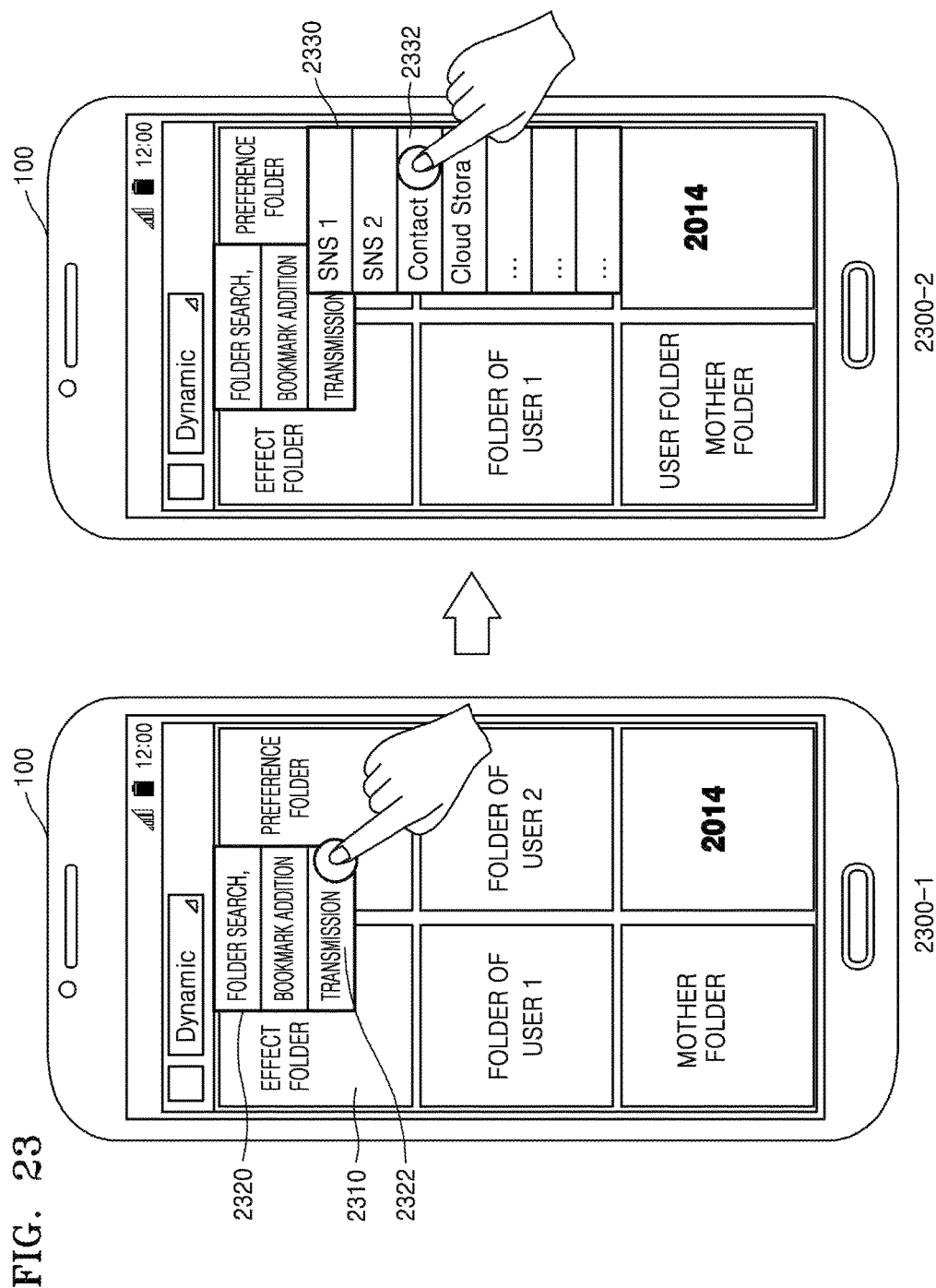
FIG. 23 illustrates an example in which a device shares an effect image with an external device.

FIG. 23 illustrates an example in which a device shares an effect image with an external device. Referring to 2300-1 of FIG. 23, the device 100 may generate and display an effect folder 2310 in response to a user input. The effect folder 2310 may store at least one effect image. The effect folder 2310 may store an effect image or link information of the effect image.

In this case, the device 100 may receive a user input of selecting the effect folder 2310. For example, the device 100 may receive an input of touching the effect folder 2310 for a predetermined period of time (for example, 2 seconds) or more. The device 100 may provide a menu window 2320 including items, such as a folder search, bookmark addition, and transmission 2322, in response to the user input.

When the user selects the transmission item 2322 on the menu window 2320, the device 100 may provide a selection window 2330 via which a reception device can be selected, as shown in 2300-2 of FIG. 23. The device 100 may receive a user input of selecting a contact 2332 on the selection window 2330. The user may select a specific friend from a contact. In this case, the device 100 may share the effect holder 2310 with a device 100 of the specific friend.

For example, the device 100 may transmit the effect image included in the effect holder 2310 to the device 100 of the specific friend. In other exemplary embodiments, the device 100 may transmit link information of the effect image included in the effect holder 2310 to the device 100 of the specific friend.

According to an exemplary embodiment, the device 100 may transmit the effect image (or the link information of the effect image) included in the effect holder 2310 to the device 100 of the specific friend via an email or a text message.

Figure 24:
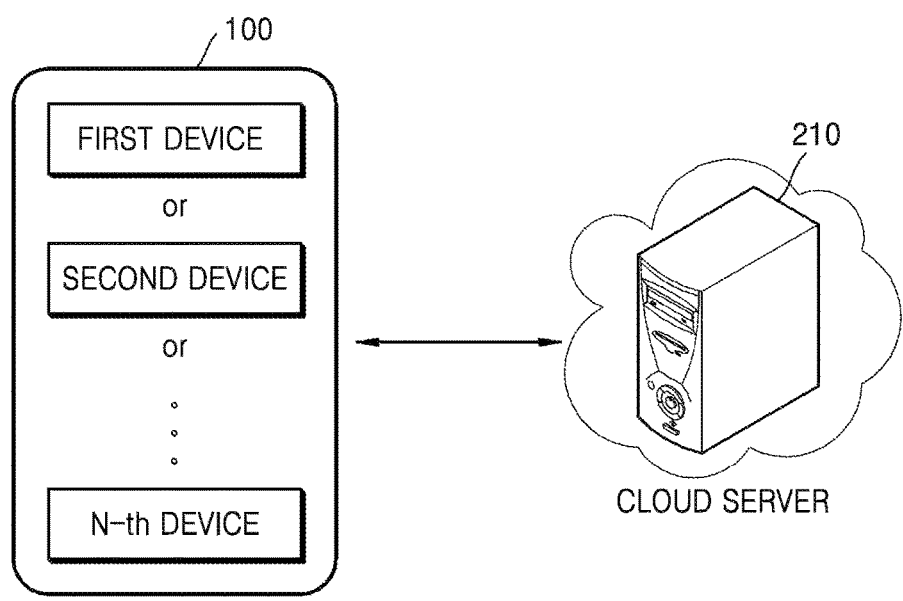
FIG. 24 is a schematic view of an image management system according to an exemplary embodiment.

FIG. 24 is a schematic view of an image management system according to an exemplary embodiment.

As shown in FIG. 24, the image management system may include a device 100 and a cloud server 210. In some exemplary embodiments, cloud server may refer to a remote server. More or less components than those illustrated in FIG. 24 may constitute the image management system.

The device 100 according to an exemplary embodiment may be realized in various types. For example, the device 100 may be at least one of a desktop computer, a mobile phone, a smartphone, a laptop computer, a tablet personal computer (PC), an e-book terminal, a digital broadcasting terminal, a personal digital assistant (PDA), a portable multimedia player (PMP), a navigation, an MP3 player, a digital camera 160, an Internet Protocol television (IPTV), a digital television (DTV), a consumer electronics (CE) apparatus (e.g., a refrigerator and an air-conditioner each including a display), or the like, but exemplary embodiments are not limited thereto. The device 100 may also be a device that is wearable by users. For example, the device 100 may be at least one selected from a watch, eyeglasses, a ring, a bracelet, and a necklace.

Since the device 100 is the same as the above-described device 100, a detailed description thereof will be omitted here. For convenience of explanation, a case where the device 100 is one of a first, second, through to N-th devices will now be described.

The cloud server 210 may be connected to the device 100 and thus communicate with the device 100. For example, the cloud server 210 may be connected to the device 100 via account information.

According to an exemplary embodiment, the cloud server 210 may transmit or receive data to or from the device 100. For example, the device 100 may upload at least one image to the cloud server 210. The device 100 may receive attribute information, image analysis information, identification information, and the like about an image from the cloud server 200.

The cloud server 210 may include an intelligence engine and may analyze images collected by the device 100 via the intelligence engine. For example, the cloud server 210 may generate the identification information from the attribute information of the image and acquire the image analysis information by performing image processing on the image. The cloud server 210 may analyze event information generated by the device 100 and infer a status of the user, a situation of the device 100, and the like. The cloud server 210, like the above-described device 100, may generate at least one selected from an effect image and an effect folder, in response to a user input.

It has been described above that an effect image is an image obtained by providing an effect to an object or background of a single image. The effect has been provided using image data of a region of interest. In other words, a halo effect, a blur effect, and the like adjust a pixel value of the region of interest, and a size effect applies the pixel value of the region of interest to a relatively wide area or a relatively narrow area. A depth effect generates a three-dimensional (3D) image (for example, a left eye image and a right eye image) by using the pixel value of the region of interest.

Figure 25:
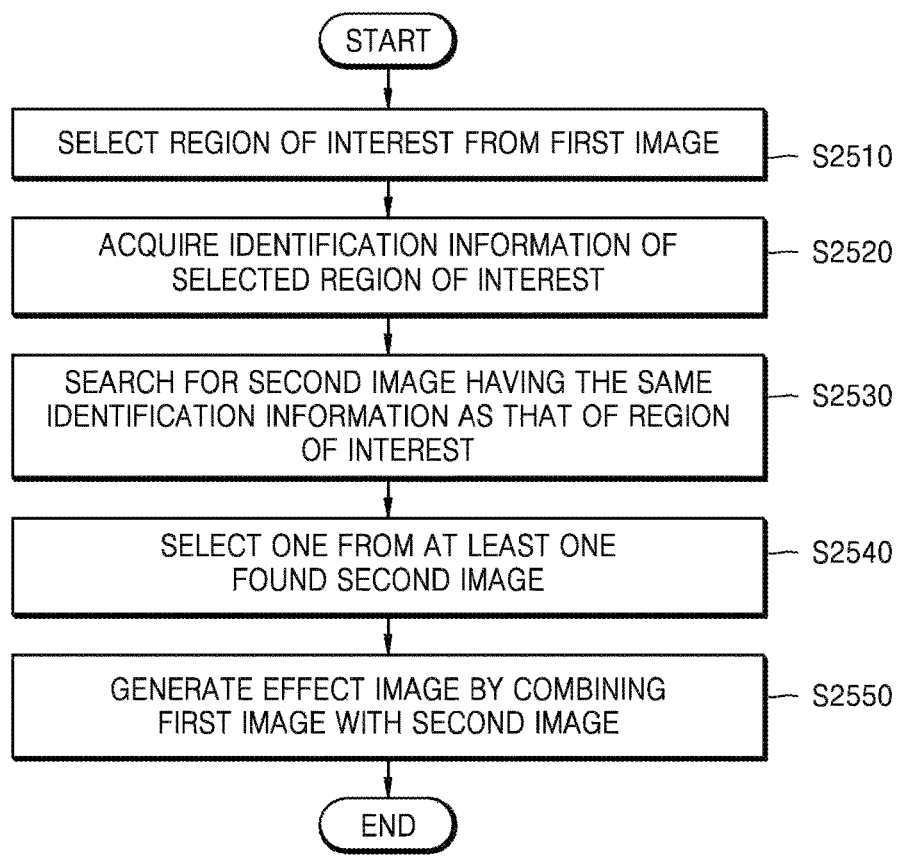
FIG. 25 is a flowchart of a method of providing an effect image by combining a plurality of images with one another, according to an exemplary embodiment.

During effect provision, image data of another image may be used. In other words, the device 100 may provide an effect to the first image by using image data of a second image. Providing an effect to a region of interest of an image by using image data of another image will now be referred to as providing an effect by combining a plurality of images with one another. FIG. 25 is a flowchart of a method of providing an effect image by combining a plurality of images with one another, according to an exemplary embodiment.

In operation S2510, the device 100 may select a region of interest from a first image. For example, as described above, the device 100 may display, as the first image, a still image or moving picture frame stored in the device 100 or an external device. Alternatively, the device 100 may display, as the first image, a live view image captured by the device 100 or the external device. In response to a user input, the device 100 may select an object or background of the first image as a region of interest.

In operation S2520, the device 100 may acquire identification information of the selected region of interest. For example, when the first image is stored, pieces of identification information that respectively describe an object and a background included in the first image may be matched with the image and stored. According to an exemplary embodiment, the identification information pieces respectively corresponding to the object and the background may be stored in the form of metadata. In this case, the device 100 may determine that identification information is defined for the selected region of interest. The device 100 may acquire the identification information by reading the pre-stored identification information.

When the identification information of the selected region of interest is not defined, the device 100 may acquire the identification information by generating the identification information. For example, the device 100 may generate the identification information based on attribute information of the first image stored in the form of metadata or by using image analysis information that is acquired by performing image processing on the first image.

In operation S2530, the device 100 may search for a second image having the same identification information as that of the region of interest from a target image. The target image may be at least one image in which the second image is to be searched for, and may be a still image or moving picture stored in the device 100 or the external device.

When the region of interest has one piece of identification information, the device 100 may search for the second image having the identification information from the target image. On the other hand, when the region of interest has a plurality of pieces of identification information, the device 100 may search for images having all of the plurality of pieces of identification information. However, exemplary embodiments are not limited thereto. The device 100 may search for an image having some of the plurality of pieces of identification information. The device 100 may provide an identification information list to a user and receive a user input of selecting at least one piece of identification information from the identification information list. According to an exemplary embodiment, the device 100 may receive a user input of selecting all of the pieces of identification information or a user input of selecting some of the pieces of identification information.

According to an exemplary embodiment, a user input of selecting identification information may vary. For example, a user input may be at least one selected from a key input, a touch input, a motion input, a bending input, a voice input, and multiple inputs.

In operation S2540, the device 100 may select one from at least one found second image. The device 100 may display the found at least one second image. The second image may be displayed in the form of a thumbnail. When a plurality of second images are found, the device 100 may display the second images in a searching order or in the order in which the second images are generated. The order of displaying the second images may be set according to a user input. The device 100 may select one from the at least one found second image in response to a user input made when the at least one second image is displayed. When one second image is found, the device 100 may select the found second image regardless of a user input.

In operation S2550, the device 100 may generate an effect image by combining the first image with the second image. The device 100 may generate an effect image by separating the region of interest from the first and second images and combining a partial image corresponding to the region of interest within the second image with an area of the first image where the region of interest is located. Alternatively, the device 100 may generate the effect image by replacing image data of the region of interest with image data of the partial image corresponding to the region of interest within the second image.

Figure 26B:
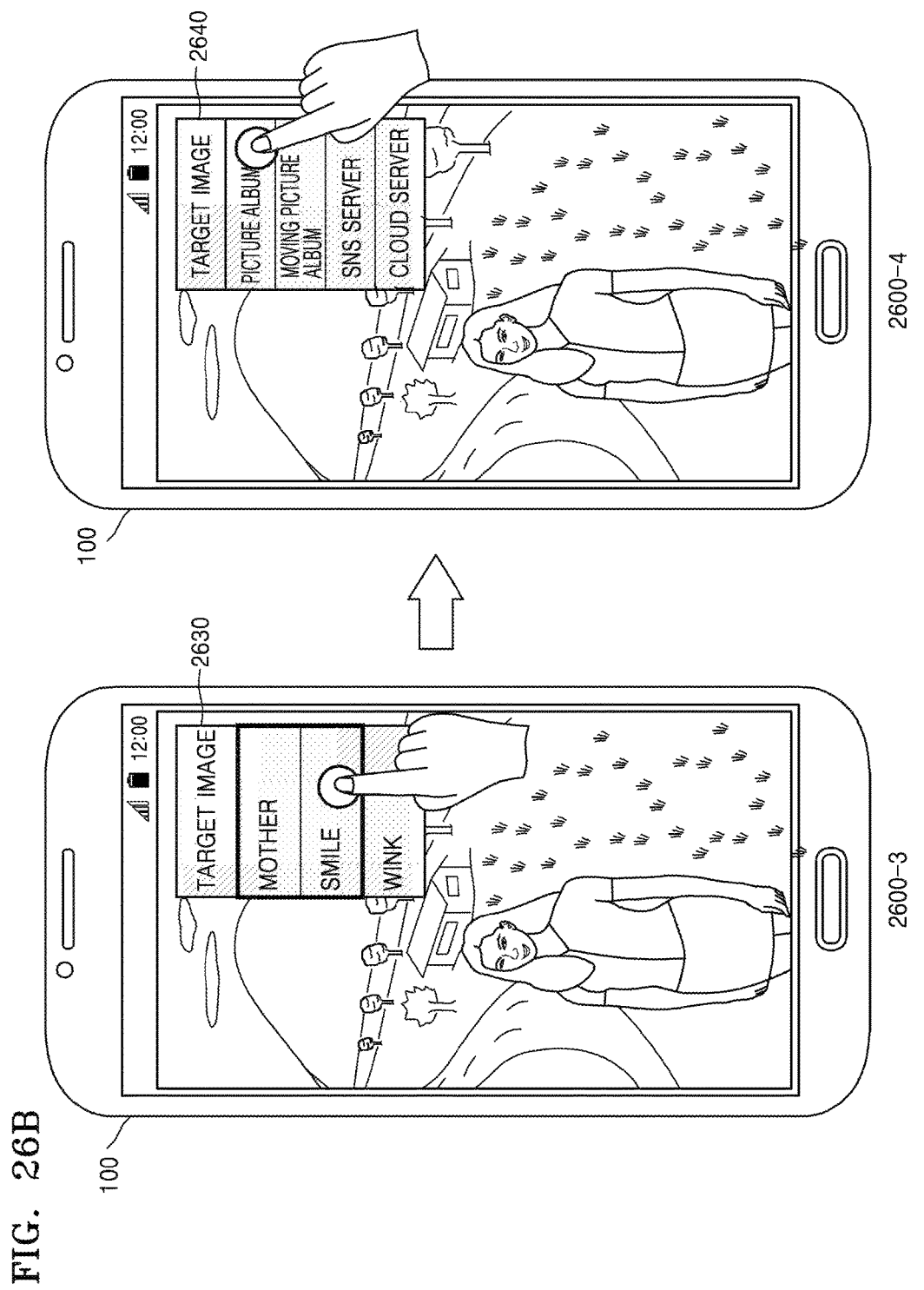
Figure 26C:
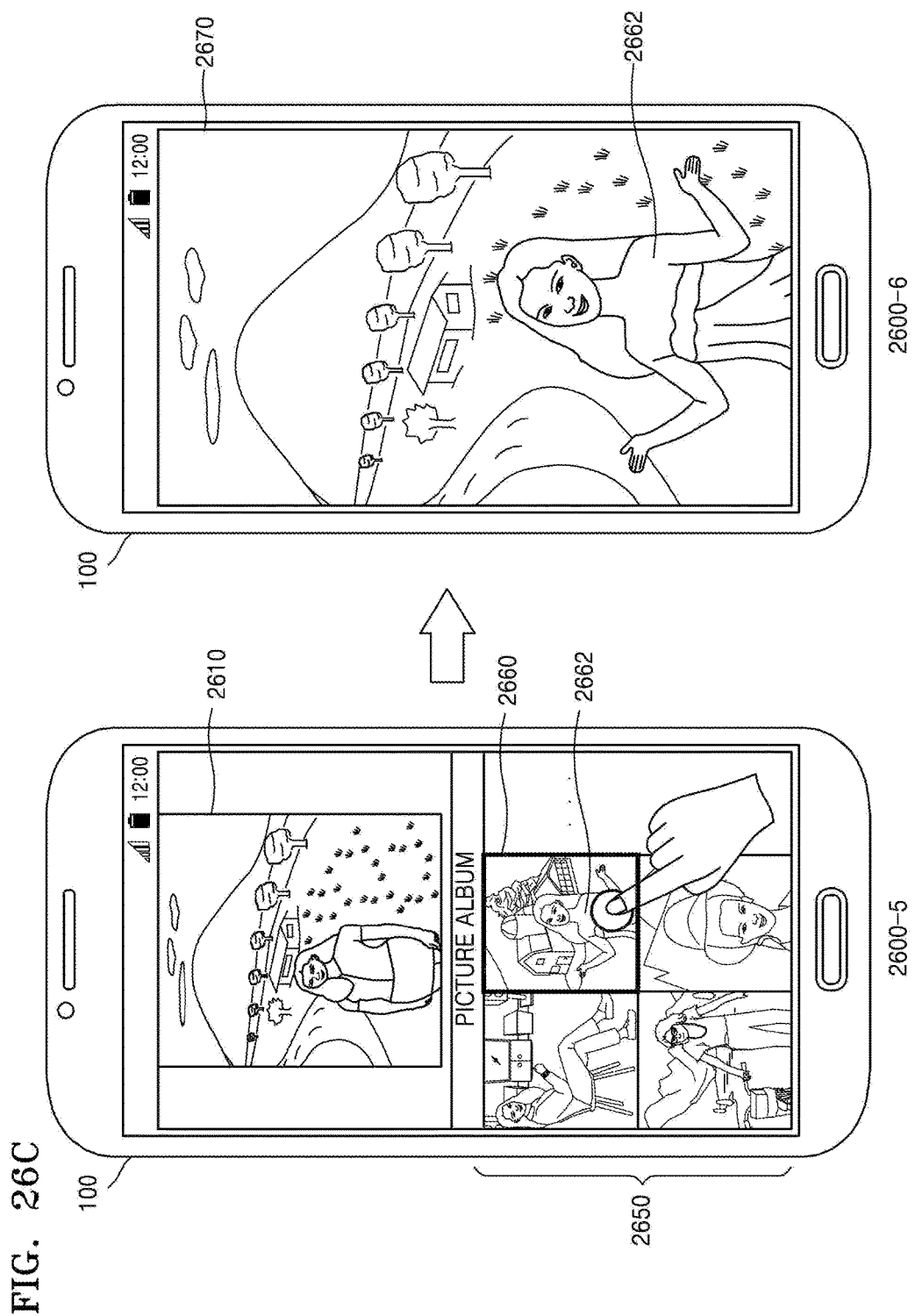

FIGS. 26A-26C illustrate an example of providing an effect to an object by using a plurality of images, according to an exemplary embodiment. As shown in 2600-1 of FIG. 26A, the device 100 may display a first image 2610 while a mode of the device 100 is set as an effect mode. The first image 2610 may be a still image, a moving picture frame, or a live view image, for example. The device 100 may select a region of interest from the first image 2610. For example, a user may touch a partial area of the first image 2610 on which an object 2612 is displayed, and the device 100 may select, as a region of interest, the object 2612 including the touched area and obtained by performing image processing based on the touched area.

The device 100 may display an effect list 2620 including effects that may be provided to an object, as shown in 2600-2 of FIG. 26A. The effect list 2620 may overlap the displayed first image 2610. The user may perform an input of selecting one effect from the effect list 2620. For example, the user may perform the input by touching an item 'use of another image'.

The device 100 may acquire identification information that identifies the object 2612, which is the region of interest. When identification information is pre-stored, the device 100 may acquire the identification information by reading the pre-stored identification information. When the identification information is not pre-stored, the device 100 may acquire the identification information by generating the identification information by using at least one selected from attribute information and image analysis information of the object 2612. As shown in 2600-3 of FIG. 26B, the device 100 may display an identification information list 2630. The identification information list 2630 may also overlap the displayed first image 2610. Via a user input of selecting at least some pieces of identification information from the identification information list 2630, the device 100 may determine the at least some pieces of identification information as identification information for a search.

The device 100 may display a target image list 2640 representing information about a target image, as shown in 2600-4 of FIG. 26B. Via a user input of selecting at least one image from the target image list 2640, the device 100 may determine a target image.

The device 100 may search for a second image having the selected identification information from the target image. When the target image is a still image, the device 100 may search for the second image in units of still images. When the target image is a moving picture, the device 100 may search for the second image in units of moving picture frames.

A found second image 2650 may be displayed as shown in 2600-5 of FIG. 26C. The first image 2610 and the second image 2650 may be displayed on separate areas. When a plurality of second images 2650 are found, the device 100 may sequentially arrange the plurality of second images 2650 in a searching order or the like.

In a response to a user input of selecting a second image 2660 from the plurality of second images 2650, the device 100 may display an effect image 2670 obtained by combining the first image 2610 with the selected second image 2660, as shown in 2600-6—of FIG. 26C. The device 100 may generate the effect image 2670 by replacing the selected object 2612 of the first image 2610 with an object 2622 of the selected second image 2660.

Figure 27:
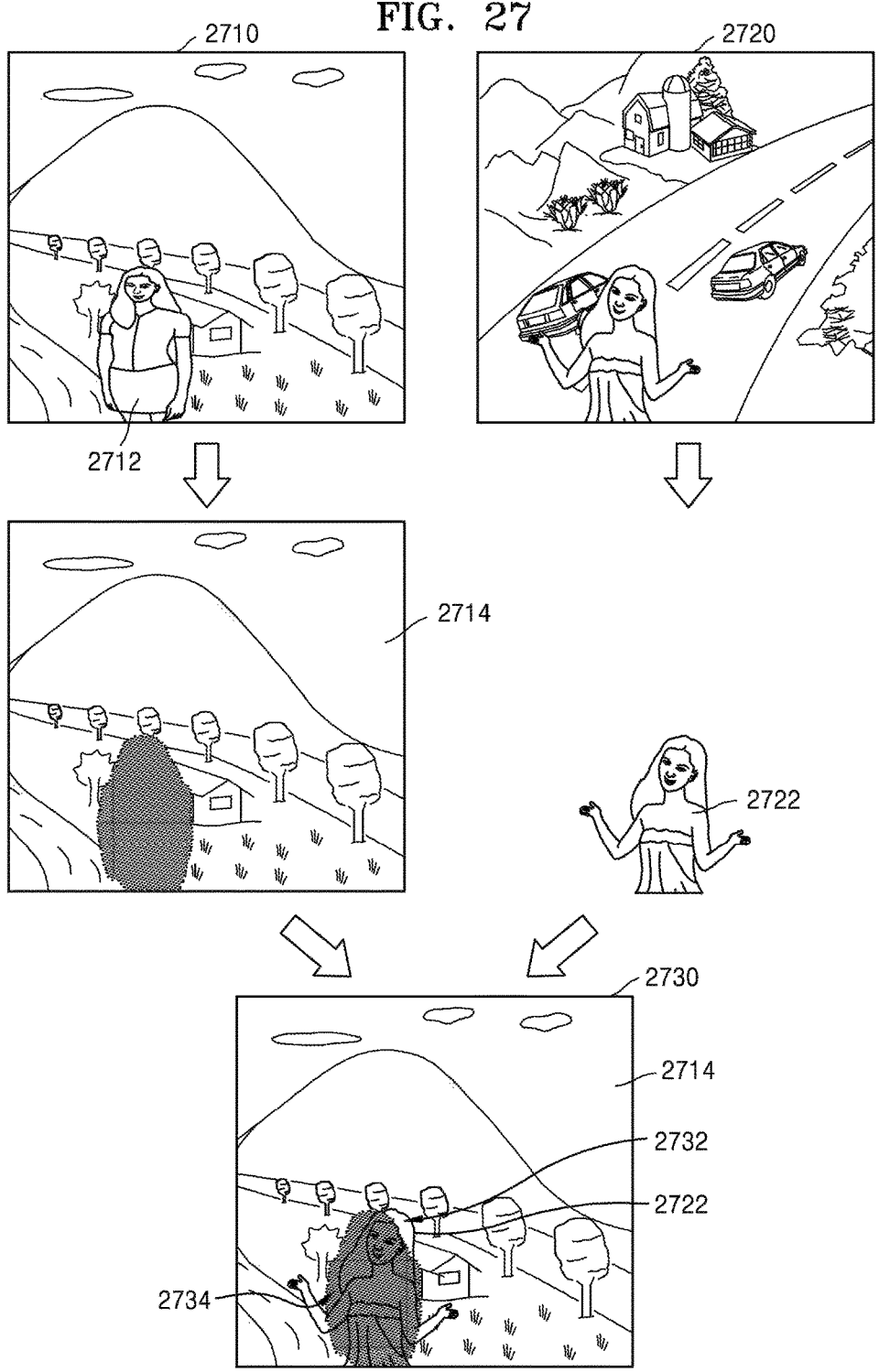
FIG. 27 is a reference view for explaining a method of combining a plurality of images, according to an exemplary embodiment.

A size and shape of the object 2662 of the second image 2660 may be different from those of the object 2612 of the first image 2610. The device 100 may use a restoration technique when combining the first and second images 2612 and 2660. FIG. 27 is a reference view for explaining a method of combining a plurality of images, according to an exemplary embodiment. The device 100 may obtain an image 2714 (hereinafter, referred to as a first partial image) by excluding an object 2712, which is a region of interest, from a first image 2710. The device 100 may separate the first partial image 2714 from the first image 2710 by using, for example, image edge characteristics. The device 100 may also separate an object 2722 (hereinafter, referred to as a second partial image) corresponding to a region of interest from a second image 2720 by using, for example, image edge characteristics.

The device 100 combines the first partial image 2714 with the second partial image 2722 such that the first partial image 2714 and the second partial image 2722 are minimally overlapped with each other. The device 100 may generate an effect image 2730 by deleting a portion of the first partial image 2714 from an area 2732 where the first partial image 2714 and the second partial image 2722 overlap each other and by restoring, by using the first partial image 2714, an area 2734 on which both the first partial image 2714 and the second partial image 2722 are not displayed.

Figure 28A:
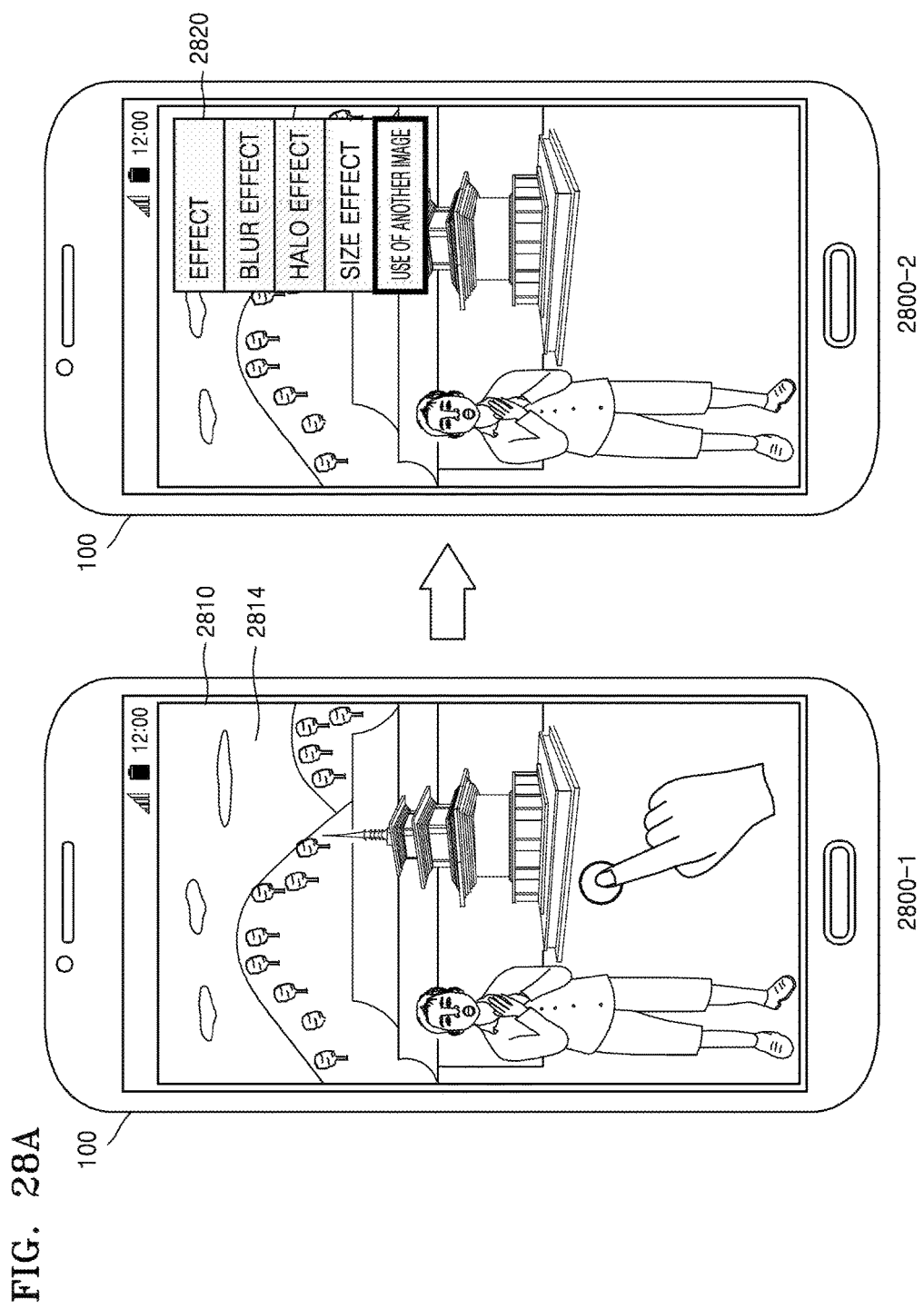
Figure 28B:
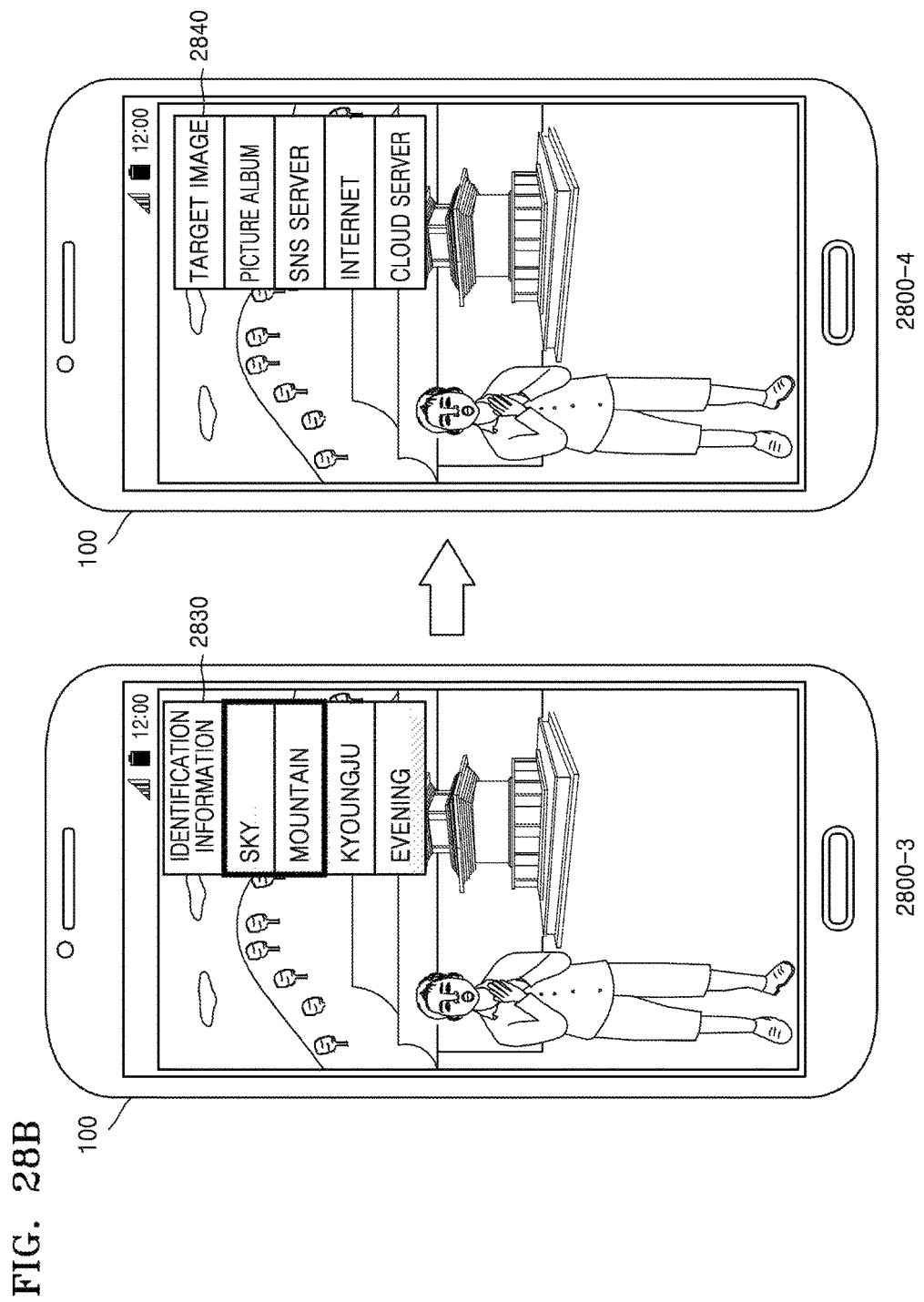

FIGS. 28A-28C illustrate an example of providing an effect to a background by using a plurality of images, according to an exemplary embodiment. As shown in 2800-1 of FIG. 28A, the device 100 may display a first image 2810 while a mode of the device 100 is set as an effect mode. The first image 2810 may be a still image, a moving picture frame, or a live view image, for example. The device 100 may select a region of interest from the first image 2810. For example, a user may perform an input of touching a partial area of the first image 2810 on which a background 2814 is displayed, and the device 100 may select the background 2814 as a region of interest by performing image processing on the touched area, in response to a user input.

The device 100 may display an effect list 2820 including effects that may be provided to the background 2814, as shown in 2820-2 of FIG. 28A. The effect list 2820 may overlap the displayed first image 2810. The user may perform an input of selecting one effect from the effect list 2820. For example, the user may perform the input by touching an item 'use of another image'.

The device 100 may acquire identification information that identifies the background 2814, which is the region of interest. When identification information is pre-stored, the device 100 may acquire the identification information by reading the pre-stored identification information. When the identification information is not pre-stored, the device 100 may acquire the identification information by generating the identification information by using at least one selected from attribute information and image analysis information of the background 2814. As shown in 2800-3 of FIG. 28B, the device 100 may display an identification information list 2830. The identification information list 2830 may also overlap the displayed first image 2810. Via a user input of selecting at least some pieces of identification information from the identification information list 2830, the device 100 may determine the at least some pieces of identification information as identification information for a search.

The device 100 may display a target image list 2840 representing information about a target image, as shown in 2800-4 of FIG. 28B. Via a user input of selecting at least one image from the target image list 2840, the device 100 may determine a target image.

The device 100 may search for a second image having the identification information for a search from the target image. When the target image is a still image, the device 100 may search for the second image in units of still images. When the target image is a moving picture, the device 100 may search for the second image in units of moving picture frames.

A found second image 2850 may be displayed as shown in 2800-5 of FIG. 28C. The first image 2810 and the second image 2850 may be displayed on separate areas. When a plurality of second images 2850 are found, the device 100 may sequentially arrange the plurality of second images 2850 in a searching order or the like.

In a response to a user input of selecting a second image 2860 from the plurality of second images 2850, the device 100 may display an effect image 2860 obtained by combining the first image 2810 with the selected second image 2860, as shown in 2800-6 of FIG. 28C. The device 100 may generate the effect image 2860 by combining a background 2864 of the second image 2840 with the region of interest of the first image 2810.

Figure 29:
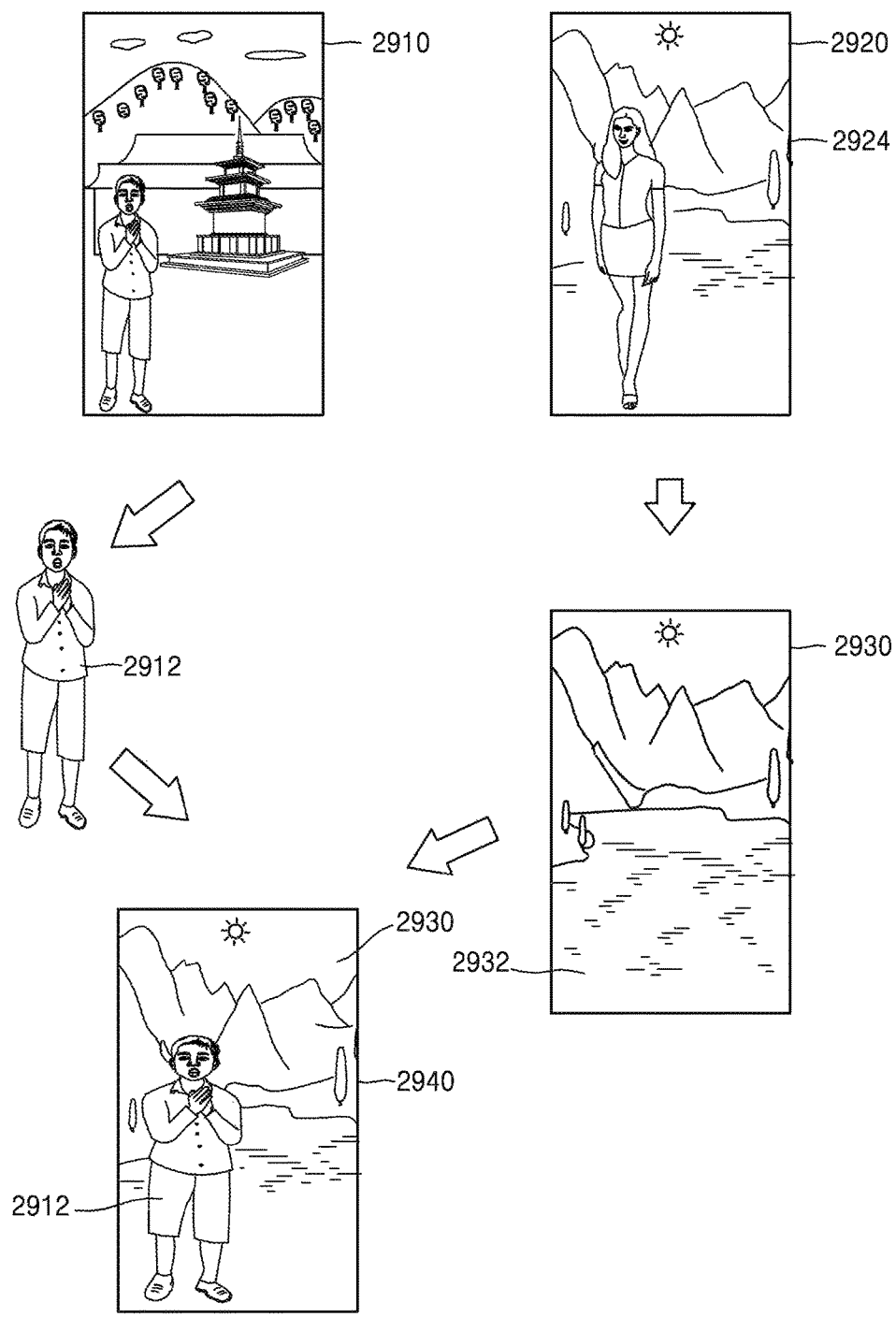
FIG. 29 is a reference view for explaining a method of combining a plurality of images, according to another exemplary embodiment.

A size and shape of the background 2864 of the second image 2860 may be somewhat different from those of the background 2814 of the first image 2810. The device 100 may use a restoration technique when combining the first and second images 2810 and 2850. FIG. 29 is a reference view for explaining a method of combining a plurality of images, according to another exemplary embodiment. The device 100 may obtain an image 2912 (hereinafter, referred to as a third partial image) by excluding a background, which is a region of interest, from a first image 2910. The device 100 may separate the third partial image 2912 from the first image 2910 by using, for example, image edge characteristics. The device 100 may also separate a partial image 2924 (hereinafter, referred to as a fourth partial image) corresponding to a region of interest from a second image 2920 by using, for example, image edge characteristics.

The device 100 may generate a background image 2930 by filling an area 2932 having no pixel information within the fourth partial image 2924 with a predetermined pixel value. When generating the background image 2930, the device 100 may determine a pixel value of the area 2932 having no pixel information by using a mirroring technique using a pixel value of an area around the area 2932. The device 100 may generate an effect image 2940 by combining the third partial image 2912 with the background image 2930. The device 100 may combine the third partial image 2912 with the background image 2930 by using location information of the third partial image 2912 within the first image 2910. A portion of the background image 2930 that is overlapped by the third partial image 2912 may be deleted.

The effect image 2940 may be provided as a live view image. A live view image may refer to an image that is captured by a camera and displayed on the device and is an image before a store command is received. The camera may be the camera built in the device 100, or may be an external device. As described above, the device 100 may select an object or background of the live view image as a region of interest in response to a user input, and display the selected region of interest entirely differently from a region of interest that is not yet selected. For example, the device 100 may provide a halo effect, a blur effect, a size effect, or a depth effect to the region of interest. When the device 100 receives a store command, the device 100 may store a live view image to which an effect has been provided. The device 100 may store, as a still image or a moving picture, the live view image to which an effect has been provided, according to a photographing mode of the device 100.

Figure 30:
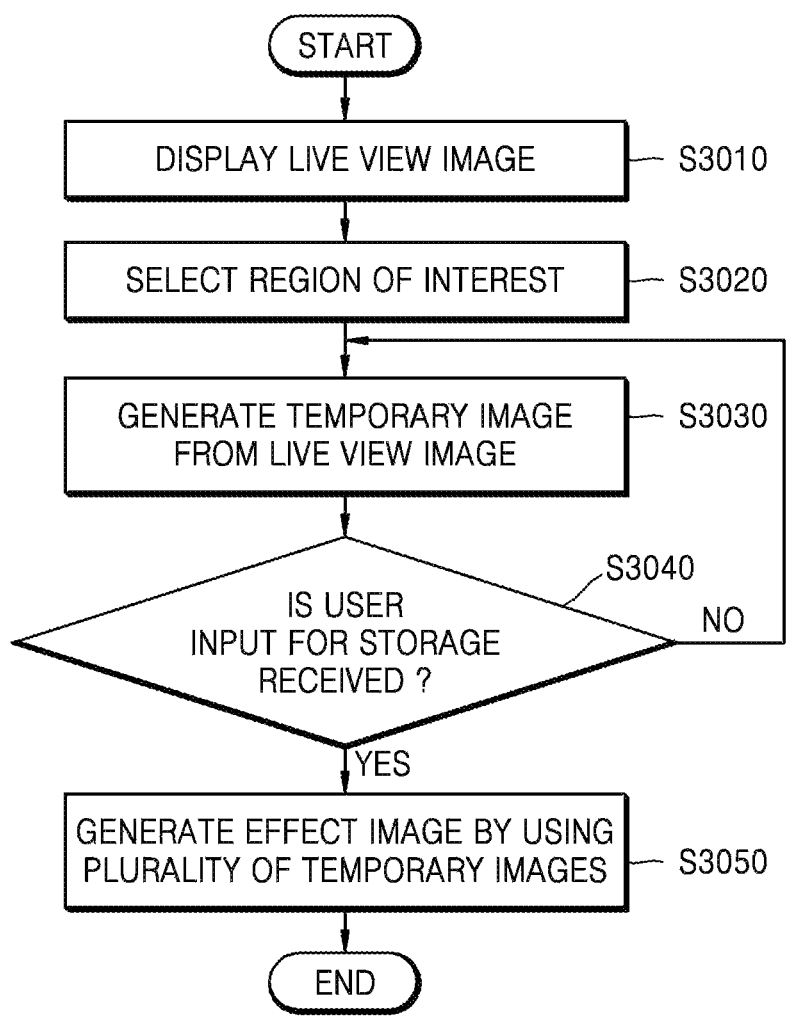
FIG. 30 is a flowchart of a method of providing an effect image by using a live view image, according to an exemplary embodiment.

The device 100 may extract a plurality of images from the live view image and provide an effect image. FIG. 30 is a flowchart of a method of providing an effect image by using a live view image, according to an exemplary embodiment. In operation S3010, the device 100 may display a live view image. The live view image is an image that is captured by a camera and displayed, and is an image before a store command is received. The camera may be a camera built in the device 100, or may be an external device. For convenience of explanation, an image generated after a store input is received will now be referred to as a captured image.

In operation S3020, the device 100 selects a region of interest. A user may input a command for selecting a partial region on the live view image, and the device 100 may determine an object or background including the selected partial region as the region of interest.

The user input of selecting a partial region may vary. For example, the user input may be at least one selected from a key input, a touch input, a motion input, a bending input, a voice input, and multiple inputs.

In operations S3030 and S3040, the device 100 may generate a temporary image from the live view image. The temporary image is an image including the region of interest, and is an image temporarily generated before a user input of storing an image is received.

The temporary image may be a partial image for the region of interest. For example, the temporary image may be a partial image including only an object or background selected as the region of interest. Alternatively, the temporary image may be a frame image within the live view image that includes the region of interest.

The temporary image may be temporarily generated and stored in a buffer or may be temporarily generated and displayed on a display area of the device 100.

The temporary image may be generated between the moment when the region of interest is selected and the moment when a store input is received. For example, one temporary image may be generated at the moment when the region of interest is selected, and another temporary image may be generated at the moment when a store input is received, and thus a total of two temporary images may be generated. Alternatively, a temporary image may be generated at intervals of a predetermined time (for example, 3 seconds) after the moment when the region of interest is selected and before a store input is received. Alternatively, a temporary image may be generated every time a change in the region of interest is equal to or greater than a reference value, after the region of interest is selected and before a store input is received.

A temporary image generated at the moment when the region of interest is selected is referred to as an initial temporary image, and a temporary image generated at the moment when a store input is received is referred to as a final temporary image. In response to a store input, the device 100 may acquire a plurality of temporary images including an initial temporary image and a final temporary image. A temporary image comprised of only the region of interest from among the plurality of temporary images may be an image of interest. The device 100 may generate an image of interest from one of the plurality of temporary images including an initial temporary image and a final temporary image.

The user input for storing an image may vary. For example, the user input may be at least one selected from a key input, a touch input, a motion input, a bending input, a voice input, and multiple inputs.

When the device 100 receives a user input for storage, the device 100 may generate an effect image by using the plurality of temporary images, in operation S3050. In other words, the device 100 may generate an effect image by reading a plurality of temporary images temporarily stored in the buffer and combining the read plurality of temporary images with one another. The device 100 may store the generated effect image. The temporary images stored in the buffer may be deleted. The device 100 may generate the effect image by combining an object or background, which is a region of interest, of the initial temporary image with the final temporary image. Alternatively, the device 100 may generate the effect image by combining a partial image corresponding to a region of interest from among the plurality of temporary images with the final temporary image.

Figure 31:
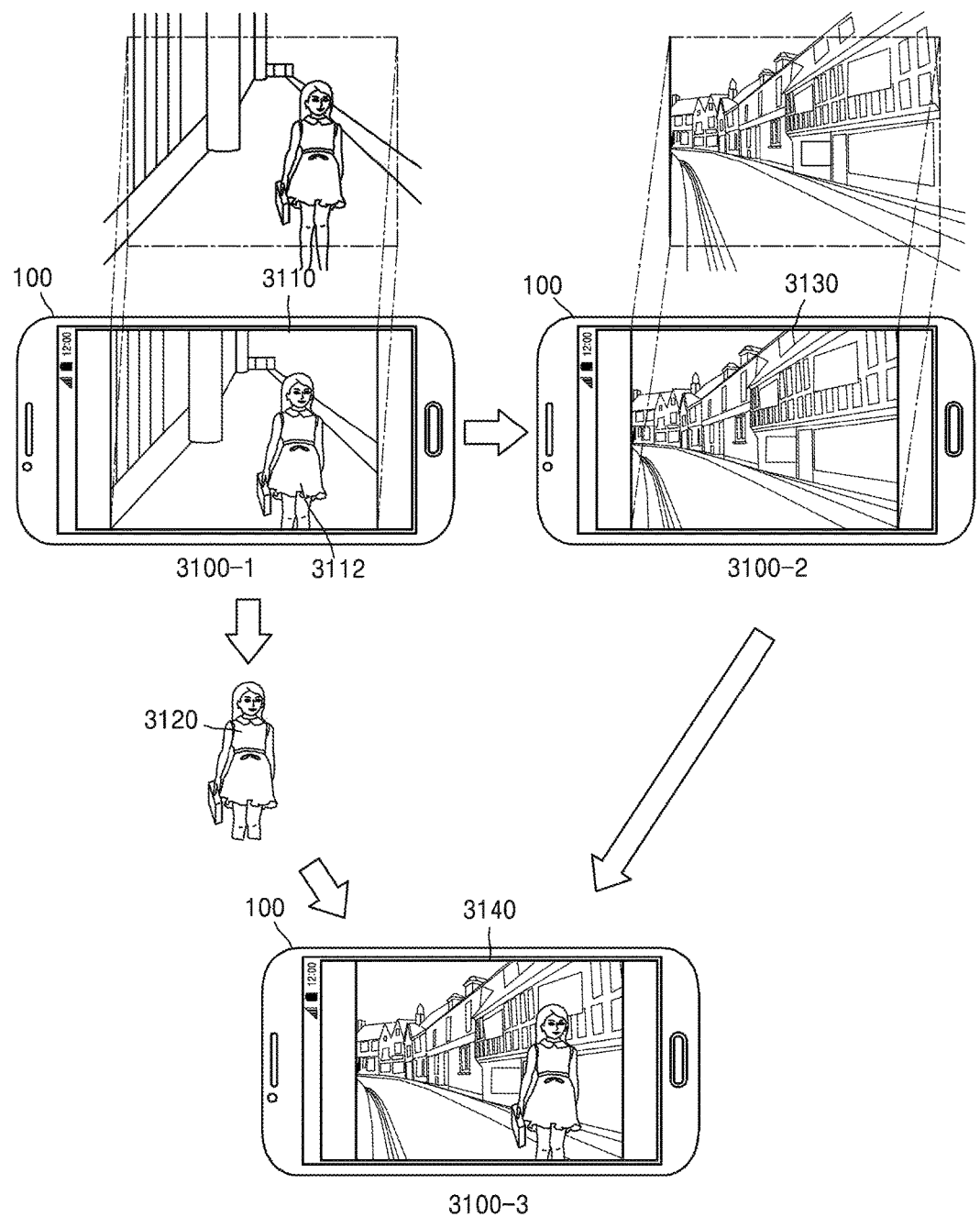
FIG. 31 is a reference view for explaining a method of generating an effect image from a live view image, according to an exemplary embodiment.

FIG. 31 is a reference view for explaining a method of generating an effect image from a live view image, according to an exemplary embodiment. As shown in 3100-1 of FIG. 31, the device 100 may display a live view image 3110 while a mode of the device 100 is set as a photographing mode. The device 100 may select a region of interest from the live view image 3110. For example, a user may touch a partial area of the live view image 3110 on which an object 3112 is displayed. Then, the device 100 may select the object 3112 as the region of interest. When the object 3112 is selected as the region of interest, the device 100 may generate an initial temporary image including the object 3112. The device 100 may generate an image of interest 3120 comprised of only the region of interest from the initial temporary image. The device 100 may display another live view image 3130, as shown in 3100-2 of FIG. 31. In response to a user input for storage, as shown in 3100-3 of FIG. 31, the device 100 may generate an image 3140 by combining the image of interest 3120 with the live view image 3130, which is a final temporary image, and store the image 3140. The location of the image of interest 3120 may be fixed to a location on a display area where the initial temporary image is generated.

Figure 32:
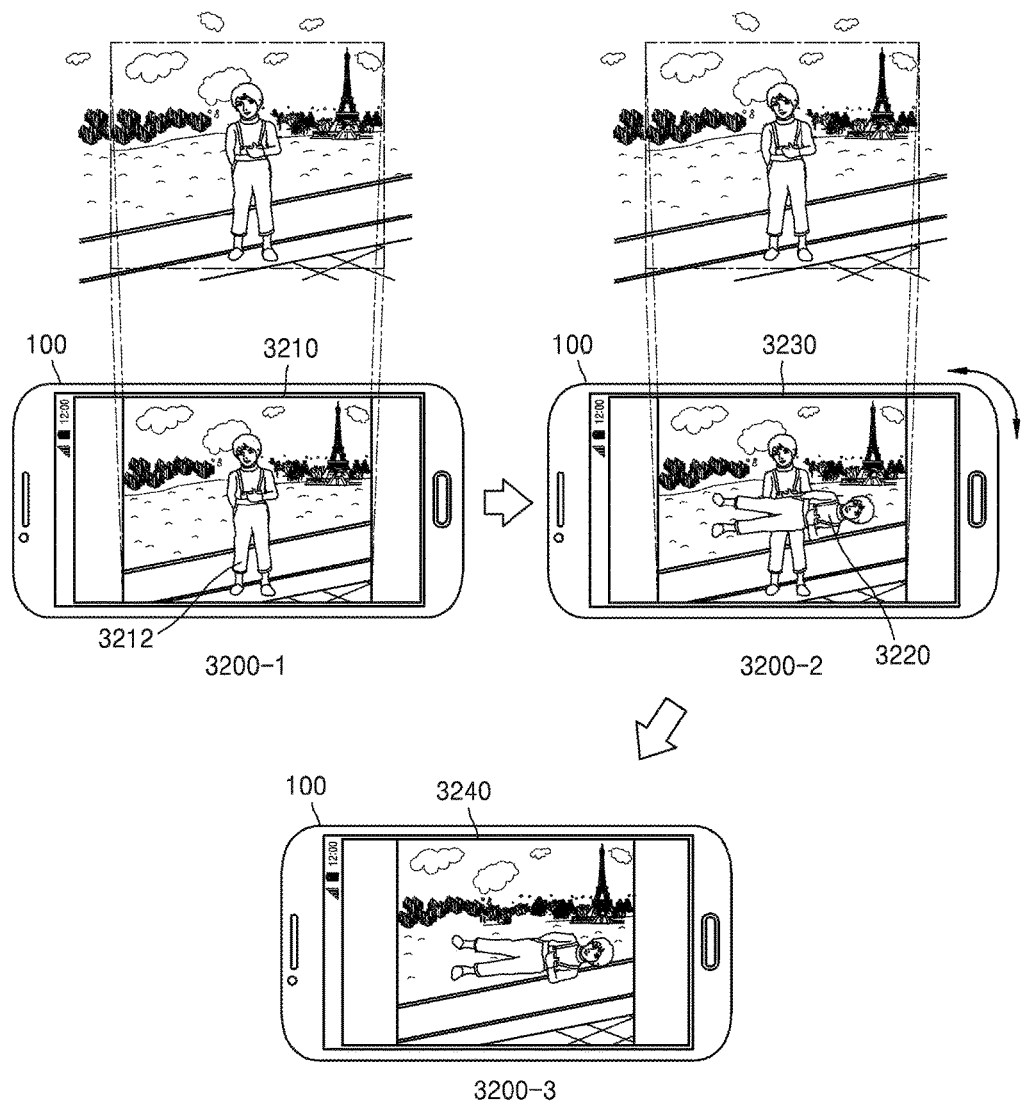
FIG. 32 is a reference view for explaining a method of generating an effect image from a live view image, according to another exemplary embodiment.

When a temporary image is fixed to the display area, the device 100 may generate various shapes of images. FIG. 32 is a reference view for explaining a method of generating an effect image from a live view image, according to an exemplary embodiment. As shown in 3200-1 of FIG. 32, the device 100 may display a live view image 3210 while a mode of the device 100 is set as a photographing mode. The device 100 may select a region of interest on the live view image 3210. For example, a user may touch a partial area of the live view image 3210 on which a first object 3212 is displayed. Then, the device 100 may select the first object 3212 as the region of interest. When the first object 3212 is selected as the region of interest, the device 100 may generates an initial temporary image including the first object 3212 and generate an image of interest 3220 from the initial temporary image. The image of interest 3220 may be displayed on the device 100 by overlapping the live view image 3210.

Since the location of the image of interest 3220 is fixed to a location where the first temporary image is generated, the image of interest 3220 displayed on the display area may be fixed even when the photographing angle or location of the camera 160 is changed. When the user rotates the camera 160 by 90 degrees, as shown in 3200-2 of FIG. 32, the image of interest 3220 fixed to the display area is also rotated 90 degrees. However, a live view image 3230 does not rotate. In response to a store command, as shown in 3200-3 of FIG. 32, the device 100 may generate an effect image 3240 by combining the image of interest 3220 with the live view image 3230, which is a final temporary image and store the effect image 3240. The final temporary image 3230 is a temporary image generated after a store input is received. The final temporary image 3230 may also include the first object 3212. The device 100 may generate the effect image 3240 by deleting the first object 3212 included in the final temporary image 3230 and combining the image of interest 3220 with the final temporary image 3230 from which the first object 3212 has been deleted. An area having no pixel information within the effect image 3240 may be restored by an image restoration technique.

Although it has been described above that an image of interest is fixed to a display area, exemplary embodiments are not limited thereto. The location of the image of interest may change according to user inputs. For example, when an image of interest and a live view image are overlapped and displayed, a user may perform an operation of touching a partial area on which the image of interest is displayed and then dragging the partial area. Then, the device 100 may change the location of the image of interest to a location where dragging is concluded, according to a user input. The device 100 may also change the size or the like of the image of interest according to a user input.

Figure 33:
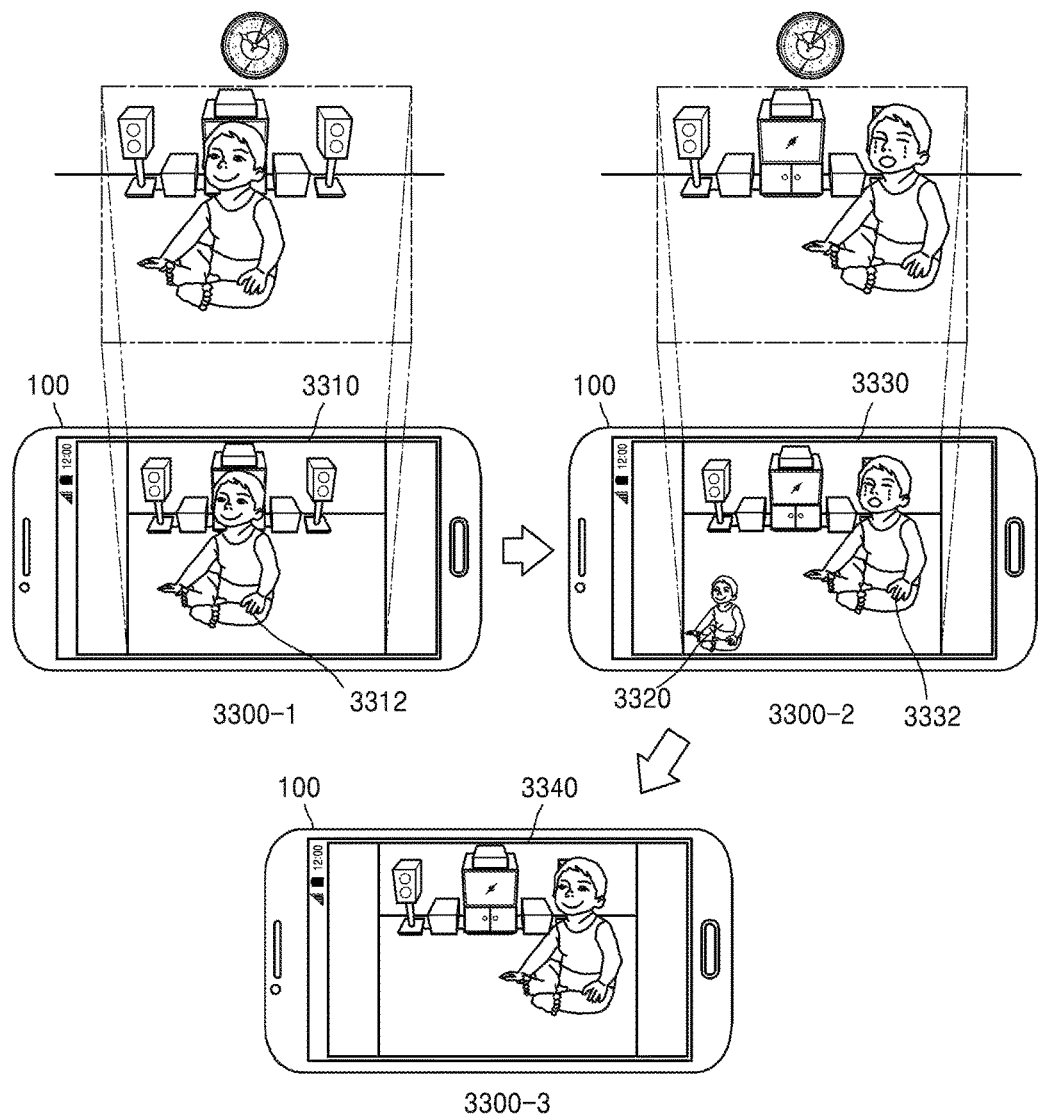
FIG. 33 is a reference view for explaining a method of generating an effect image from a live view image, according to another exemplary embodiment.

The location of the image of interest may be changed to correspond to a location of the region of interest of the live view image. FIG. 33 is a reference view for explaining a method of generating an effect image from a live view image, according to another exemplary embodiment. As shown in 3300-1 of FIG. 33, the device 100 may display a live view image 3310 while a mode of the device 100 is set as a photographing mode. The device 100 may select a region of interest on the live view image 3310. For example, a user may touch a partial area of the live view image 3310 on which a first object 3312 is displayed. Then, the device 100 may select the first object 3312 as the region of interest. When the first object 3312 is selected as the region of interest, the device 100 may generate an image of interest 3320 including the first object 3312.

As shown in 3300-2 of FIG. 33, the device 100 may display the image of interest 3320 at a predetermined location on the display area. In other words, the device 100 may not display the image of interest 3320 at a location where the image of interest 3320 is generated, but may display the image of interest 3320 at a location predetermined by the device 100. The image of interest 3320 displayed on the device 100 may overlap a live view image 3330. The live view image 3330 of 3300-2 of FIG. 33 may differ from the live view image 3310 of 3300-1 of FIG. 33.

In response to a store input, the device 100 may generate an effect image 3340, as shown in 3300-3 of FIG. 33. The device 100 may generate the effect image 3340 by moving the image of interest 3320 to a first object 3332 corresponding to a region of interest of the live view image 3330, which is a final temporary image. In FIG. 33, when a store input is received, an image of interest is moved to the location of a first object of a final temporary image and combined with the final temporary image. However, exemplary embodiments are not limited thereto. When displaying a live view image, the device 100 may move the image of interest to an area corresponding to the image of interest, namely, an area on which the first object is displayed, and display the live view image in real time.

It has been described above that an effect image is generated using an initial temporary image when a region of interest is selected on a live view image and a final temporary image. However, exemplary embodiments are not limited thereto. The device 100 may generate at least one temporary image in addition to the initial temporary image and the final temporary image. The device 100 may generate an effect image by using the at least one temporary image.

Figure 34:
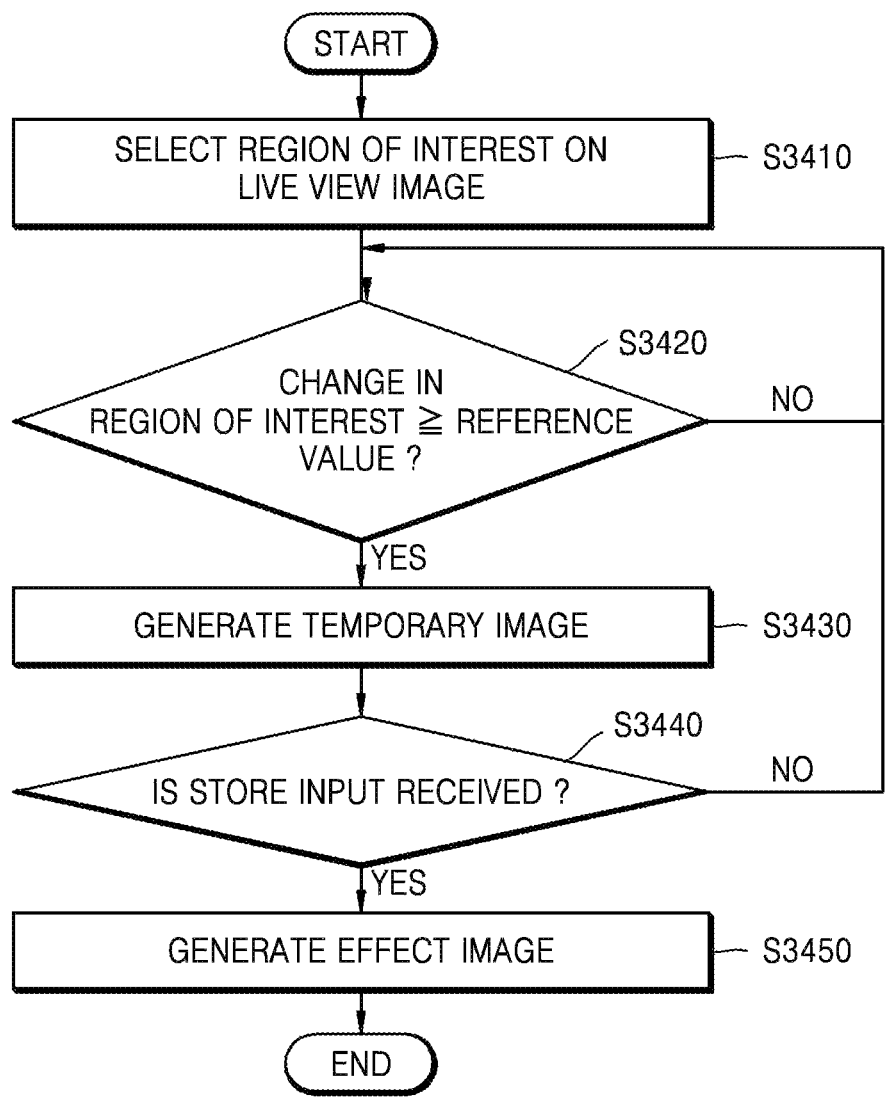
FIG. 34 is a flowchart of a method of generating an effect image from a live view image, according to another exemplary embodiment.

FIG. 34 is a flowchart of a method of generating an effect image from a live view image, according to another exemplary embodiment.

In operation S3410, the device 100 may select a region of interest on a live view image. While a mode of the device 100 is set as a photographing mode, the device 100 may display the live view image. A user may touch a partial area of the live view image on which an object or a background is displayed. Then, the device 100 may select the object or background displayed on an area including the touched partial area, as the region of interest.

In operations S3420 and S3430, when a change in the region of interest is equal to or greater than a reference value, the device 100 may generate a temporary image.

The temporary image may be a screen image displayed as a live view image, or may be an image of interest comprised of only the region of interest. The device 100 generates an initial temporary image when the region of interest is selected. The device may calculate a difference between a pixel value of a region of interest of a previously generated temporary image and a pixel value of the region of interest included in the live view image. If the calculated difference is equal to or greater than a reference value, the device 100 may generate the live view image as the temporary image.

The change in the region of interest may be generated due to a movement of an object or background corresponding to the region of interest, due to a change in the size of the object or the background, or due to a change in the pixel value (i.e., a light amount) of the object or the background.

The device 100 may generate the temporary image until a store input is received. In other words, the device 100 may store, as the temporary image, an image in which a change in a region of interest is equal to or greater than the reference value, until a store input is received. The temporary images may include an initial temporary image and a final temporary image.

When the device 100 receives a store input in operation S3440, the device 100 may generate an effect image, in operation S3450. The device 100 may generate the effect image by combining a plurality of temporary images with one another. Alternatively, the device 100 may generate the effect image in response to a user input of selecting one from among a plurality of temporary images. The effect image corresponding to the user input of selecting one from among a plurality of temporary images may not be considered an effect image in the strict sense. However, for convenience of explanation, the effect image corresponding to the user input of selecting one from among a plurality of temporary images is referred to as an effect image, because the device 100 may display the plurality of temporary images such that a user may select one temporary image therefrom, and a selected temporary image may not be stored as a still image or the like until a user input of selecting one of the plurality of temporary images is received.

Figure 35:
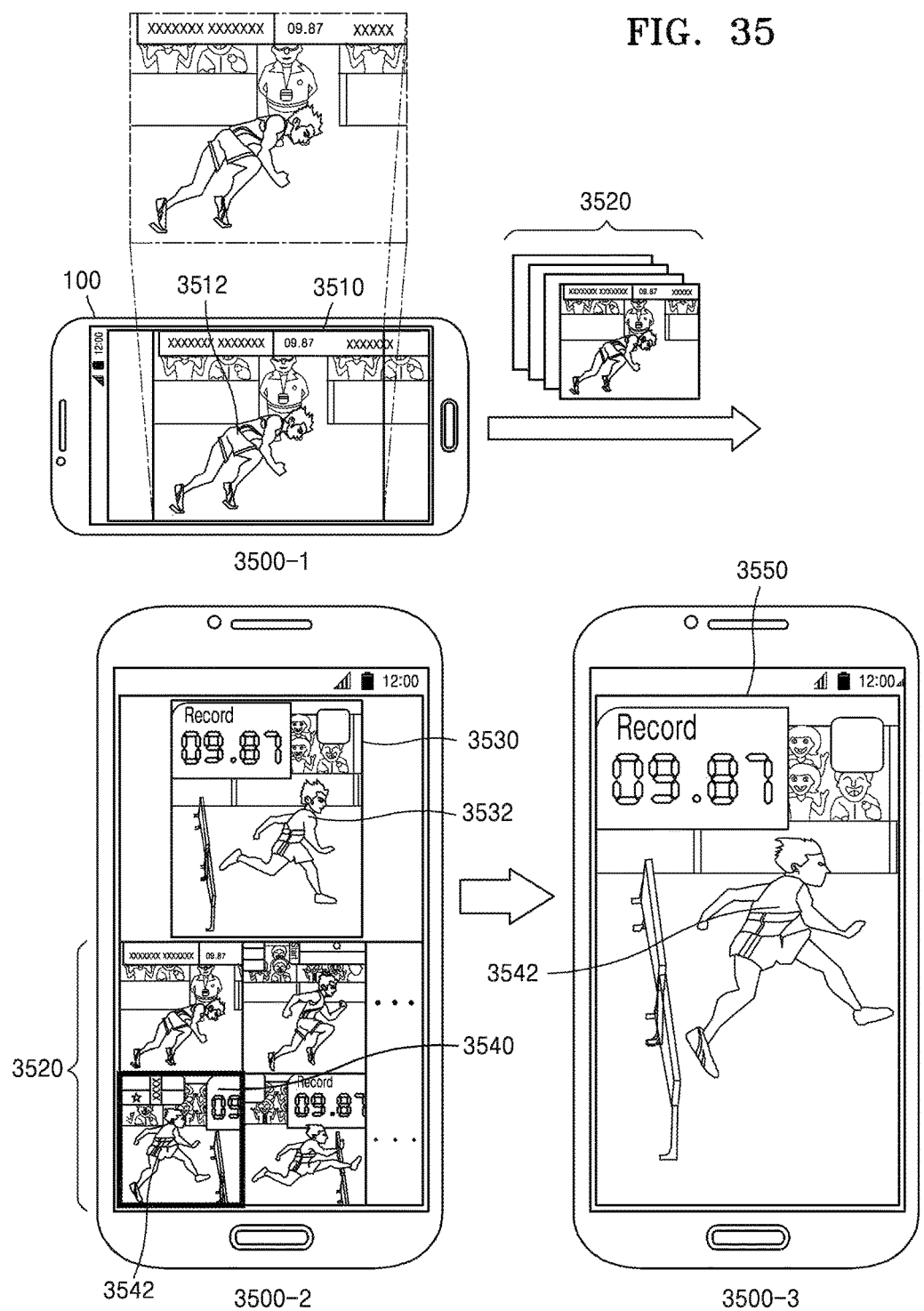
FIG. 35 is a reference view for explaining a method of generating an effect image from a live view image, according to an exemplary embodiment.

FIG. 35 is a reference view for explaining a method of generating an effect image from a live view image, according to an exemplary embodiment. As shown in 3500-1 of FIG. 35, the device 100 may display a live view image 3510 while a mode of the device 100 is set as a photographing mode for a still image. The device 100 may select a region of interest on the live view image 3510. For example, a user may touch a partial area of the live view image 3510 on which a first object 3512 is displayed. Then, the device 100 may select the first object 3512 as the region of interest. When the first object 3512 is selected as the region of interest, the device 100 may generate a temporary image including the first object 3512.

The device 100 may generate a temporary image 3520 at interval of a predetermined time, until the device 100 receives a store input. Alternatively, when a change in the first object 3512 is equal to or greater than a reference value, the device 100 may generate the temporary image 3520. The temporary image 3520 may be a screen image displayed as the live view image 3510, or may be an image of interest comprised of only the first object 3512. In FIG. 35, the temporary image 3520 is a screen image displayed as the live view image 3510.

In response to a store input, the device 100 may generate a final temporary image 3530 and the other temporary images 3520, as shown in 3500-2 of FIG. 35. The final temporary image 3530 and the temporary images 3520 may be displayed on separate areas. When a plurality of second images 3520 are found, the device 100 may sequentially arrange the plurality of temporary images 3520 in the order in which the plurality of temporary images 3520 are generated.

In a response to a user input of selecting a temporary image 3540 from the plurality of temporary images 3520, the device 100 may display an effect image 3550 obtained by combining the final temporary image 3530 with a region of interest of the selected temporary image 3540, as shown in 3500-3 of FIG. 35. The device 100 may generate the effect image 3550 by replacing a first object 3532 of the final temporary image 3530 with a first object 3542 of the selected temporary image 3540. A method of generating an effect image by using an object as a region of interest within a live view image has been described above. An object is used as a region of interest above for convenience of explanation, and the method of generating an effect image by using an object as a region of interest may be equally applied to when using a background.

Figure 36:
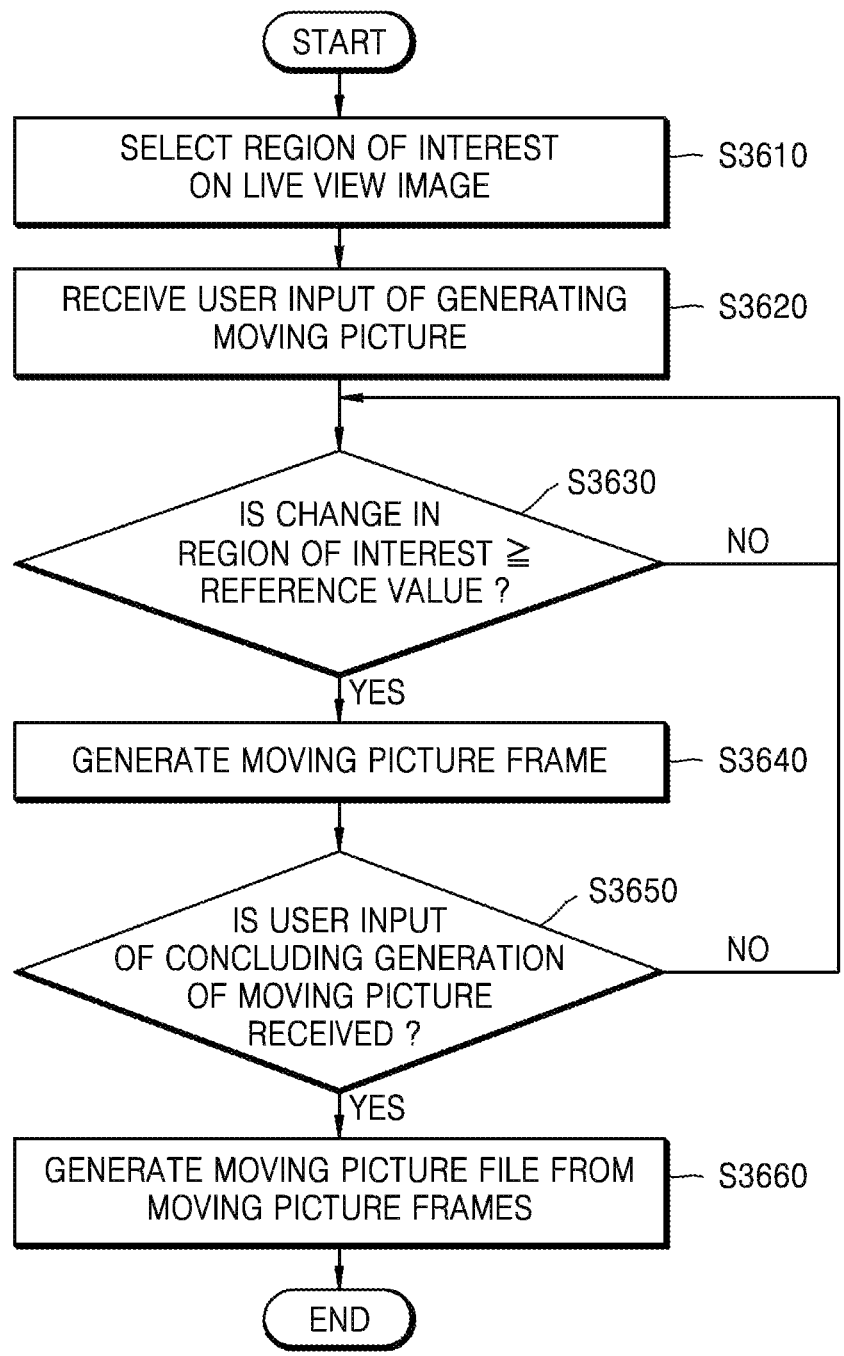
FIG. 36 is a flowchart of a method of generating a moving picture from a live view image, according to an exemplary embodiment.

The device 100 may generate a moving picture due to a change in a region of interest. FIG. 36 is a flowchart of a method of generating a moving picture from a live view image, according to an exemplary embodiment.

In operation S3610, the device 100 may select a region of interest on a live view image. While a mode of the device 100 is set as a moving picture generation mode, the device 100 may display the live view image. A user may touch a partial area of the live view image on which an object or a background is displayed. Then, the device 100 may select the object or background displayed on an area including the touched partial area, as the region of interest.

In operation S3620, the device 100 may receive a user input of generating a moving picture. The user input may vary. For example, the user input may be at least one selected from a key input, a touch input, a motion input, a bending input, a voice input, and multiple inputs.

In operation S3630, the device 100 determines whether a change in the region of interest is equal to or greater than a reference value. If the change in the region of interest is equal to or greater than the reference value, then in operation S3640, the device 100 may generate a moving picture frame. The device 100 generates, as the moving picture frame, a live view image generated at the moment when the user input for generating a moving picture is received. Every time the change in the region of interest is equal to or greater than the reference value, the device 100 may generate the moving picture frame. The moving picture frame may be a screen image displayed as the live view image or may be information representing a variation in a previous moving picture frame. The moving picture frame may be generated until a user input of concluding generation of a moving picture is received in operation S3660.

When the region of interest is an object, the change in the region of interest may be, for example, a change in the movement of the object, the size thereof, or a pixel value representing the object. When the region of interest is a background, the change in the region of interest may be, for example, a change in the background or a pixel value representing the background.

In operation S3660, in response to the user input of concluding generation of a moving picture, the device 100 may generate a moving picture file from the moving picture frames.

Figure 37:
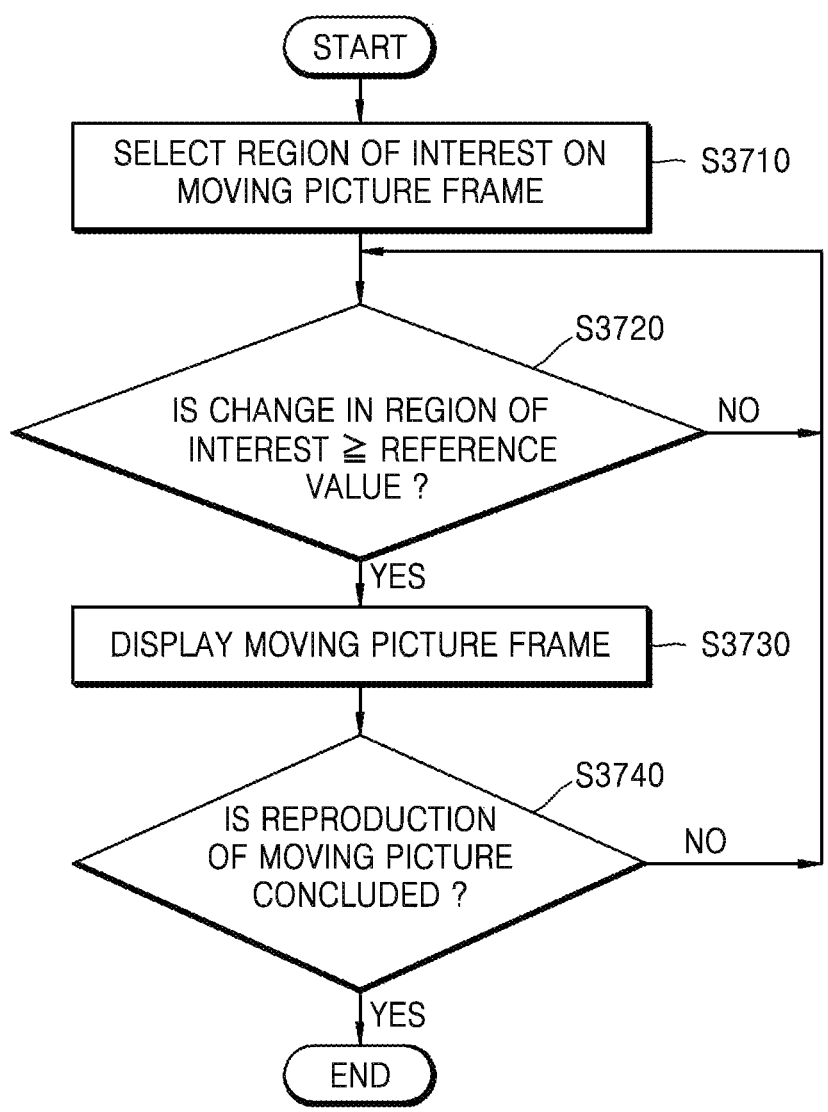
FIG. 37 is a flowchart of a method of reproducing a moving picture, according to an exemplary embodiment.

The device 100 may reproduce a moving picture by using moving picture frames in which changes in regions of interest are equal to or greater than the reference value. FIG. 37 is a flowchart of a method of reproducing a moving picture, according to an exemplary embodiment.

In operation S3710, the device 100 may select a region of interest on a moving picture frame. While a mode of the device 100 is set as a moving picture reproducing mode, the device 100 may display a moving picture. A user may input a command of stopping the moving picture. In response to a user input, the device 100 may display a moving picture frame, which is a still image of the moving picture. The user may touch a partial area of the moving picture frame on which an object or a background is displayed. Then, the device 100 may select the object or background displayed on an area including the touched partial area, as the region of interest.

In operation S3720 the device 100 determines whether a change in the region of interest is equal to or greater than a reference value. When the change in the region of interest is equal to or greater than the reference value, the device 100 may display a moving picture frame in operation S3730. The device 100 may compare the displayed moving picture frame (hereinafter, referred to as a current frame) with a moving picture frame which is to be reproduced after the current frame is reproduced (hereinafter, referred to as a first next frame). The device 100 may calculate a change between regions of interest of the two frames. When the calculated change is equal to or greater than the reference value, the device 100 may reproduce and display the first next frame.

On the other hand, when the calculated change is less than the reference value, the device 100 does not display the first next frame. The device 100 may calculate again a change between regions of interest of the current frame and a moving picture frame which is to be reproduced after the first next frame is reproduced (hereinafter, referred to as a second next frame). When the calculated change is equal to or greater than the reference value, the device 100 may reproduce and display the second next frame. On the other hand, when the calculated change is less than the reference value, the device 100 does not display the second next frame. Operations S3720 and S3730 may be repeated until reproduction of a moving picture is concluded in operation S3740. In other words, the device 100 may repeatedly perform operations S3720 and S3730 until a user input of concluding reproduction of a moving picture is received or the reproduction of the moving picture is completed in S3740. A method of reproducing a moving picture has been described above with reference to FIG. 37. However, exemplary embodiments are not limited thereto. The method may also be applied to when a still image is reproduced in a slide show method.

A method of generating, reproducing, and displaying an image by using a region of interest which is a partial area of an image has been described up to now. The device 100 may provide various menu images by using a region of interest. A menu image may include a menu item for executing a specific application. The menu item may be an object, and an area of the menu image that is not the menu item may be defined as a background.

Figure 38:
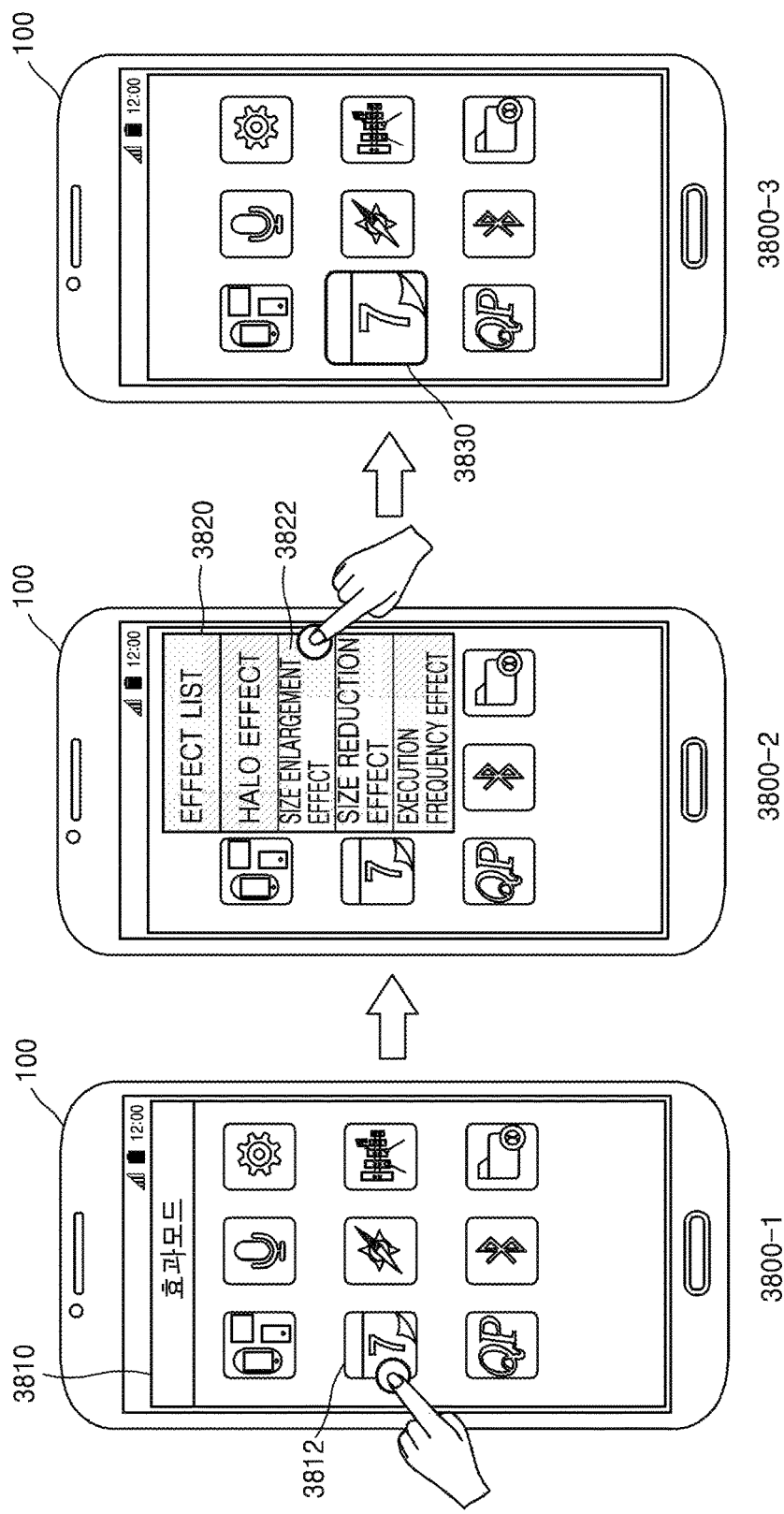
FIG. 38 is a reference view for explaining a method of displaying an effect on a menu image, according to an exemplary embodiment.

FIG. 38 is a reference view for explaining a method of displaying an effect on a menu image, according to an exemplary embodiment. First, as shown in 3800-1 of FIG. 38, the device 100 may display a menu image 3810 while a mode of the device 100 is set as an effect mode for a menu image. A user may select a menu item 3812, which is a region of interest, on the menu image 3810. When the menu item 3812 is selected, as shown in 3800-2 of FIG. 38, the device 100 may display an effect list 3820 including effects that are applicable to the menu item 3812. When the user selects an effect item 3822 from the effect list 3820, as shown in 3800-3 of FIG. 38, the device 100 may display a menu item 3830 to which an effect has been provided.

Figure 39:
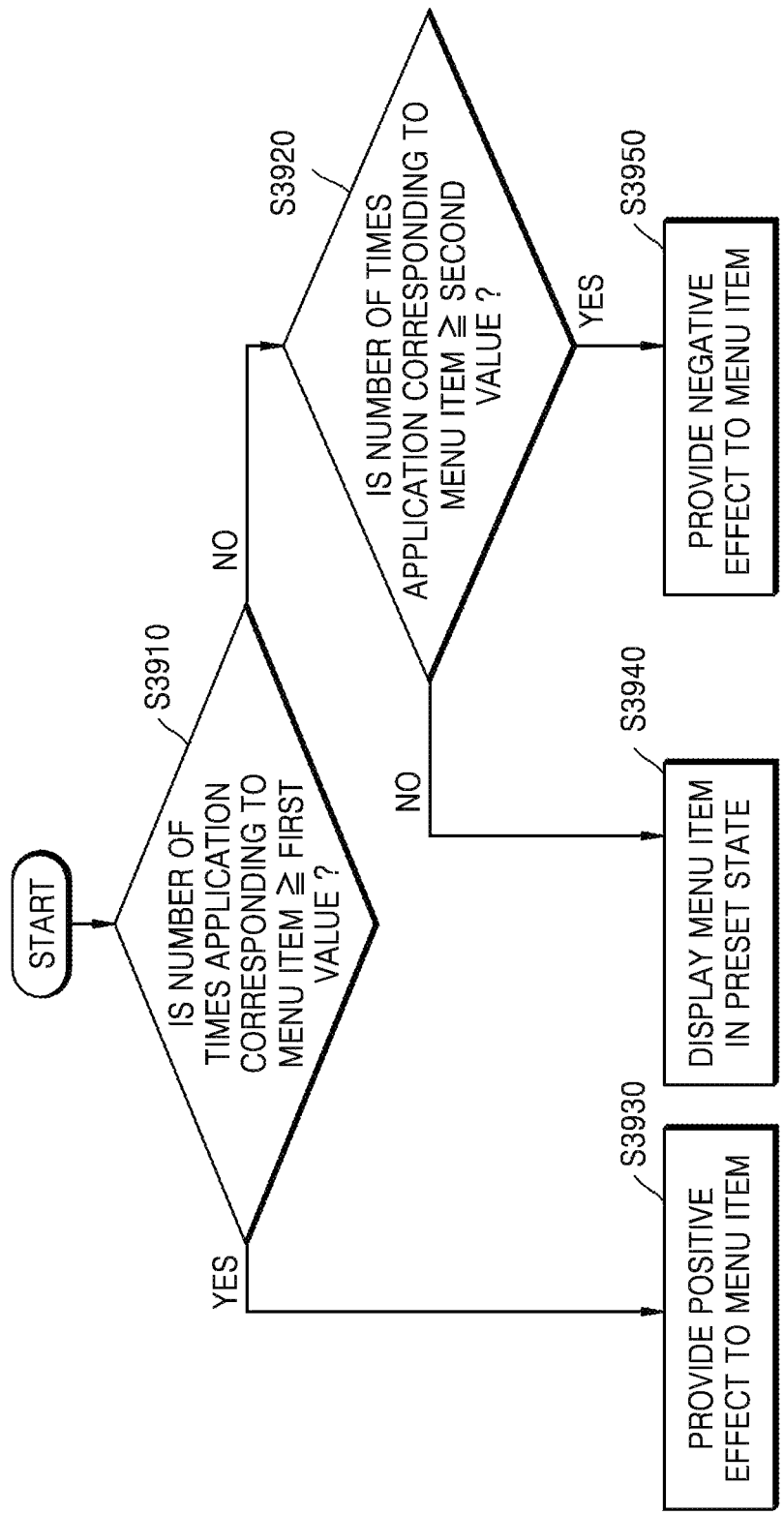
FIG. 39 is a flowchart of a method of providing an effect to a menu item according to the number of times an application corresponding to the menu item is executed, according to an exemplary embodiment.

An effect may be provided to a menu item according to the number of times an application corresponding to the menu item is executed. FIG. 39 is a flowchart of a method of providing an effect to a menu item according to the number of times an application corresponding to the menu item is executed, according to an exemplary embodiment.

In operation S3910, the device 100 may determine the number of times the application corresponding to the menu item is executed. The device 100 may determine the number of times the application corresponding to the menu item is executed within a preset period of time.

If the number of times the application corresponding to the menu item is executed is equal to or greater than a first value in operation S3910, the device 100 may provide a positive effect to the menu item in operation S3930. The positive effect may be an effect of reinforcing distinctiveness of a menu item, and may be, for example, a halo effect, a size enlargement effect, or a depth reduction effect.

If the number of times the application corresponding to the menu item is executed is less than the first value in operation S3910 and equal to or greater than a second value in operation S3920, the device 100 may provide no effects to the menu item. In other words, the device 100 may display the menu item in a preset state in operation S3940. The second value may be less than the first value.

If the number of times the application corresponding to the menu item is executed is less than the first value in operation S3910 and is also less than the second value in operation S3920, the device 100 may provide a negative effect to the menu item in operation S3950. The negative effect may be an effect of weakening distinctiveness of a menu item, and may be, for example, a blur effect, a size reduction effect, or a depth increasing effect. In some exemplary embodiments, if the number of times the application corresponding to the menu item is executed is less than a third value, the device 100 may delete the menu item from a menu image.

Figure 40:
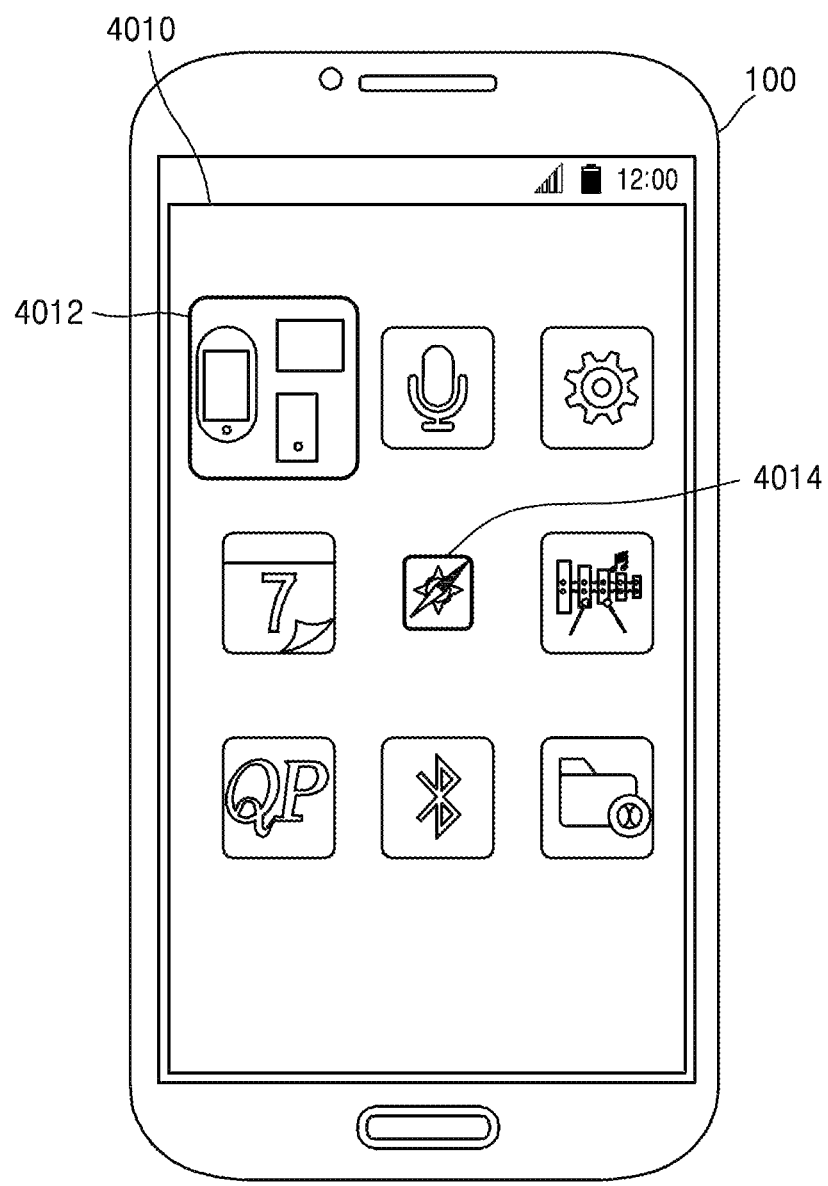
FIG. 40 illustrates an example of displaying a menu image in which an effect has been provided to a menu item according to the number of times an application corresponding to the menu item is executed, according to an exemplary embodiment.

FIG. 40 illustrates an example of displaying a menu image in which an effect has been provided to a menu item according to the number of times an application corresponding to the menu item is executed, according to an exemplary embodiment. As shown in FIG. 40, the device 100 may display a menu image 4010. The device 100 may display a first menu item 4012 to be larger than the other menu items. This means that the first menu item 4012 has been executed more frequently than the other menu items. A user is highly likely to select the first menu item 4012 more than the other menu items in the future. Since the first menu item 4012 is largely displayed and is thus distinct, the user is able to more easily find the first menu item 4012 than the other menu items. The device 100 may display a second menu item 4014 to be smaller than the other menu items. This means that the second menu item 4014 has been executed less frequently than the other menu items. The probability that the user selects the second menu item 4014 in the future is low.

FIGS. 41-45 are block diagrams of the device 100 according to exemplary embodiments.

Figure 41:
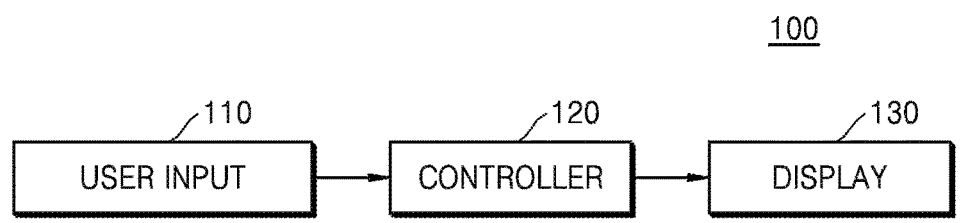
FIGS. 41-45 are block diagrams of a device according to an exemplary embodiment.

Referring to FIG. 41, the device 100 may include a user input 110, a controller 120, and a display 130. The device 100 may provide an effect to, for example, a still image, moving picture frame, live view image, or screen image displayed on the display 130.

Figure 42:
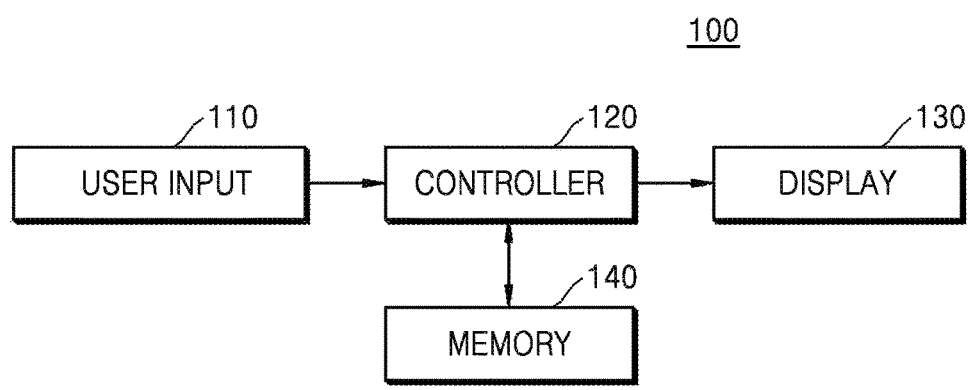

Referring to FIG. 42, in other exemplary embodiments, the device 100 may include a user input 110, a controller 120, a display 130, and a memory 140. The device 100 may provide an effect to a still image or moving picture stored in the memory 140.

Figure 43:
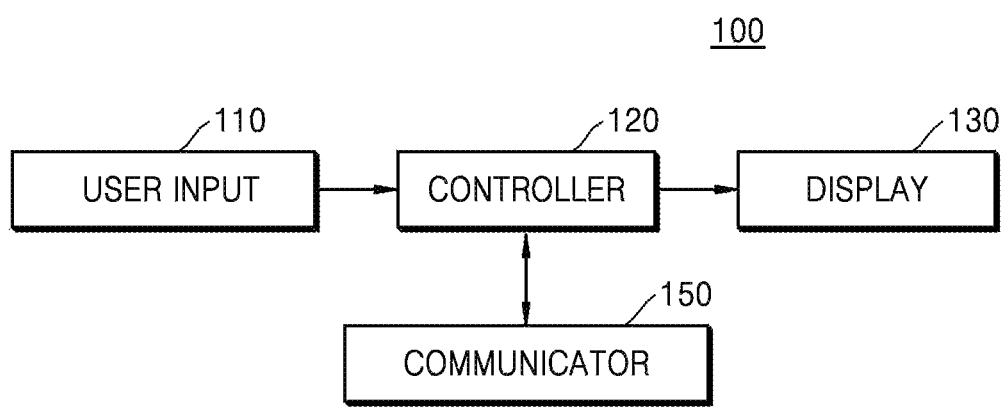

Referring to FIG. 43, in other exemplary embodiments, the device 100 may include a user input 110, a controller 120, a display 130, and a communicator 150. The device 100 may provide an effect to a still image or moving picture stored in an external device, or a live view image captured by the external device.

Figure 44:
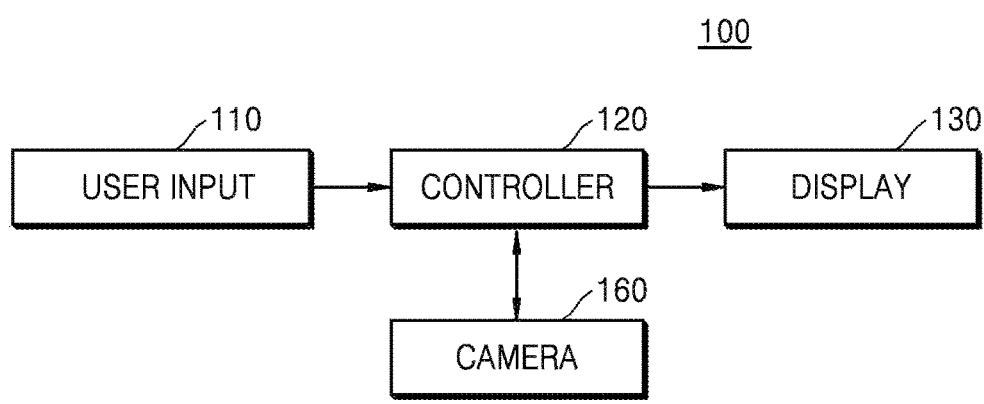

Referring to FIG. 44, in other exemplary embodiments, the device 100 may include a user input 110, a controller 120, a display 130, and a camera 160. The device 100 may provide an effect to a live view image captured by the camera 160. However, all of the illustrated components are not essential. The device 100 may be implemented by more components than those illustrated in FIG. 41, 42, 43, or 44 or by fewer components than those illustrated in FIG. 41, 42, 43, or 44, or by any combination of components including those illustrated in FIG. 41, 42, 43, or 44.

Figure 45:
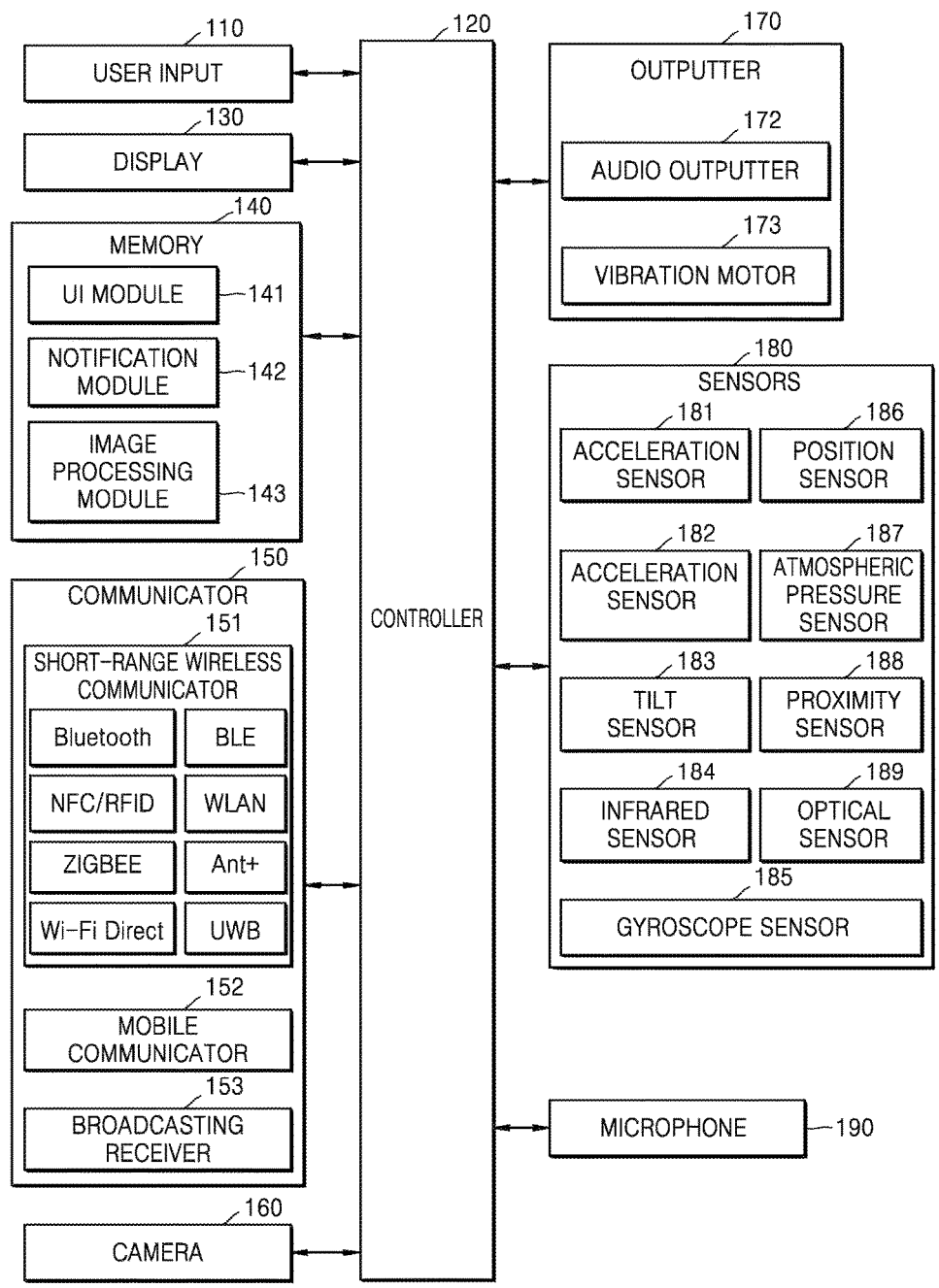

For example, as illustrated in FIG. 45, the device 100 may further include an outputter 170, a communicator 140, sensors 180, and a microphone 190, in addition to the components of each of the devices 100 of FIGS. 41-44.

The aforementioned components will now be described in detail.

The user input 110 denotes a unit via which a user inputs data for controlling the device 100. For example, the user input 110 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input 110 may receive a user input selecting a region of interest on an image. According to an exemplary embodiment, the user input selecting a region of interest may vary. For example, the user input may be a key input, a touch input, a motion input, a bending input, a voice input, or multiple inputs.

According to an exemplary embodiment, the user input 110 may receive an input selecting a first image and a second image from a plurality of images.

The user input unit 110 may receive an input of selecting at least one piece of identification information from an identification information list.

The controller 120 typically controls all operations of the device 100. For example, the controller 120 may control the user input 110, the outputter 170, the communicator 150, the sensors 180, and the microphone 190 by executing programs stored in the memory 140.

The controller 120 may acquire at least one piece of identification information that identifies the selected region of interest. For example, the controller 120 may generate identification information by checking attribute information of the selected region of interest and generalizing the attribute information. The controller 120 may detect identification information by using image analysis information about the selected region of interest. The controller 120 may acquire identification information of the second image in addition to the identification information of the region of interest.

The controller 120 may provide an effect to the region of interest such that an object or background corresponding to the region of interest is displayed entirely differently from a previously-displayed object or background. The effect may be, for example, a halo effect of highlighting the region of interest, a blur effect of reducing a difference between the values of the pixels of the region of interest, a size effect of adjusting the size of the region of interest, and a depth effect of changing depth information of the region of interest.

The controller 120 may provide an effect to the first image by separating a partial image corresponding to a region of interest of the first image from the second image and combining the separated partial image with the region of interest of the first image.

The display 130 may display information that is processed by the device 100. For example, the display 130 may display a still image, a moving picture, or a live view image. The display 130 may also display identification information that identifies the region of interest. The display 130 may also display an effect image and may display an effect folder including effect images.

When the display 130 forms a layer structure together with a touch pad to construct a touch screen, the display 130 may be used as an input device as well as an output device. The display 130 may include at least one selected from a liquid crystal display (LCD), a thin film transistor-liquid crystal display (TFT-LCD), an organic light-emitting diode (OLED), a flexible display, a 3D display, and an electrophoretic display. According to exemplary embodiments of the device 100, the device 100 may include at least two displays 130.

The memory 140 may store a program used by the controller 120 to perform processing and control, and may also store input/output data (for example, a plurality of images, a plurality of folders, and a preferred folder list).

The memory 140 may include at least one type of storage medium selected from among a flash memory type, a hard disk type, a multimedia card micro type, a card type memory (for example, a secure digital (SD) or extreme digital (XD) memory), random access memory (RAM), a static random access memory (SRAM), read-only memory (ROM), electrically erasable programmable ROM (EEPROM), programmable ROM (PROM), magnetic memory, a magnetic disk, and an optical disk. The device 100 may operate a web storage on the internet which performs a storage function of the memory 140.

The programs stored in the memory 140 may be classified into a plurality of modules according to their functions, for example, a user interface (UI) module 141, a notification module 142, and an image processing module 143.

The UI module 141 may provide a UI, GUI, or the like that is specialized for each application and interoperates with the device 100. The notification module 142 may generate a signal for notifying that an event has been generated in the device 100. The notification module 142 may output a notification signal in the form of a video signal via the display unit 130, in the form of an audio signal via an audio output unit 172, or in the form of a vibration signal via a vibration motor 173.

The image processing module 143 may acquire object information, edge information, atmosphere information, color information, and the like included in a captured image by analyzing the captured image.

According to an exemplary embodiment, the image processing module 143 may detect a contour line of an object included in the captured image. According to an exemplary embodiment, the image processing module 143 may acquire the type, name, and the like of the object by comparing the contour line of the object included in the image with a predefined template. For example, when the contour line of the object is similar to a template of a vehicle, the image processing module 143 may recognize the object included in the image as a vehicle.

According to an exemplary embodiment, the image processing module 143 may perform face recognition on the object included in the image. For example, the image processing module 143 may detect a face region of a human from the image. Examples of a face region detecting method may include knowledge-based methods, feature-based methods, template-matching methods, and appearance-based methods, but exemplary embodiments are not limited thereto.

The image processing module 143 may extract face features (for example, the shapes of the eyes, the nose, and the mouth as major parts of a face) from the detected face region. To extract a face feature from a face region, a gabor filter, an LBP, or the like may be used, but exemplary embodiments are not limited thereto.

The image processing module 143 may compare the face feature extracted from the face region within the image with face features of pre-registered users. For example, when the extracted face feature is similar to a face feature of a pre-registered first register (e.g., Tom), the image processing module 143 may determine that an image of the first user is included in the image.

According to an exemplary embodiment, the image processing module 143 may compare a certain area of an image with a color map (color histogram) and extract visual features, such as a color arrangement, a pattern, and an atmosphere of the image, as image analysis information.

The communicator 150 may include at least one component that enables the device 100 to perform data communication with a cloud server, an external device, an SNS server, or an external wearable device. For example, the communication unit 150 may include a short-range wireless communicator 151, a mobile communicator 152, and a broadcasting receiver 153.

The short-range wireless communicator 151 may include, but is not limited to, a Bluetooth communicator, a Bluetooth Low Energy (BLE) communicator, a near field communication (NFC) communicator, a wireless local area network (WLAN) (e.g., Wi-Fi) communicator, a ZigBee communicator, an infrared Data Association (IrDA) communicator, a Wi-Fi direct (WFD) communicator, an ultra wideband (UWB) communicator, an Ant+ communicator, and the like.

The mobile communicator 152 may exchange a wireless signal with at least one selected from a base station, an external terminal, and a server on a mobile communication network. Examples of the wireless signal may include a voice call signal, a video call signal, and various types of data generated during a short message service (SMS)/multimedia messaging service (MMS).

The broadcasting receiver 153 receives a broadcasting signal and/or broadcasting-related information from an external source via a broadcasting channel. The broadcasting channel may be a satellite channel, a ground wave channel, or the like. According to exemplary embodiments, the device 100 may not include the broadcasting receiver 153.

The communicator 150 may share at least one selected from the first and second images, the effect image, the effect folder, and the identification information with the external device. The external device may be at least one selected from a cloud server, an SNS server, another device 100 of the same user, and a device 100 of another user, which are connected to the device 100, but exemplary embodiments are not limited thereto.

For example, the communicator 150 may provide the effect image or the effect folder to the external device. The communicator 150 may receive a still image or moving picture stored in the external device, or a live view image captured by the external device, from the external device.

The image frame obtained by the camera 160 may be stored in the memory 140 or transmitted to the outside via the communicator 150. At least two cameras 160 may be included according to exemplary embodiments of the device 100.

The outputter 170 outputs an audio signal, a video signal, or a vibration signal, and may include the audio outputter 172 and the vibration motor 173.

The audio outputter 172 may output audio data that is received from the communicator 150 or stored in the memory 140. The audio outputter 172 may also output an audio signal (for example, a call signal receiving sound, a message receiving sound, a notification sound) related with a function of the device 100. The audio outputter 172 may include a speaker, a buzzer, and the like.

The vibration motor 173 may output a vibration signal. For example, the vibration motor 173 may output a vibration signal corresponding to an output of audio data or video data (for example, a call signal receiving sound or a message receiving sound). The vibration motor 173 may also output a vibration signal when a touch screen is touched.

The sensors 180 may sense the status of the device 100, the status of the surrounding of the device 100, or the status of a user who wears the device 100, and may transmit information corresponding to the sensed status to the control unit 120.

The sensors 180 may include, but is not limited thereto, at least one selected from a magnetic sensor 181, an acceleration sensor 182, a tilt sensor 183, an infrared sensor 184, a gyroscope sensor 185, a position sensor (e.g., a GPS) 186, an atmospheric pressure sensor 187, a proximity sensor 188, and an optical sensor 189. The sensing unit 180 may include, for example, a temperature sensor, an illumination sensor, a pressure sensor, and an iris recognition sensor. Functions of most of the sensors would be instinctively understood by one of ordinary skill in the art in view of their names and thus detailed descriptions thereof will be omitted herein.

The microphone 190 may be included as an audio/video (A/V) input unit.

The microphone 190 receives an external audio signal and converts the external audio signal into electrical audio data. For example, the microphone 190 may receive an audio signal from an external device or a speaking person. The microphone 190 may use various noise removal algorithms in order to remove noise that is generated while receiving the external audio signal.

Figure 46:
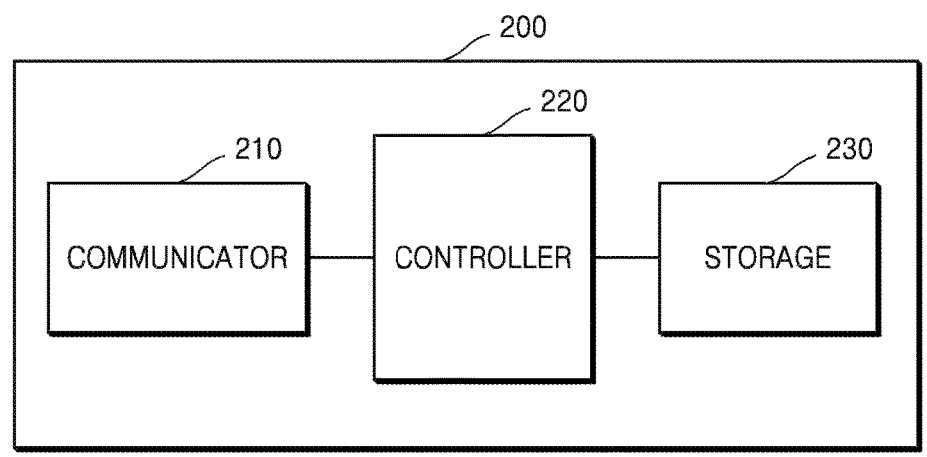
FIG. 46 is a block diagram of a structure of a cloud server, according to an exemplary embodiment.

FIG. 46 is a block diagram of a structure of a remote server or cloud server 200, according to an exemplary embodiment.

Referring to FIG. 46, the cloud server 200 may include a communicator 210, a controller 220, and a storage 230. However, all of the illustrated components are not essential. The cloud server 200 may be implemented by more components than those illustrated in FIG. 46 or by fewer components than those illustrated in FIG. 46.

The aforementioned components will now be described in detail.

The communicator 210 may include at least one component that enables communication between the cloud server 200 and the device 100. The communicator 210 may include a receiver and a transmitter.

The communicator 210 may transmit an image or image list stored in the cloud server 200 to the device 100. For example, when the communicator 210 receives a request for an image list from the device 100 connected via a specific account, the communicator 210 may transmit the image list stored in the cloud server 200 to the device 100.

The communicator 210 may transmit identification information stored in the cloud server 200 or generated by the cloud server 200 to the device 100.

The controller 220 controls all operations of the cloud server 200. For example, the controller 220 may acquire a plurality of pieces of identification information that identify an image. According to an exemplary embodiment, the plurality of pieces of identification information may be at least two core words or phrases that identify an image.

For example, when a plurality of pieces of identification information are predefined in metadata of an image, the controller 220 may acquire a plurality of pieces of identification information from the metadata of the image. The cloud server 200 may acquire a plurality of pieces of identification information that identify an image, by using at least one selected from attribute information and image analysis information of the image.

The storage 230 may store a program that is used by the controller 220 to perform processing, or may store input/output data. For example, the cloud server 200 may establish image database (DB), DB of devices, DB of face feature information of users, and object template DB.

The storage 230 may store a plurality of images. For example, the storage 230 may store an image uploaded from the device 100. In this case, the storage 230 may map the identification information of the device 100 with the image and store them.

A method according to an exemplary embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for exemplary embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

The exemplary embodiments should be considered in descriptive sense only and not for purposes of limitation. Descriptions of features or aspects within each exemplary embodiment should typically be considered as available for other similar features or aspects in other exemplary embodiments.

While exemplary embodiments have been particularly shown and described, it will be understood by those of ordinary skill in the art that various changes in form and details may be made therein without departing from the spirit and scope of the following claims.

What is claimed is:

1. An image providing method comprising:
    displaying a first image, the first image including an object and a background;
    receiving a user input selecting the object or the background as a first region;
    generating a first effect image by applying an effect to the first region;
    acquiring first identification information associated with the first region;
    searching a second image from a plurality of images, the second image including a second region associated with second identification information being the same as the first identification information; and
    generating a second effect image by applying the same effect as that applied to the first region to the second region,
    wherein the first image and the second image are images captured by at least two cameras built into a single electronic apparatus, wherein the generating of the first effect image, the acquiring of the first identification information, the searching of the second image and the generating of the second effect image are performed automatically in sequence in response to the receiving the user input, and, wherein the first image is a moving image captured by the electronic apparatus.

2. The image providing method of claim 1, wherein the first identification information is acquired based on first attribute information which includes at least one of context information associated with generation of the first image, and annotation information about the first image, the annotation information being added by a user.

3. The image providing method of claim 1, wherein the first identification information is acquired by generalizing first attribute information based on WordNet.

4. The image providing method of claim 1, wherein the searching of the second image comprises acquiring the second identification information of the second image using at least one of second attribute information of the second image and image analysis information of the second image.

5. The image providing method of claim 1, wherein the first identification information of the first region is acquired from first attribute information, the first attribute information comprising a plurality of attributes of the first image.

6. The image providing method of claim 5, further comprising displaying a list of the plurality of attributes of the first image.

7. The image providing method of claim 6, further comprising:
receiving a user input selecting at least one of the plurality of attributes of the first image, and
generating the first identification information based on the selected at least one attribute, and
wherein the searching of the second image comprises comparing the first identification information with third identification information of the plurality of images.

8. The image providing method of claim 1, wherein the generating of the second effect image comprises displaying a partial image of the second image, the partial image corresponding to the first identification information.

9. The image providing method of claim 8, wherein the second effect image is generated using at least one of a halo effect of highlighting the partial image, a blur effect of reducing a difference between pixel values of the partial image, a size effect of changing the size of the partial image, and a depth effect of changing depth information of the partial image.

10. The image providing method of claim 1, wherein the first image is a live view image.

11. The image providing method of claim 10, wherein the second image is a temporary image generated from the live view image before a user input for storing an image is received.

12. The image providing method of claim 1, wherein the second image is a partial image generated from the moving image.

13. The image providing method of claim 12, wherein the partial image is generated in response to a change in the moving image.

14. An image providing method comprising:
displaying a first image, the first image including an object and a background;
receiving a user input selecting the object or the background as a first region;
acquiring first identification information associated with the first region;
searching a second image from a plurality of images, the second image including a second region associated with second identification information being the same as the first identification information;
generating a first effect image by applying an effect to the first region; and
generating a second effect image by applying the effect to the second region,
wherein the first image is a live view image,
wherein the second image is a temporary image generated from the live view image before a user input for storing an image is received, and
wherein the temporary image is generated when a value associated with a change in a partial image of the live view image is greater than a reference value, wherein the partial image corresponds to the first identification information.

15. The image providing method of claim 14, wherein the first effect image is a moving picture, and the first effect image includes the first image and the second image.

16. A mobile device comprising:
a display configured to display a first image including an object and a background;
a user input configured to receive a user input selecting the object or the background as a first region; and
a controller configured to, in response to the user input, generate a first effect image by applying an effect to the first region, acquire first identification information of the first region, to search a second image from a plurality of images, and to generate a second effect image by applying the same effect as that applied to the first region to a second region of the second image the second region is associated with second identification information being the same as the first identification information automatically in sequence,
wherein the first image and the second image are images captured by at least two cameras built into the mobile device, and
wherein the first image is a moving image captured by the mobile device.

17. The mobile device of claim 16, wherein the first identification information is acquired based on is acquired based on first attribute information which includes at least one of context information associated with generation of the first image and annotation information about the first image, the annotation information being added by a user.

18. The mobile device of claim 16, wherein the controller is configured to acquire the first identification information by generalizing first attribute information based on WordNet.

19. A method of providing an image, comprising:
receiving a first image, the first image including at least an object and a background;
receiving an input selecting the object or the background as a first region;
generating a first effect image by applying an effect to the first region;
determining first identification information associated with the first region;
searching a plurality images using the first identification information;
selecting a second image including a second region being associated with second identification information being the same as the first identification information; and generating a second effect image by applying the same effect as that applied to the first region to the second region, wherein the first image and the second image are images captured by at least two cameras built into a single electronic apparatus, wherein the generating of the first effect image, the determining of the first identification information, the searching of the plurality images, the selecting of the second image and the generating of the second effect image are performed automatically in sequence in response to the receiving the input, and wherein the first image is a moving image captured by the electronic apparatus.

20. The method of claim 19, further comprising storing the first effect image and the second effect image.

21. The method of claim 19, wherein determining the first identification information includes generating the identification information using one or more attributes of the first image.

22. The method of claim 21, wherein generating the first identification information using one or more attributes of the first image includes generating the one or more attributes of the first image by performing image analysis on the first image.

* * * * *